(12) United States Patent
Dimeska et al.

(10) Patent No.: US 8,507,706 B2
(45) Date of Patent: Aug. 13, 2013

(54) METALLOCENE COMPOUNDS, CATALYSTS COMPRISING THEM, PROCESS FOR PRODUCING AN OLEFIN POLYMER BY USE OF THE CATALYSTS, AND OLEFIN HOMO- AND COPOLYMERS

(75) Inventors: Anita Dimeska, Cincinnati, OH (US); Ralph-Dieter Maier, White Plains, NY (US); Nicola Stephanie Paczkowski, Dirmstein (DE); Matthew Grant Thorn, Lebanon, OH (US); Andreas Winter, Neuleininger (DE); Joerg Schulte, Frankfurt (DE); Thorsten Sell, Worms (DE)

(73) Assignee: Lummus Novolen Technology GmbH, Mannheim (DE)

( * ) Notice: Subject to any disclaimer, the term of this patent is extended or adjusted under 35 U.S.C. 154(b) by 0 days.

(21) Appl. No.: 13/605,049

(22) Filed: Sep. 6, 2012

(65) Prior Publication Data
US 2012/0329964 A1 Dec. 27, 2012

Related U.S. Application Data

(63) Continuation of application No. 12/739,078, filed as application No. PCT/US2007/022614 on Oct. 25, 2007, now Pat. No. 8,299,287.

(51) Int. Cl.
C07F 17/00 (2006.01)
B01J 31/22 (2006.01)
C08F 4/6592 (2006.01)

(52) U.S. Cl.
USPC ............. 556/53; 526/160; 526/348; 526/943; 502/103; 502/152

(58) Field of Classification Search
USPC ........... 556/53; 526/160, 348, 943; 502/103, 502/152
See application file for complete search history.

(56) References Cited

U.S. PATENT DOCUMENTS

| | | | |
|---|---|---|---|
| 6,121,182 A | 9/2000 | Okumura et al. | |
| 6,265,339 B1 | 7/2001 | Bidell et al. | |
| 6,472,474 B2 | 10/2002 | Burkhardt et al. | |
| 6,589,905 B1 | 7/2003 | Fischer et al. | |
| 7,041,756 B2 | 5/2006 | Razavi | |
| 7,109,278 B2 | 9/2006 | Okumura et al. | |
| 7,169,864 B2 | 1/2007 | Paczkowski et al. | |
| 7,232,869 B2 | 6/2007 | Sell et al. | |
| 7,342,078 B2 | 3/2008 | Schottek et al. | |
| 2001/0053833 A1 | 12/2001 | Nakano et al. | |
| 2006/0011690 A1 | 1/2006 | Bareno | |

FOREIGN PATENT DOCUMENTS

| | | | |
|---|---|---|---|
| EP | 1 250 365 | | 10/2002 |
| EP | 1 298 148 A1 | | 6/2003 |
| EP | 1 834 519 A1 | | 9/2007 |
| WO | 94/28034 A1 | | 12/1994 |
| WO | 97/40075 A1 | | 10/1997 |
| WO | 98/01481 A1 | | 1/1998 |
| WO | 00/05277 A1 | | 2/2000 |
| WO | 01/58970 A1 | | 8/2001 |
| WO | 02/02576 A1 | | 1/2002 |
| WO | 03/002583 A2 | | 1/2003 |
| WO | 03/045551 A1 | | 6/2003 |
| WO | 03/050131 A1 | | 6/2003 |
| WO | 2006/060544 A1 | | 6/2006 |
| WO | 2006/124231 A1 | | 11/2006 |

OTHER PUBLICATIONS

Third Office Action (w/translation) issued Oct. 26, 2012 in corresponding Chinese application No. 200780101835.4 (8 pages).
International Search Report from PCT/US2007/022614 dated Jul. 14, 2008 (3 pages).
Written Opinion from PCT/US2007/022614 dated Jul. 14, 2008 (5 pages).
Official Action issued Jun. 1, 2011 in corresponding Russian application No. 2010120916/04(029762) (8 pages).
Official Action issued Sep. 7, 2011 in corresponding Russian application No. 2010120916/04(029762) (6 pages).
First Examination Opinion Notice (with translation) issued Nov. 23, 2011 in corresponding Chinese application No. 2007801018354 (11 pages).
Official Action (w/translation) issued Jan. 16, 2012 in corresponding Russian application No. 2010120916/04(029762) (9 pages).
Communication pursuant to Article 94(3) EPC issued Jan. 4, 2012 in corresponding European application No. 07861508.5 (4 pages).
Second Examination Opinion Notice (with translation) issued Jun. 13, 2012 in corresponding Chinese application No. 2007801018354 (6 pages).
Correspondence reporting a First Office Action issued Jan. 15, 2013 in corresponding Japanese patent application No. 2010-530971 (6 pages).
Fourth Office Action (w/translation) issued Feb. 16, 2013 in corresponding Chinese application No. 200780101835.4 (6 pages).
Correspondence reporting a Second Office Action issued Mar. 21, 2013 in corresponding Colombian patent application No. 10.062.404 (10 pages).

*Primary Examiner* — Caixia Lu
(74) *Attorney, Agent, or Firm* — Osha • Liang LLP

(57) ABSTRACT

Certain metallocene compounds are provided that, when used as a component in a supported polymerization catalyst under industrially relevant polymerization conditions, afford high molar mass homo polymers or copolymers like polypropylene or propylene/ethylene copolymers without the need for any α-branched substituent in either of the two available 2-positions of the indenyl ligands. The substituent in the 2-position of one indenyl ligand can be any radical comprising hydrogen, methyl, or any other $C_2$-$C_{40}$ hydrocarbon which is not branched in the α-position, and the substituent in the 2-position of the other indenyl ligand can be any $C_4$-$C_{40}$ hydrocarbon radical with the proviso that this hydrocarbon radical is branched in the β-position. This metallocene topology affords high melting point, very high molar mass homo polypropylene and very high molar mass propylene-based copolymers. The activity/productivity levels of catalysts including the metallocenes of the present invention are exceptionally high.

60 Claims, 1 Drawing Sheet

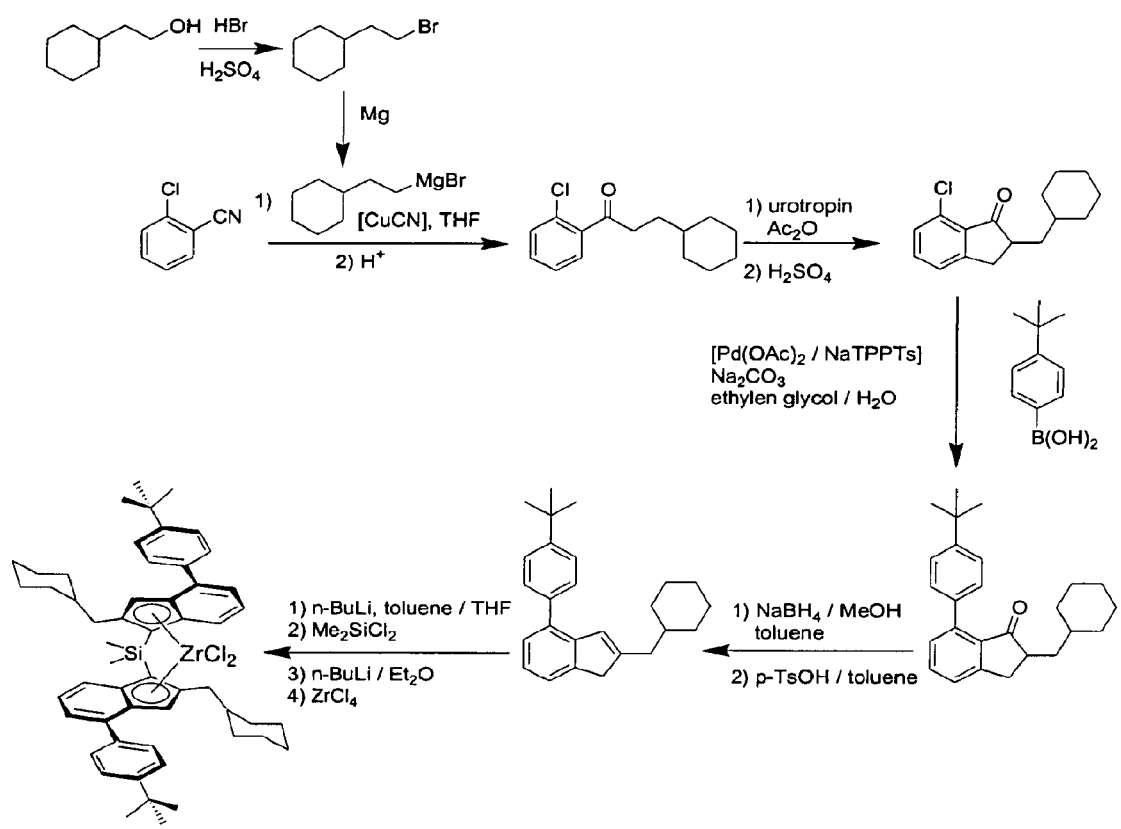

US 8,507,706 B2

METALLOCENE COMPOUNDS, CATALYSTS COMPRISING THEM, PROCESS FOR PRODUCING AN OLEFIN POLYMER BY USE OF THE CATALYSTS, AND OLEFIN HOMO- AND COPOLYMERS

CROSS-REFERENCE TO RELATED APPLICATIONS

This is a continuation application, and claims benefit under 35 U.S.C. §120 of U.S. patent application Ser. No. 12/739,078, filed on Apr. 21, 2010, now U.S. Pat. No. 8,299,287, which is a national stage application of PCT Application No. PCT/US2007/022614, filed on Oct. 25, 2007.

BACKGROUND

1. Field of the Invention

The present invention relates to novel metallocene compounds useful as components in polymerization catalysts, to catalysts comprising such metallocene compounds, to a process for the polymerization of olefins and to particularly propylene, and olefin homopolymers, random, and impact copolymers prepared by using the metallocene catalysts.

2. Background of the Art

One of the most important factors determining the success of a catalyst is its versatility, that is the possibility to use it for the broadest possible range of products. For a long time, the limitations for the development of metallocene catalysts for polypropylene has been their inability to produce propylene-ethylene copolymers of high molar mass, due to the fact that ethylene behaves as a chain transfer agent with most metallocenes. This effect has been observed for all basic metallocene structures, such as the syndiospecific $C_s$ symmetric $Me_2C(Cp)(Flu)ZrCl_2$, the aspecific $C_{2v}$ symmetric $Me_2Si(Flu)_2ZrCl_2$, and both the $C_2$ symmetric rac-$Me_2C(3$-iPr-Ind$)_2ZrCl_2$ and the fluxional $(2$-Ph-Ind$)_2ZrCl_2$ catalysts for elastomeric polypropylene. This effect has also been found for the isospecific $C_2$ symmetric rac-$Me_2Si(2$-Me-4,5-Benz-Ind$)_2ZrCl_2$ and rac-$Me_2Si(2$-Me-4-Ph-Ind$)_2ZrCl_2$ [L. Resconi, C. Fritze, "Metallocene Catalysts for Propylene Polymerization" In Polypropylene Handbook (N. Pasquini, Ed.), ch. 2.2, Hanser Publishers, Munic 2005]. While the 2-Me substitution of this catalyst family suppresses the β-hydrogen transfer to the propylene monomer and thus prevents the formation of low molar mass polymer, it fails to prevent the β-hydrogen transfer to the ethylene comonomer in case of the latter's presence. This β-hydrogen transfer to the ethylene comonomer becomes the favored chain termination mechanism and leads to the formation of low molar mass propylene-ethylene copolymers [A. Tynys et al., Macromol. Chem. Phys. 2005, vol. 206, pp. 1043-1056: "Ethylene-Propylene Copolymerizations: Effect of Metallocene Structure on Termination Reactions and Polymer Microstructure"]. Exceptions have been found in some zirconocenes with highly bulky ligands, such as rac-$Me_2C(3$-tBu-Ind$)_2ZrCl_2$, which show a marked increase in molar masses by ethylene incorporation. This catalyst, however, has shortcomings in terms of homopolymer molar mass and activity.

Another key requirement of a metallocene catalyst is its capability to produce polypropylene with a high melting point. This is equivalent with a catalyst that has a very high stereospecificity and regioselectivity. Within the rac-$Alk_2Si(2$-Alk-Ind$)_2ZrCl_2$ catalyst family, the stereospecificity and regioselectivity has continuously been improved during the last 15 years. EP-A1 834 519 relates to metallocenes of the rac-$Me_2Si(2$-Me-4-Ar-Ind$)_2ZrCl_2$ for the production of high rigid, high Tm polypropylenes with very high stereoregularity and very low amounts of regio errors. Although not tested for their copolymerization performance, the metallocenes disclosed in EP-A1 834 519 anticipated substitution patterns in 2-position that would later be identified as particularly suitable for the production of propylene/ethylene random copolymers when combined with additional substituents in certain positions. However, the highly stereo- and regio regular polypropylenes were not obtained under commercially relevant process conditions and suffered from too low activity/productivity-levels.

US-A1 2001/0053833 discloses metallocenes having substituents in 2-position consisting of an unsubstituted heteroaromatic ring or a heteroaromatic ring having at least one substituent bonded to the ring. Such catalysts afford C3/C2 copolymers with reasonably high molar mass, but fail to produce high Tm homopolymers under conditions typical for commercial scale production, i.e. on a support and at temperatures from 60 deg C. and higher. Also, the productivities of this catalyst family are unsatisfactory.

WO 01/058970 relates to impact copolymers having a high melting point and a high rubber molar mass, produced by catalysts comprising metallocenes of the rac-$Me_2Si(2$-Alk-4-Ar-Ind$)_2ZrCl_2$ family. High molar masses in the propylene/ethylene rubber were achieved when both Alk substituents were i-propyl groups. WO 02/002576 discloses bridged metallocenes of the $(2$-R-4-Ph-Ind$)_2ZrCl_2$ family having particular combinations of substituents in the 2-positions of the indenyl ligands and the Ph substituents. A high polypropylene (PP) melting point is favored if the Ph group exhibits a substitution pattern in the 3 and 5 positions, particularly in case of butyl substituents. A combination of high homopolymer melting point and high copolymer molar mass is achieved if both substituents R in 2-position are isopropyl groups. The major shortcoming is the very low activity/productivity of the rac-$Me_2Si(2$-R-4-Ar-Ind$)_2ZrCl_2$ catalysts if both ligands R are branched in the α-position. WO 03/002583 discloses bridged metallocenes of the $(2$-R-4-Ph-Ind$)_2ZrCl_2$ family having particular combinations of substituents in the 2-positions of the indenyl ligands and the 4-Ph substituents. A high PP melting point is favored if the Ph group exhibits a substitution pattern in the 2-position, particularly in case of biphenyl substituents. A combination of high homopolymer melting point and high copolymer molar mass is achieved if both substituents R in 2-position of the indenyl ligand are isopropyl groups. One major shortcoming is the very low activity/productivity of the rac-$Me_2Si(2$-R-Ar-Ind$)_2ZrCl_2$ catalysts if both ligands R are branched in the α-position. Moreover, the highest possible molar masses of the homopolymers produced by using such catalysts are relatively low which corresponds to relatively high melt flow rates. This, in turn excludes such metallocenes from catering applications such as pipe, blown film, cast film and injection stretch blow molding.

EP-A2 1 250 365, WO 97/40075 and WO 03/045551 relate to metallocenes having substituents in the 2-positions of either of the indenyl ligands with the imperative that at least one of the ligands in 2-position is branched or cyclicized in the α-position. WO 04/106351 relates to metallocenes having substitutents in the 2-positions of the indenyl ligands with the proviso that one ligand is unbranched or bound via an sp²-hybridized carbon atom and the other ligand is branched in the α-position. Such catalysts afford high Tm homopolymers and high molar mass propylene/ethylene copolymers. However, there still are limitations with regard to catalyst activity/productivity and lowest achievable homopolymer melt flow rate.

In summary, the main deficiency of supported catalyst systems comprising metallocenes of the above mentioned prior art, is that so far no catalyst has been found that, when used for the homopolymerization of propylene, affords isotactic polypropylene with a high melting point and very high molar mass (or very low melt flow rate) and that, when used for the copolymerization of propylene with ethylene, affords high molar mass propylene/ethylene copolymers, all at very high catalyst productivity. As a consequence, when compared to Ziegler/Natta catalysts, the industrial usefulness of these catalysts is limited because certain applications that require a combination of a high melting point, a very low melt flow rate, and/or a high molar mass copolymer or copolymer component, such as in impact copolymers, are not available at cost competitive productivities.

An object of the present invention is to address this shortcoming of the state of the art metallocene compounds and to provide metallocenes that increase desirable characteristics such as high melting point, high molar mass homopolymers and high molar mass copolymers, and do so at higher productivities when used as components of supported catalysts under industrially relevant polymerization conditions at temperatures of from 50° C. to 100° C. In addition, the inventions of the current example provide these advantages by using a Metallocene with symmetrically substituted 2 positions on the indenyl group. This is significantly more cost effective, and therefore far more desirable, than the comparative examples that have asymmetric substitution.

Another objective of the present invention is to provide a process for the polymerization of olefins, particularly propylene, ethylene, and optionally one or more higher 1-olefins.

Furthermore, it is an objective of the present invention to provide olefin polymers, particularly propylene homopolymers, random copolymers of propylene with ethylene and/or higher 1-olefins, impact copolymers comprised of propylene, ethylene and/or optionally higher 1-olefins, and random impact copolymers comprised of propylene, ethylene and/or optionally higher 1-olefins.

SUMMARY

Certain metallocene compounds are provided that, when used as a component in a supported polymerization catalyst under industrially relevant polymerization conditions, afford high molar mass homo polymers or copolymers like polypropylene or propylene/ethylene copolymers without the need for any α-branched substituent in either of the two available 2-positions of the indenyl ligands. The substituent in the 2-position of one indenyl ligand can be any radical comprising hydrogen, methyl, or any other $C_2$-$C_{40}$ hydrocarbon which is not branched in the α-position, and the substituent in the 2-position of the other indenyl ligand can be any $C_4$-$C_{40}$ hydrocarbon radical with the proviso that this hydrocarbon radical is branched in the β-position. This metallocene topology affords high melting point, very high molar mass homo polypropylene and very high molar mass propylene-based copolymers. Furthermore, the activity/productivity levels of catalysts comprising the metallocenes of the present invention are exceptionally high.

While various metallocenes are described, for example, in U.S. Publication No. 2006/0116490, the improvement in olefin polymerization achieved by the metallocene topology of the present invention is new and unexpected.

BRIEF DESCRIPTION OF THE DRAWINGS

FIG. 1 illustrates individual steps of the process for producing transition metal compounds of the bridged metallocene compound of the invention.

DETAILED DESCRIPTION OF THE PREFERRED EMBODIMENT(S)

We have found that this object is achieved by a supported catalyst system comprising at least one specifically substituted and bridged metallocene, at least one cocatalyst, at least one support and, if desired, at least one metal compound and further one additive component. According to the present invention, the catalyst system is prepared by mixing at least one specifically substituted and bridged metallocene, at least one cocatalyst, at least one support and if desired at least one metal compound and one further additive component.

The first embodiment of the invention relates to a substituted, bridged metallocene component of the general Formula 1 below,

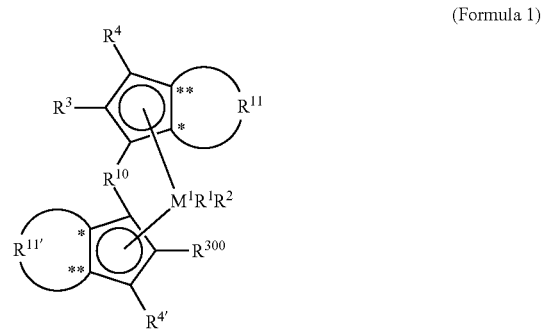

(Formula 1)

where $M^1$ is a metal of Group IVb of the Periodic Table of the Elements, preferably Zirconium or Hafnium, and particularly preferably Zirconium.

$R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms and $R^1$ and $R^2$ may form one or more ring system(s). Preferably, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or $R^1$ and $R^2$ together may form one or more ring system(s). Particularly preferably, $R^1$ and $R^2$ are identical or different and are methyl; chlorine or phenolate.

$R^4$ and $R^{4'}$ are identical or different and are each a hydrogen atom, a linear, cyclic or branched hydrocarbon group, for example an alkyl group of from 1 to 20 carbon atoms, an alkenyl group of from 2 to 20 carbon atoms, an aryl group of from 6 to 20 carbon atoms, an arylalkyl group of from 7 to 40 carbon atoms, an alkylaryl group of from 8 to about 40 carbon atoms, or an arylalkenyl group of from 8 to about 40 carbon atoms or a substituted or unsubstituted alkylsilyl group, an alkyl(aryl)silyl group or an arylsilyl group. The group may contain one or more hetero atoms like Si, B, Al, O, S, N or P, and/or may contain halogen atoms like F, Cl or Br. Preferably, $R^4$ and $R^{4'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 8 to about 20 carbon atoms, or an arylalkenyl group of from 8 to about 20 carbon atoms or a substituted or unsubstituted alkylsilyl group, an alkyl(aryl)silyl group or an arylsilyl group. The groups may be halogenated. Particularly preferably, $R^4$ and $R^{4'}$ are both hydrogen.

$R^{10}$ is a bridging group wherein $R^{10}$ is selected from:

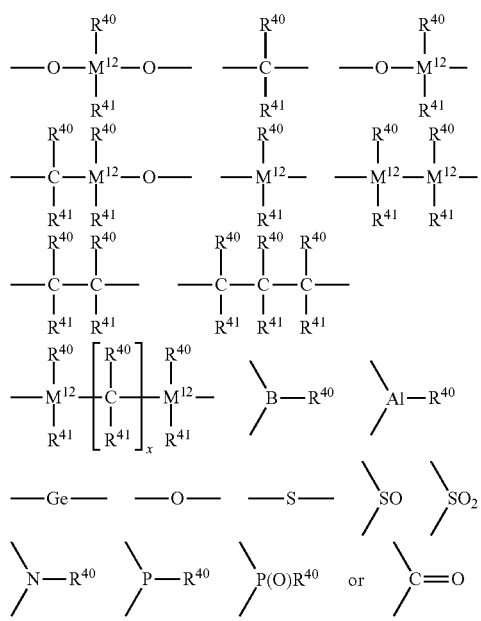

where $R^{40}$ and $R^{41}$, even when bearing the same index, can be identical or different and are each a hydrogen atom, a $C_1$-$C_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms. $R^{40}$ and $R^{41}$ together with the atoms connecting them can form one or more cyclic systems or $R^{40}$ and/or $R^{41}$ can contain additional hetero atoms (i.e., non-carbon atoms) like Si, B, Al, O, S, N or P or halogen atoms like Cl or Br, x is an integer from 1 to 18, $M^{12}$ is silicon, germanium or tin, and $R^{10}$ may also link two units of the formula 1 to one another,
Preferably, $R^{10}$ is $R^{40}R^{41}Si=$, $R^{40}R^{41}Ge=$, $R^{40}R^{41}C=$ or $—(R^{40}R^{41}C—CR^{40}R^{41})—$, where $R^{40}$ and $R^{41}$ identical or different and are each a hydrogen atom, a hydrocarbon group of from 1 to about 30 carbon atoms, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl group or an arylsilyl group.

Particularly preferably, the bridging unit $R^{10}$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, naphthyl, benzyl, trimethylsilyl or 3,3,3-trifluoropropyl.

$R^{11}$ and $R^{11'}$ are identical or different and are each a divalent $C_2$-$C_{40}$ group which together with the cyclopentadienyl ring forms a further saturated or unsaturated ring system having a ring size of from 5 to 7 atoms, where $R^{11}$ and $R^{11'}$ may contain the heteroatoms Si, Ge, N, P, O or S within the ring system fused onto the cyclopentadienyl ring. Preferably, the groups $R^{11}$ and $R^{11'}$ are identical or different and are each a divalent group selected from those given in Formulae 1α, β, γ, δ, φ, and ν and Formulae 1α', β', γ', δ', φ', and ν', respectively. The asterisks "*" and "**" in Formula 1 and Formulae 1α-ν and 1α'-ν', receptively, denote the chemical bonds joining $R^{11}$ and $R^{11'}$ to the cyclopentadienyl rings. For illustration, if $R^{11}$ is represented by Formula 1γ and $R^{11'}$ is represented by Formula 1-γ', then the structure given in Formula 1a (see below) is obtained. Particularly preferably, $R^{11}$ and $R^{11'}$ are identical or different and $R^{11}$ is a divalent group according to Formula 1γ and $R^{11'}$ is selected from the divalent groups in Formulae 1α', β', and γ' or $R^{11}$ and $R^{11'}$ are identical or different and are divalent groups according to Formula 1α and 1α' or Formula 1β and 1β' or Formula 1γ and 1γ' or Formula 1δ and 1δ' or Formula 1φ and 1φ' or Formula 1ν and 1ν', respectively.

Formula 1α

Formula 1α'

Formula 1β

Formula 1β'

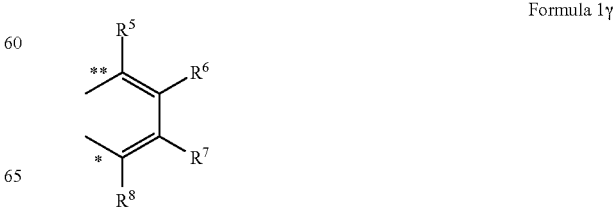

Formula 1γ

-continued

Formula 1γ'
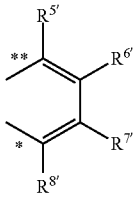

Formula 1δ
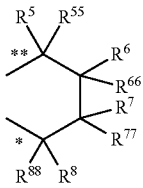

Formula 1δ'
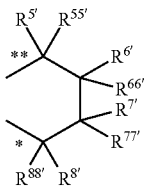

Formula 1φ
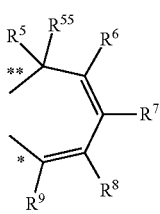

Formula 1φ'
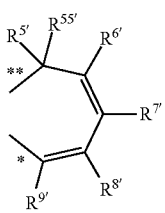

Formula 1ν
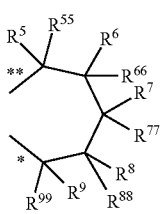

Formula 1ν'
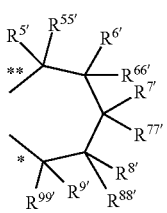

$R^5$, $R^6$, $R^7$, $R^8$, and $R^9$ and also $R^{5'}$, $R^{6'}$, $R^{7'}$, $R^{8'}$ and $R^{9'}$ as well as $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are identical or different and are each a hydrogen atom, a linear, cyclic or branched hydrocarbon group, for example an alkyl group of from 2 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group. Two adjacent radicals $R^5$, $R^6$ or $R^{5'}$, $R^{6'}$ or $R^6$, $R^7$ or $R^{6'}$, $R^{7'}$ or $R^7$, $R^8$ or $R^{7'}$, $R^{8'}$ or $R^8$, $R^9$ or $R^{8'}$, $R^{9'}$ as well as $R^{55}$, $R^{66}$ or $R^{55'}$, $R^{66'}$ or $R^{66}$, $R^{77}$ or $R^{66'}$, $R^{77'}$ or $R^{77}$, $R^{88}$ or $R^{77'}$, $R^{88'}$ or $R^{88}$, $R^{99}$ or $R^{88'}$, $R^{99'}$ in each case may form a saturated or unsaturated hydrocarbon ring system. The groups may contain one or more hetero atoms like Si, B, Al, O, S, N or P, and/or may contain halogen atoms like F, Cl or Br.

Preferably, $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms and the groups may contain one or more hetero atoms like Si, B, Al, O, S, N or P, and/or may contain halogen atoms like F, Cl or Br. The two adjacent radicals $R^5/R^6$ and also $R^{5'}/R^{6'}$ may form a hydrocarbon ring system or $R^5$ and $R^{5'}$ are identical or different and are each a substituted or unsubstituted aryl group of from 6 to about 40 carbon atoms.

Particularly preferably, $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and are each a hydrogen atom or a linear, cyclic or branched alkyl group of from 1 to about 10 carbon atoms, or an aryl group of from 6 to about 40 carbon atoms. The two adjacent radicals $R^5$, $R^6$ and also $R^{5'}$, $R^{6'}$ together may form a ring system or $R^5$ and $R^{5'}$ are identical or different and are each a substituted or unsubstituted aryl group of from 6 to about 40 carbon atoms.

$R^{300}$ is a —$CH_2$—$CR^{301}R^{302}R^{303}$ or a —$CH$=$CR^{302}R^{303}$ group, where $R^{301}$, $R^{302}$ and $R^{303}$ are identical or different and/or $R^{302}$ and $R^{303}$ together may form a ring system and/or $R^{301}$, $R^{302}$ and $R^{303}$ together may form a ring system, and $R^{301}$, $R^{302}$, $R^{303}$ are each a hydrogen atom, a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group or an arylsilyl group, and the groups may contain one or more hetero atoms like Si, B, Al, O, S, N or P, and/or may contain halogen atoms like F, Cl or Br, with the proviso, that $R^{302}$ and $R^{303}$ are not a hydrogen atom.

Preferably, $R^{300}$ is a —$CH_2$—$CR^{301}R^{302}R^{303}$ group, where $R^{301}$, $R^{302}$ and $R^{303}$ are identical or different and/or $R^{302}$ and $R^{303}$ together may form a ring system and/or $R^{301}$, $R^{302}$ and $R^{303}$ together may form a ring system, and $R^{301}$, $R^{302}$, $R^{303}$ are each a hydrogen atom, a linear, cyclic or branched hydrocarbon group which may be halogenated, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, an alkoxy group of from 1 to about 10 carbon atoms or an aryloxy group of from 6 to about 20 carbon atoms, with the proviso, that $R^{302}$ and $R^{303}$ are not a hydrogen atom.

Particularly preferably, $R^{300}$ is a —$CH_2$—$CR^{301}R^{302}R^{303}$ group, where $R^{301}$ is a hydrogen atom and where $R^{302}$ and $R^{303}$ are identical or different and/or $R^{302}$ and $R^{303}$ together may form a ring system, and $R^{302}$ and $R^{303}$ are each a linear, cyclic or branched hydrocarbon group which may be halogenated, for example an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms, or an aryloxy group of from 6 to about 20 carbon atoms, with the proviso, that $R^{300}$ contains more than 6 carbon atoms.

Most preferably, $R^{300}$ is a —$CH_2$—$CR^{301}R^{302}R^{303}$ group, where $R^{301}$ and $R^{302}$ and $R^{303}$ are identical or different and/or $R^{302}$ and $R^{303}$ together may form a ring system, and/or $R^{301}$, $R^{302}$ and $R^{303}$ together may form a ring system, and $R^{301}$, $R^{302}$, $R^{303}$ are each a linear, cyclic or branched hydrocarbon group which may be halogenated, for example an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms or an aryloxy group of from 6 to about 20 carbon atoms, with the proviso, that $R^{300}$ contains more than 6 carbon atoms.

$R^3$ has the meaning of $R^{300}$ (but need not be identical to $R^{300}$) or $R^3$ is a hydrogen atom, a linear, cyclic or branched hydrocarbon group which may be halogenated and/or may contain one or more hetero atoms like Si, B, Al, O, S, N or P, for example an alkyl group of from 1 to about 20 carbon atoms, an alkylalkenyl group of from 3 to about 20 carbon atoms, an alkylaryl group of from 7 to about 40 carbon atoms, or an alkylarylalkenyl group of from 9 to about 40 carbon atoms, with the proviso that $R^3$ is not cyclic or branched in α-position.

Preferably, $R^3$ has the meaning of $R^{300}$ (but need not be identical to $R^{300}$) or $R^3$ is a linear, cyclic or branched hydrocarbon group of from 1 to about 20 carbon atoms, for example an alkyl group of from 1 to 20 carbon atoms, an alkylaryl group of from 7 to about 20 carbon atoms, an alkylalkenyl group of from 3 to about 20 carbon atoms or an alkylarylalkenyl group of from 9 to about 20 carbon atoms with the proviso that $R^3$ is not cyclic or branched in α-position.

More preferably, $R^3$ and $R^{300}$ are identical or $R^3$ is a methyl group or a linear, cyclic or branched hydrocarbon group of from 7 to about 10 carbon atoms which may be halogenated, an alkylaryl group of from 7 to about 10 carbon atoms or an alkylalkenyl group of from 7 to about 10 carbon atoms with the proviso that $R^3$ is not cyclic or branched in α-position.

Particularly preferably, $R^3$ and $R^{300}$ are identical and are a —$CH_2$—$CR^{301}R^{302}R^{303}$ group, where $R^{301}$, $R^{302}$ and $R^{303}$ are identical or different and/or $R^{302}$ and $R^{303}$ together may form a ring system, and/or $R^{301}$, $R^{302}$ and $R^{303}$ together may form a ring system, and are each a hydrogen atom, a linear, cyclic or branched hydrocarbon group which may be halogenated, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, an alkoxy group of from 1 to about 10 carbon atoms, or an aryloxy group of from 6 to about 20 carbon atoms, with the proviso, that no more than one of $R^{301}$, $R^{302}$ and $R^{303}$ are a hydrogen atom.

More particularly preferably, $R^3$ and $R^{300}$ are identical and are a —$CH_2$—$CR^{301}R^{302}R^{303}$ group, where $R^{303}$ is a hydrogen atom and where $R^{301}$ and $R^{302}$ are identical or different and/or $R^{302}$ and $R^{303}$ together may form a ring system, and are each a linear, cyclic or branched hydrocarbon group which may be halogenated, for example an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms, or an aryloxy group of from 6 to about 20 carbon atoms, with the proviso that $R^3$ and $R^{300}$ contain more than 6 carbon atoms.

Most preferably, $R^3$ and $R^{300}$ are identical and are a —$CH_2$—$CR^{301}R^{302}R^{303}$ group, where $R^{303}$ and $R^{301}$ and $R^{302}$ are identical or different and/or $R^{302}$ and $R^{303}$ together may form a ring system, and/or $R^{301}$, $R^{302}$ and $R^{303}$ together may form a ring system, and are each a linear, cyclic or branched hydrocarbon group which may be halogenated, for example an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms, or an aryloxy group of from 6 to about 20 carbon atoms, with the proviso that $R^3$ and $R^{300}$ contain more than 6 carbon atoms.

Preferably, the specifically substituted, bridged metallocene component of the first embodiment of the invention is as given in Formula 1a below.

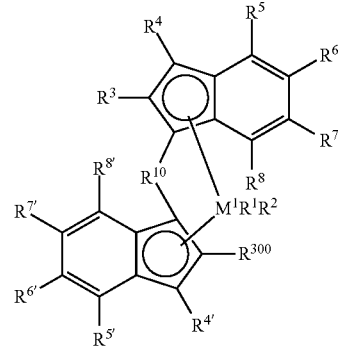

Formula 1a $M^1$, $R^1$, $R^2$, $R^3$, $R^4$, $R^{4'}$, $R^{10}$ and $R^{300}$ have the meaning set forth above with respect to Formula 1.

For the substituents $R^5$, $R^6$, $R^7$ and $R^8$ and also $R^{5'}$, $R^{6'}$, $R^{7'}$ and $R^{8'}$ of Formula 1a, there are two equitable sustitution patterns.

In the first substitution pattern, $R^5$, $R^6$, $R^7$ and $R^8$ and also $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group. The groups may contain one or more hetero atoms like Si, B, Al, O, S, N or P, and/or may contain halogen atoms like F, Cl or Br, and/or two adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case may form a hydrocarbon ring system.

Preferably, $R^5$, $R^6$, $R^7$ and $R^8$ and also $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms, which may contain one or more hetero atoms like Si, B, Al, O, S, N or P, and/or may contain halogen atoms like F, Cl or Br, and/or the two adjacent radicals $R^5$, $R^6$ and also $R^{5'}$, $R^{6'}$ may form a saturated or unsaturated hydrocarbon ring system.

Particularly preferably, $R^5$, $R^6$, $R^7$ and $R^8$ and also $R^{5'}$, $R^{6'}$, $R^{7'}$ and $R^{8'}$ are identical or different and are each a hydrogen atom or a linear, cyclic or branched alkyl group of from 1 to about 10 carbon atoms, or an aryl group of from 6 to about 40 carbon atoms and/or the two adjacent radicals $R^5$, $R^6$ and also $R^{5'}$, $R^{6'}$ together may form a saturated or unsaturated ring system.

In the second substitution pattern, $R^6$, $R^7$, $R^8$ and also $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group. Two adjacent radicals $R^6$, $R^7$ or $R^7$, $R^8$ as well as $R^{6'}$, $R^{7'}$ or $R^{7'}$, $R^{8'}$ in each case may form a hydrocarbon ring system. The groups may contain one or more hetero atoms like Si, B, Al, O, S, N or P, and/or may contain halogen atoms like F, Cl or Br. $R^5$ and $R^{5'}$ are identical or different and are each a substituted or unsubstituted aryl group of from 6 to about 40 carbon atoms. They may contain one or more hetero atoms like Si, B, Al, O, S, N or P, and/or may contain halogen atoms like F, Cl or Br.

Preferably, $R^6$, $R^7$ and $R^8$ and also $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which may contain one or more hetero atoms like Si, B, Al, O, S, N or P, and/or may contain halogen atoms like F, Cl or Br. $R^5$ and $R^{5'}$ are identical or different and are each a substituted or unsubstituted aryl group of from 6 to about 40 carbon atoms.

Particularly preferably, $R^6$, $R^7$ and $R^8$ and also $R^{6'}$, $R^{7'}$ and $R^{8'}$ are identical or different and are each a hydrogen atom or a linear, cyclic or branched alkyl group of from 1 to about 10 carbon atoms, or an aryl group of from 6 to about 10 carbon atoms. $R^5$ and $R^{5'}$ are identical or different and are each naphthyl, 4-($C_1$-$C_{10}$-alkyl)phenyl or 4-($C_6$-$C_{20}$-aryl)phenyl such as 4-methyl-phenyl, 4-biphenyl, 4-ethyl-phenyl, 4-n-propyl-phenyl, 4-isopropyl-phenyl, 4-tert-butyl-phenyl, 4-sec-butyl-phenyl, 4-cyclohexyl-phenyl, 4-trimethylsilyl-phenyl, 4-adamantyl-phenyl, 4-($C_1$-$C_{10}$-fluoroalkyl)-phenyl, 3-($C_1$-$C_{10}$-alkyl)-phenyl, 3-($C_1$-$C_{10}$-fluoroalkyl)-phenyl, 3-($C_6$-$C_{20}$-aryl)phenyl like 3-biphenyl, 3,5-di-($C_1$-$C_{10}$-alkyl)-phenyl such as 3,5-dimethyl-phenyl, 3,5-di-($C_1$-$C_{10}$-fluoroalkyl)-phenyl, such as 3,5-di(trifluoromethyl)-phenyl or 3,5-($C_6$-$C_{20}$-aryl)phenyl like 3,5-terphenyl.

Non-limiting examples for the very particularly preferred metallocene compounds according to Formula 1 and 1a are given below:

Dimethylsilanediylbis[2-t-butylmethyl-4-(1-naphthyl)-indenyl]zirconiumdichloride;
Dimethylsilanediylbis[2-t-butylmethyl-4-(2-naphthyl)-indenyl]zirconiumdichloride;
Dimethylsilanediylbis[2-t-butylmethyl-4-(4-methyl-phenyl)-indenyl]zirconiumdichloride;
Dimethylsilanediylbis[2-t-butylmethyl-4-(4-biphenyl)-indenyl]zirconiumdichloride;
Dimethylsilanediylbis[2-t-butylmethyl-4-(4-ethyl-phenyl)-indenyl]zirconiumdichloride;
Dimethylsilanediylbis[2-t-butylmethyl-4-(4-n-propyl-phenyl)-indenyl]zirconiumdichloride;
Dimethylsilanediylbis[2-t-butylmethyl-4-(4-i-propyl-phenyl)-indenyl]zirconiumdichloride;
Dimethylsilanediylbis[2-t-butylmethyl-4-(4-t-butyl-phenyl)-indenyl]zirconiumdichloride;
Dimethylsilanediylbis[2-t-butylmethyl-4-(4-sec-butyl-phenyl)-indenyl]zirconiumdichloride;
Dimethylsilanediylbis[2-t-butylmethyl-4-(4-cyclohexyl-phenyl)-indenyl]zirconiumdichloride;
Dimethylsilanediylbis[2-t-butylmethyl-4-(4-trimethylsilyl-phenyl)-indenyl]zirconiumdichloride;
Dimethylsilanediylbis[2-t-butylmethyl-4-(4-adamantyl-phenyl)-indenyl]zirconiumdichloride;
Dimethylsilanediylbis[2-t-butylmethyl-4-(3-biphenyl)-indenyl]zirconiumdichloride;
Dimethylsilanediylbis[2-t-butylmethyl-4-(3,5-dimethyl-phenyl)-indenyl]zirconiumdichloride;
Dimethylsilanediylbis[2-t-butylmethyl-4-(3,5-di-(trifluoromethyl)-phenyl)-indenyl]zirconiumdichloride;
Dimethylsilanediylbis[2-t-butylmethyl-4-(3,5-terphenyl)-indenyl]zirconiumdichloride;
Dimethylsilanediylbis[2-cyclopentylmethyl-4-(1-naphthyl)-indenyl]zirconiumdichloride;
Dimethylsilanediylbis[2-cyclopentylmethyl-4-(2-naphthyl)-indenyl]zirconiumdichloride;
Dimethylsilanediylbis[2-cyclopentylmethyl-4-(4-methyl-phenyl)-indenyl]zirconiumdichloride;
Dimethylsilanediylbis[2-cyclopentylmethyl-4-(4-biphenyl)-indenyl]zirconiumdichloride;
Dimethylsilanediylbis[2-cyclopentylmethyl-4-(4-ethyl-phenyl)-indenyl]zirconiumdichloride;
Dimethylsilanediylbis[2-cyclopentylmethyl-4-(4-n-propyl-phenyl)-indenyl]zirconiumdichloride;
Dimethylsilanediylbis[2-cyclopentylmethyl-4-(4-i-propyl-phenyl)-indenyl]zirconiumdichloride;
Dimethylsilanediylbis[2-cyclopentylmethyl-4-(4-t-butyl-phenyl)-indenyl]zirconiumdichloride;
Dimethylsilanediylbis[2-cyclopentylmethyl-4-(4-sec-butyl-phenyl)-indenyl]zirconiumdichloride;
Dimethylsilanediylbis[2-cyclopentylmethyl-4-(4-cyclohexyl-phenyl)-indenyl]zirconiumdichloride;
Dimethylsilanediylbis[2-cyclopentylmethyl-4-(4-trimethylsilyl-phenyl)-indenyl]zirconiumdichloride;
Dimethylsilanediylbis[2-cyclopentylmethyl-4-(4-adamantyl-phenyl)-indenyl]zirconiumdichloride;
Dimethylsilanediylbis[2-cyclopentylmethyl-4-(3-biphenyl)-indenyl]zirconiumdichloride;
Dimethylsilanediylbis[2-cyclopentylmethyl-4-(3,5-dimethyl-phenyl)-indenyl]zirconiumdichloride;
Dimethylsilanediylbis[2-cyclopentylmethyl-4-(3,5-di-(trifluoromethyl)-phenyl)-indenyl]zirconiumdichloride;
Dimethylsilanediylbis[2-cyclopentylmethyl-4-(3,5-terphenyl)-indenyl]zirconiumdichloride;
Dimethylsilanediylbis[2-cyclohexylmethyl-4-(1-naphthyl)-indenyl]zirconiumdichloride;
Dimethylsilanediylbis[2-cyclohexylmethyl-4-(2-naphthyl)-indenyl]zirconiumdichloride;
Dimethylsilanediylbis[2-cyclohexylmethyl-4-(4-methyl-phenyl)-indenyl]zirconiumdichloride;
Dimethylsilanediylbis[2-cyclohexylmethyl-4-(4-biphenyl)-indenyl]zirconiumdichloride;
Dimethylsilanediylbis[2-cyclohexylmethyl-4-(4-ethyl-phenyl)-indenyl]zirconiumdichloride;

Dimethylsilanediylbis[2-cyclohexylmethyl-4-(4-n-propyl-phenyl)-indenyl]zirconiumdichloride;
Dimethylsilanediylbis[2-cyclohexylmethyl-4-(4-i-propyl-phenyl)-indenyl]zirconiumdichloride;
Dimethylsilanediylbis[2-cyclohexylmethyl-4-(4-t-butyl-phenyl)-indenyl]zirconiumdichloride;
Dimethylsilanediylbis[2-cyclohexylmethyl-4-(4-sec-butyl-phenyl)-indenyl]zirconiumdichloride;
Dimethylsilanediylbis[2-cyclohexylmethyl-4-(4-cyclohexyl-phenyl)-indenyl]zirconiumdichloride; Dimethylsilanediylbis[2-cyclohexylmethyl-4-(4-trimethylsilyl-phenyl)-indenyl]zirconiumdichloride;
Dimethylsilanediylbis[2-cyclohexylmethyl-4-(4-adamantyl-phenyl)-indenyl]zirconiumdichloride;
Dimethylsilanediylbis[2-cyclohexylmethyl-4-(3-biphenyl)-indenyl]zirconiumdichloride;
Dimethylsilanediylbis[2-cyclohexylmethyl-4-(3,5-dimethyl-phenyl)-indenyl]zirconiumdichloride;
Dimethylsilanediylbis[2-cyclohexylmethyl-4-(3,5-di-(trifluoromethyl)-phenyl)-indenyl]zirconiumdichloride;
Dimethylsilanediylbis[2-cyclohexylmethyl-4-(3,5-terphenyl)-indenyl]zirconiumdichloride;
Dimethylsilanediylbis[2-cycloheptylmethyl-4-(1-naphthyl)-indenyl]zirconiumdichloride;
Dimethylsilanediylbis[2-cycloheptylmethyl-4-(2-naphthyl)-indenyl]zirconiumdichloride;
Dimethylsilanediylbis[2-cycloheptylmethyl-4-(4-methyl-phenyl)-indenyl]zirconiumdichloride;
Dimethylsilanediylbis[2-cycloheptylmethyl-4-(4-biphenyl)-indenyl]zirconiumdichloride;
Dimethylsilanediylbis[2-cycloheptylmethyl-4-(4-ethyl-phenyl)-indenyl]zirconiumdichloride;
Dimethylsilanediylbis[2-cycloheptylmethyl-4-(4-n-propyl-phenyl)-indenyl]zirconiumdichloride;
Dimethylsilanediylbis[2-cycloheptylmethyl-4-(4-i-propyl-phenyl)-indenyl]zirconiumdichloride;
Dimethylsilanediylbis[2-cycloheptylmethyl-4-(4-t-butyl-phenyl)-indenyl]zirconiumdichloride;
Dimethylsilanediylbis[2-cycloheptylmethyl-4-(4-sec-butyl-phenyl)-indenyl]zirconiumdichloride;
Dimethylsilanediylbis[2-cycloheptylmethyl-4-(4-cyclohexyl-phenyl)-indenyl]zirconiumdichloride;
Dimethylsilanediylbis[2-cycloheptylmethyl-4-(4-trimethylsilyl-phenyl)-indenyl]zirconiumdichloride;
Dimethylsilanediylbis[2-cycloheptylmethyl-4-(4-adamantyl-phenyl)-indenyl]zirconiumdichloride;
Dimethylsilanediylbis[2-cycloheptylmethyl-4-(3-biphenyl)-indenyl]zirconiumdichloride;
Dimethylsilanediylbis[2-cycloheptylmethyl-4-(3,5-dimethyl-phenyl)-indenyl]zirconiumdichloride; Dimethylsilanediylbis[2-cycloheptylmethyl-4-(3,5-di-(trifluoromethyl)-phenyl)-indenyl]zirconiumdichloride;
Dimethylsilanediylbis[2-cycloheptylmethyl-4-(3,5-terphenyl)-indenyl]zirconiumdichloride;
Dimethylsilanediylbis[2-adamantylmethyl-4-(1-naphthyl)-indenyl]zirconiumdichloride;
Dimethylsilanediylbis[2-adamantylmethyl-4-(2-naphthyl)-indenyl]zirconiumdichloride;
Dimethylsilanediylbis[2-adamantylmethyl-4-(4-methyl-phenyl)-indenyl]zirconiumdichloride;
Dimethylsilanediylbis[2-adamantylmethyl-4-(4-biphenyl)-indenyl]zirconiumdichloride;
Dimethylsilanediylbis[2-adamantylmethyl-4-(4-ethyl-phenyl)-indenyl]zirconiumdichloride;
Dimethylsilanediylbis[2-adamantylmethyl-4-(4-n-propyl-phenyl)-indenyl]zirconiumdichloride;
Dimethylsilanediylbis[2-adamantylmethyl-4-(4-i-propyl-phenyl)-indenyl]zirconiumdichloride;
Dimethylsilanediylbis[2-adamantylmethyl-4-(4-t-butyl-phenyl)-indenyl]zirconiumdichloride;
Dimethylsilanediylbis[2-adamantylmethyl-4-(4-sec-butyl-phenyl)-indenyl]zirconiumdichloride;
Dimethylsilanediylbis[2-adamantylmethyl-4-(4-cyclohexyl-phenyl)-indenyl]zirconiumdichloride;
Dimethylsilanediylbis[2-adamantylmethyl-4-(4-trimethylsilyl-phenyl)-indenyl]zirconiumdichloride;
Dimethylsilanediylbis[2-adamantylmethyl-4-(4-adamantyl-phenyl)-indenyl]zirconiumdichloride;
Dimethylsilanediylbis[2-adamantylmethyl-4-(3-biphenyl)-indenyl]zirconiumdichloride;
Dimethylsilanediylbis[2-adamantylmethyl-4-(3,5-dimethyl-phenyl)-indenyl]zirconiumdichloride;
Dimethylsilanediylbis[2-adamantylmethyl-4-(3,5-di-(trifluoromethyl)-phenyl)-indenyl]zirconiumdichloride;
Dimethylsilanediylbis[2-adamantylmethyl-4-(3,5-terphenyl)-indenyl]zirconiumdichloride;
Dimethylsilanediylbis[2-trimethylsilylmethyl-4-(4-t-butyl-phenyl)-indenyl]zirconiumdichloride;
Dimethylsilanediylbis[2-(2-methoxy-2-methyl-propyl)-4-(4-t-butyl-phenyl)-indenyl]zirconiumdichloride; Dimethylsilanediylbis[2-(2,6-dimethyl-benzyl)-4-(4-t-butyl-phenyl)-indenyl]zirconiumdichloride;
Dimethylsilanediylbis[2-(2,4,6-trimethyl-benzyl)-4-(4-t-butyl-phenyl)-indenyl]zirconiumdichloride;
Dimethylsilanediylbis[2-bicyclo[2.2.1]heptylmethyl-4-(1-naphthyl)-indenyl]zirconiumdichloride;
Dimethylsilanediylbis[2-bicyclo[2.2.1]heptylmethyl-4-(2-naphthyl)-indenyl]zirconiumdichloride;
Dimethylsilanediylbis[2-bicyclo[2.2.1]heptylmethyl-4-(4-methyl-phenyl)-indenyl]zirconiumdichloride;
Dimethylsilanediylbis[2-bicyclo[2.2.1]heptylmethyl-4-(4-biphenyl)-indenyl]zirconiumdichloride;
Dimethylsilanediylbis[2-bicyclo[2.2.1]heptylmethyl-4-(4-ethyl-phenyl)-indenyl]zirconiumdichloride;
Dimethylsilanediylbis[2-bicyclo[2.2.1]heptylmethyl-4-(4-n-propyl-phenyl)-indenyl]zirconiumdichloride;
Dimethylsilanediylbis[2-bicyclo[2.2.1]heptylmethyl-4-(4-i-propyl-phenyl)-indenyl]zirconiumdichloride;
Dimethylsilanediylbis[2-bicyclo[2.2.1]heptylmethyl-4-(4-t-butyl-phenyl)-indenyl]zirconiumdichloride;
Dimethylsilanediylbis[2-bicyclo[2.2.1]heptylmethyl-4-(4-sec-butyl-phenyl)-indenyl]zirconiumdichloride;
Dimethylsilanediylbis[2-bicyclo[2.2.1]heptylmethyl-4-(4-cyclohexyl-phenyl)-indenyl]zirconiumdichloride;
Dimethylsilanediylbis[2-bicyclo[2.2.1]heptylmethyl-4-(4-trimethylsilyl-phenyl)-indenyl]zirconiumdichloride;
Dimethylsilanediylbis[2-bicyclo[2.2.1]heptylmethyl-4-(4-adamantyl-phenyl)-indenyl]zirconiumdichloride;
Dimethylsilanediylbis[2-bicyclo[2.2.1]heptylmethyl-4-(3-biphenyl)-indenyl]zirconiumdichloride;
Dimethylsilanediylbis[2-bicyclo[2.2.1]heptylmethyl-4-(3,5-dimethyl-phenyl)-indenyl]zirconiumdichloride;
Dimethylsilanediylbis[2-bicyclo[2.2.1]heptylmethyl-4-(3,5-di-(trifluoromethyl)-phenyl)-indenyl]zirconiumdichloride;
Dimethylsilanediylbis[2-bicyclo[2.2.1]heptylmethyl-4-(3,5-terphenyl)-indenyl]zirconiumdichloride;
(Methyl)(n-propyl)silanediylbis[2-t-butylmethyl-4-(1-naphthyl)-indenyl]zirconiumdichloride;
(Methyl)(n-propyl)silanediylbis[2-t-butylmethyl-4-(2-naphthyl)-indenyl]zirconiumdichloride;
(Methyl)(n-propyl)silanediylbis[2-t-butylmethyl-4-(4-methyl-phenyl)-indenyl]zirconiumdichloride;

(Methyl)(n-propyl)silanediylbis[2-t-butylmethyl-4-(4-biphenyl)-indenyl]zirconiumdichloride;
(Methyl)(n-propyl)silanediylbis[2-t-butylmethyl-4-(4-ethyl-phenyl)-indenyl]zirconiumdichloride;
(Methyl)(n-propyl)silanediylbis[2-t-butylmethyl-4-(4-n-propyl-phenyl)-indenyl]zirconiumdichloride;
(Methyl)(n-propyl)silanediylbis[2-t-butylmethyl-4-(4-i-propyl-phenyl)-indenyl]zirconiumdichloride;
(Methyl)(n-propyl)silanediylbis[2-t-butylmethyl-4-(4-t-butyl-phenyl)-indenyl]zirconiumdichloride;
(Methyl)(n-propyl)silanediylbis[2-t-butylmethyl-4-(4-sec-butyl-phenyl)-indenyl]zirconiumdichloride;
(Methyl)(n-propyl)silanediylbis[2-t-butylmethyl-4-(4-cyclohexyl-phenyl)-indenyl]zirconiumdichloride;
(Methyl)(n-propyl)silanediylbis[2-t-butylmethyl-4-(4-trimethylsilyl-phenyl)-indenyl]zirconiumdichloride;
(Methyl)(n-propyl)silanediylbis[2-t-butylmethyl-4-(4-adamantyl-phenyl)-indenyl]zirconiumdichloride;
(Methyl)(n-propyl)silanediylbis[2-t-butylmethyl-4-(3-biphenyl)-indenyl]zirconiumdichloride;
(Methyl)(n-propyl)silanediylbis[2-t-butylmethyl-4-(3,5-dimethyl-phenyl)-indenyl]zirconiumdichloride;
(Methyl)(n-propyl)silanediylbis[2-t-butylmethyl-4-(3,5-di-(trifluoromethyl)-phenyl)-indenyl]zirconiumdichloride;
(Methyl)(n-propyl)silanediylbis[2-t-butylmethyl-4-(3,5-ter-phenyl)-indenyl]zirconiumdichloride;
(Methyl)(n-propyl)silanediylbis[2-cyclopentylmethyl-4-(1-naphthyl)-indenyl]zirconiumdichloride;
(Methyl)(n-propyl)silanediylbis[2-cyclopentylmethyl-4-(2-naphthyl)-indenyl]zirconiumdichloride;
(Methyl)(n-propyl)silanediylbis[2-cyclopentylmethyl-4-(4-methyl-phenyl)-indenyl]zirconiumdichloride;
(Methyl)(n-propyl)silanediylbis[2-cyclopentylmethyl-4-(4-biphenyl)-indenyl]zirconiumdichloride;
(Methyl)(n-propyl)silanediylbis[2-cyclopentylmethyl-4-(4-ethyl-phenyl)-indenyl]zirconiumdichloride;
(Methyl)(n-propyl)silanediylbis[2-cyclopentylmethyl-4-(4-n-propyl-phenyl)-indenyl]zirconiumdichloride;
(Methyl)(n-propyl)silanediylbis[2-cyclopentylmethyl-4-(4-i-propyl-phenyl)-indenyl]zirconiumdichloride;
(Methyl)(n-propyl)silanediylbis[2-cyclopentylmethyl-4-(4-t-butyl-phenyl)-indenyl]zirconiumdichloride;
(Methyl)(n-propyl)silanediylbis[2-cyclopentylmethyl-4-(4-sec-butyl-phenyl)-indenyl]zirconiumdichloride;
(Methyl)(n-propyl)silanediylbis[2-cyclopentylmethyl-4-(4-cyclohexyl-phenyl)-indenyl]zirconiumdichloride;
(Methyl)(n-propyl)silanediylbis[2-cyclopentylmethyl-4-(4-trimethylsilyl-phenyl)-indenyl]zirconiumdichloride;
(Methyl)(n-propyl)silanediylbis[2-cyclopentylmethyl-4-(4-adamantyl-phenyl)-indenyl]zirconiumdichloride;
(Methyl)(n-propyl)silanediylbis[2-cyclopentylmethyl-4-(3-biphenyl)-indenyl]zirconiumdichloride;
(Methyl)(n-propyl)silanediylbis[2-cyclopentylmethyl-4-(3,5-dimethyl-phenyl)-indenyl]zirconiumdichloride;
(Methyl)(n-propyl)silanediylbis[2-cyclopentylmethyl-4-(3,5-di-(trifluoromethyl)-phenyl)-indenyl]zirconiumdichloride;
(Methyl)(n-propyl)silanediylbis[2-cyclopentylmethyl-4-(3,5-terphenyl)-indenyl]zirconiumdichloride;
(Methyl)(n-propyl)silanediylbis[2-cyclohexylmethyl-4-(1-naphthyl)-indenyl]zirconiumdichloride;
(Methyl)(n-propyl)silanediylbis[2-cyclohexylmethyl-4-(2-naphthyl)-indenyl]zirconiumdichloride;
(Methyl)(n-propyl)silanediylbis[2-cyclohexylmethyl-4-(4-methyl-phenyl)-indenyl]zirconiumdichloride;
(Methyl)(n-propyl)silanediylbis[2-cyclohexylmethyl-4-(4-biphenyl)-indenyl]zirconiumdichloride;
(Methyl)(n-propyl)silanediylbis[2-cyclohexylmethyl-4-(4-ethyl-phenyl)-indenyl]zirconiumdichloride;
(Methyl)(n-propyl)silanediylbis[2-cyclohexylmethyl-4-(4-n-propyl-phenyl)-indenyl]zirconiumdichloride;
(Methyl)(n-propyl)silanediylbis[2-cyclohexylmethyl-4-(4-i-propyl-phenyl)-indenyl]zirconiumdichloride;
(Methyl)(n-propyl)silanediylbis[2-cyclohexylmethyl-4-(4-t-butyl-phenyl)-indenyl]zirconiumdichloride;
(Methyl)(n-propyl)silanediylbis[2-cyclohexylmethyl-4-(4-sec-butyl-phenyl)-indenyl]zirconiumdichloride;
(Methyl)(n-propyl)silanediylbis[2-cyclohexylmethyl-4-(4-cyclohexyl-phenyl)-indenyl]zirconiumdichloride;
(Methyl)(n-propyl)silanediylbis[2-cyclohexylmethyl-4-(4-trimethylsilyl-phenyl)-indenyl]zirconiumdichloride;
(Methyl)(n-propyl)silanediylbis[2-cyclohexylmethyl-4-(4-adamantyl-phenyl)-indenyl]zirconiumdichloride;
(Methyl)(n-propyl)silanediylbis[2-cyclohexylmethyl-4-(3-biphenyl)-indenyl]zirconiumdichloride;
(Methyl)(n-propyl)silanediylbis[2-cyclohexylmethyl-4-(3,5-dimethyl-phenyl)-indenyl]zirconiumdichloride;
(Methyl)(n-propyl)silanediylbis[2-cyclohexylmethyl-4-(3,5-di-(trifluoromethyl)-phenyl)-indenyl]zirconiumdichloride;
(Methyl)(n-propyl)silanediylbis[2-cyclohexylmethyl-4-(3,5-terphenyl)-indenyl]zirconiumdichloride;
(Methyl)(n-propyl)silanediylbis[2-cycloheptylmethyl-4-(1-naphthyl)-indenyl]zirconiumdichloride;
(Methyl)(n-propyl)silanediylbis[2-cycloheptylmethyl-4-(2-naphthyl)-indenyl]zirconiumdichloride;
(Methyl)(n-propyl)silanediylbis[2-cycloheptylmethyl-4-(4-methyl-phenyl)-indenyl]zirconiumdichloride;
(Methyl)(n-propyl)silanediylbis[2-cycloheptylmethyl-4-(4-biphenyl)-indenyl]zirconiumdichloride;
(Methyl)(n-propyl)silanediylbis[2-cycloheptylmethyl-4-(4-ethyl-phenyl)-indenyl]zirconiumdichloride;
(Methyl)(n-propyl)silanediylbis[2-cycloheptylmethyl-4-(4-n-propyl-phenyl)-indenyl]zirconiumdichloride;
(Methyl)(n-propyl)silanediylbis[2-cycloheptylmethyl-4-(4-i-propyl-phenyl)-indenyl]zirconiumdichloride;
(Methyl)(n-propyl)silanediylbis[2-cycloheptylmethyl-4-(4-t-butyl-phenyl)-indenyl]zirconiumdichloride;
(Methyl)(n-propyl)silanediylbis[2-cycloheptylmethyl-4-(4-sec-butyl-phenyl)-indenyl]zirconiumdichloride;
(Methyl)(n-propyl)silanediylbis[2-cycloheptylmethyl-4-(4-cyclohexyl-phenyl)-indenyl]zirconiumdichloride;
(Methyl)(n-propyl)silanediylbis[2-cycloheptylmethyl-4-(4-trimethylsilyl-phenyl)-indenyl]zirconiumdichloride;
(Methyl)(n-propyl)silanediylbis[2-cycloheptylmethyl-4-(4-adamantyl-phenyl)-indenyl]zirconiumdichloride;
(Methyl)(n-propyl)silanediylbis[2-cycloheptylmethyl-4-(3-biphenyl)-indenyl]zirconiumdichloride;
(Methyl)(n-propyl)silanediylbis[2-cycloheptylmethyl-4-(3,5-dimethyl-phenyl)-indenyl]zirconiumdichloride;
(Methyl)(n-propyl)silanediylbis[2-cycloheptylmethyl-4-(3,5-di-(trifluoromethyl)-phenyl)-indenyl]zirconiumdichloride;
(Methyl)(n-propyl)silanediylbis[2-cycloheptylmethyl-4-(3,5-terphenyl)-indenyl]zirconiumdichloride;
(Methyl)(n-propyl)silanediylbis[2-adamantylmethyl-4-(1-naphthyl)-indenyl]zirconiumdichloride;
(Methyl)(n-propyl)silanediylbis[2-adamantylmethyl-4-(2-naphthyl)-indenyl]zirconiumdichloride;
(Methyl)(n-propyl)silanediylbis[2-adamantylmethyl-4-(4-methyl-phenyl)-indenyl]zirconiumdichloride;
(Methyl)(n-propyl)silanediylbis[2-adamantylmethyl-4-(4-biphenyl)-indenyl]zirconiumdichloride;

(Methyl)(n-propyl)silanediylbis[2-adamantylmethyl-4-(4-ethyl-phenyl)-indenyl]zirconiumdichloride;
(Methyl)(n-propyl)silanediylbis[2-adamantylmethyl-4-(4-n-propyl-phenyl)-indenyl]zirconiumdichloride;
(Methyl)(n-propyl)silanediylbis[2-adamantylmethyl-4-(4-i-propyl-phenyl)-indenyl]zirconiumdichloride;
(Methyl)(n-propyl)silanediylbis[2-adamantylmethyl-4-(4-t-butyl-phenyl)-indenyl]zirconiumdichloride;
(Methyl)(n-propyl)silanediylbis[2-adamantylmethyl-4-(4-sec-butyl-phenyl)-indenyl]zirconiumdichloride;
(Methyl)(n-propyl)silanediylbis[2-adamantylmethyl-4-(4-cyclohexyl-phenyl)-indenyl]zirconiumdichloride;
(Methyl)(n-propyl)silanediylbis[2-adamantylmethyl-4-(4-trimethylsilyl-phenyl)-indenyl]zirconiumdichloride;
(Methyl)(n-propyl)silanediylbis[2-adamantylmethyl-4-(4-adamantyl-phenyl)-indenyl]zirconiumdichloride;
(Methyl)(n-propyl)silanediylbis[2-adamantylmethyl-4-(3-biphenyl)-indenyl]zirconiumdichloride;
(Methyl)(n-propyl)silanediylbis[2-adamantylmethyl-4-(3,5-dimethyl-phenyl)-indenyl]zirconiumdichloride;
(Methyl)(n-propyl)silanediylbis[2-adamantylmethyl-4-(3,5-di-(trifluoromethyl)-phenyl)-indenyl]zirconiumdichloride;
(Methyl)(n-propyl)silanediylbis[2-adamantylmethyl-4-(3,5-terphenyl)-indenyl]zirconiumdichloride;
(Methyl)(n-propyl)silanediylbis[2-bicyclo[2.2.1]heptylmethyl-4-(1-naphthyl)-indenyl]zirconiumdichloride;
(Methyl)(n-propyl)silanediylbis[2-bicyclo[2.2.1]heptylmethyl-4-(2-naphthyl)-indenyl]zirconiumdichloride;
(Methyl)(n-propyl)silanediylbis[2-bicyclo[2.2.1]heptylmethyl-4-(4-methyl-phenyl)-indenyl]zirconiumdichloride;
(Methyl)(n-propyl)silanediylbis[2-bicyclo[2.2.1]heptylmethyl-4-(4-biphenyl)-indenyl]zirconiumdichloride;
(Methyl)(n-propyl)silanediylbis[2-bicyclo[2.2.1]heptylmethyl-4-(4-ethyl-phenyl)-indenyl]zirconiumdichloride;
(Methyl)(n-propyl)silanediylbis[2-bicyclo[2.2.1]heptylmethyl-4-(4-n-propyl-phenyl)-indenyl]zirconiumdichloride;
(Methyl)(n-propyl)silanediylbis[2-bicyclo[2.2.1]heptylmethyl-4-(4-i-propyl-phenyl)-indenyl]zirconiumdichloride;
(Methyl)(n-propyl)silanediylbis[2-bicyclo[2.2.1]heptylmethyl-4-(4-t-butyl-phenyl)-indenyl]zirconiumdichloride;
(Methyl)(n-propyl)silanediylbis[2-bicyclo[2.2.1]heptylmethyl-4-(4-sec-butyl-phenyl)-indenyl]zirconiumdichloride;
(Methyl)(n-propyl)silanediylbis[2-bicyclo[2.2.1]heptylmethyl-4-(4-cyclohexyl-phenyl)-indenyl]zirconiumdichloride;
(Methyl)(n-propyl)silanediylbis[2-bicyclo[2.2.1]heptylmethyl-4-(4-trimethylsilyl-phenyl)-indenyl]zirconiumdichloride;
(Methyl)(n-propyl)silanediylbis[2-bicyclo[2.2.1]heptylmethyl-4-(4-adamantyl-phenyl)-indenyl]zirconiumdichloride;
(Methyl)(n-propyl)silanediylbis[2-bicyclo[2.2.1]heptylmethyl-4-(3-biphenyl)-indenyl]zirconiumdichloride;
(Methyl)(n-propyl)silanediylbis[2-bicyclo[2.2.1]heptylmethyl-4-(3,5-dimethyl-phenyl)-indenyl]zirconiumdichloride;
(Methyl)(n-propyl)silanediylbis[2-bicyclo[2.2.1]heptylmethyl-4-(3,5-di-(trifluoromethyl)-phenyl)-indenyl]zirconiumdichloride;
(Methyl)(n-propyl)silanediylbis[2-bicyclo[2.2.1]heptylmethyl-4-(3,5-terphenyl)-indenyl]zirconiumdichloride;
(Methyl)(3,3,3-trifluoropropyl)silanediylbis[2-t-butylmethyl-4-(1-naphthyl)-indenyl]zirconiumdichloride;
(Methyl)(3,3,3-trifluoropropyl)silanediylbis[2-t-butylmethyl-4-(2-naphthyl)-indenyl]zirconiumdichloride;
(Methyl)(3,3,3-trifluoropropyl)silanediylbis[2-t-butylmethyl-4-(4-methyl-phenyl)-indenyl]zirconiumdichloride;
(Methyl)(3,3,3-trifluoropropyl)silanediylbis[2-t-butylmethyl-4-(4-biphenyl)-indenyl]zirconiumdichloride;
(Methyl)(3,3,3-trifluoropropyl)silanediylbis[2-t-butylmethyl-4-(4-ethyl-phenyl)-indenyl]zirconiumdichloride;
(Methyl)(3,3,3-trifluoropropyl)silanediylbis[2-t-butylmethyl-4-(4-n-propyl-phenyl)-indenyl]zirconiumdichloride;
(Methyl)(3,3,3-trifluoropropyl)silanediylbis[2-t-butylmethyl-4-(4-i-propyl-phenyl)-indenyl]zirconiumdichloride;
(Methyl)(3,3,3-trifluoropropyl)silanediylbis[2-t-butylmethyl-4-(4-t-butyl-phenyl)-indenyl]zirconiumdichloride;
(Methyl)(3,3,3-trifluoropropyl)silanediylbis[2-t-butylmethyl-4-(4-sec-butyl-phenyl)-indenyl]zirconiumdichloride;
(Methyl)(3,3,3-trifluoropropyl)silanediylbis[2-t-butylmethyl-4-(4-cyclohexyl-phenyl)-indenyl]zirconiumdichloride;
(Methyl)(3,3,3-trifluoropropyl)silanediylbis[2-t-butylmethyl-4-(4-trimethylsilyl-phenyl)-indenyl]zirconiumdichloride;
(Methyl)(3,3,3-trifluoropropyl)silanediylbis[2-t-butylmethyl-4-(4-adamantyl-phenyl)-indenyl]zirconiumdichloride;
(Methyl)(3,3,3-trifluoropropyl)silanediylbis[2-t-butylmethyl-4-(3-biphenyl)-indenyl]zirconiumdichloride;
(Methyl)(3,3,3-trifluoropropyl)silanediylbis[2-t-butylmethyl-4-(3,5-dimethyl-phenyl)-indenyl]zirconiumdichloride;
(Methyl)(3,3,3-trifluoropropyl)silanediylbis[2-t-butylmethyl-4-(3,5-di-(trifluoromethyl)-phenyl)-indenyl]zirconiumdichloride;
(Methyl)(3,3,3-trifluoropropyl)silanediylbis[2-t-butylmethyl-4-(3,5-terphenyl)-indenyl]zirconiumdichloride;
(Methyl)(3,3,3-trifluoropropyl)silanediylbis[2-cyclopentylmethyl-4-(1-naphthyl)-indenyl]zirconiumdichloride;
(Methyl)(3,3,3-trifluoropropyl)silanediylbis[2-cyclopentylmethyl-4-(2-naphthyl)-indenyl]zirconiumdichloride;
(Methyl)(3,3,3-trifluoropropyl)silanediylbis[2-cyclopentylmethyl-4-(4-methyl-phenyl)-indenyl]zirconiumdichloride;
(Methyl)(3,3,3-trifluoropropyl)silanediylbis[2-cyclopentylmethyl-4-(4-biphenyl)-indenyl]zirconiumdichloride;
(Methyl)(3,3,3-trifluoropropyl)silanediylbis[2-cyclopentylmethyl-4-(4-ethyl-phenyl)-indenyl]zirconiumdichloride;
(Methyl)(3,3,3-trifluoropropyl)silanediylbis[2-cyclopentylmethyl-4-(4-n-propyl-phenyl)-indenyl]zirconiumdichloride;
(Methyl)(3,3,3-trifluoropropyl)silanediylbis[2-cyclopentylmethyl-4-(4-i-propyl-phenyl)-indenyl]zirconiumdichloride;
(Methyl)(3,3,3-trifluoropropyl)silanediylbis[2-cyclopentylmethyl-4-(4-t-butyl-phenyl)-indenyl]zirconiumdichloride;
(Methyl)(3,3,3-trifluoropropyl)silanediylbis[2-cyclopentylmethyl-4-(4-sec-butyl-phenyl)-indenyl]zirconiumdichloride;
(Methyl)(3,3,3-trifluoropropyl)silanediylbis[2-cyclopentylmethyl-4-(4-cyclohexyl-phenyl)-indenyl]zirconiumdichloride;
(Methyl)(3,3,3-trifluoropropyl)silanediylbis[2-cyclopentylmethyl-4-(4-trimethylsilyl-phenyl)-indenyl]zirconiumdichloride;

(Methyl)(3,3,3-trifluoropropyl)silanediylbis[2-cyclopentyl-methyl-4-(4-adamantyl-phenyl)-indenyl]zirconiumdichloride;
(Methyl)(3,3,3-trifluoropropyl)silanediylbis[2-cyclopentyl-methyl-4-(3-biphenyl)-indenyl]zirconiumdichloride;
(Methyl)(3,3,3-trifluoropropyl)silanediylbis[2-cyclopentyl-methyl-4-(3,5-dimethyl-phenyl)-indenyl]zirconiumdichloride;
(Methyl)(3,3,3-trifluoropropyl)silanediylbis[2-cyclopentyl-methyl-4-(3,5-di-(trifluoromethyl)-phenyl)-indenyl]zirconiumdichloride;
(Methyl)(3,3,3-trifluoropropyl)silanediylbis[2-cyclopentyl-methyl-4-(3,5-terphenyl)-indenyl]zirconiumdichloride;
(Methyl)(3,3,3-trifluoropropyl)silanediylbis[2-cyclohexyl-methyl-4-(1-naphthyl)-indenyl]zirconiumdichloride;
(Methyl)(3,3,3-trifluoropropyl)silanediylbis[2-cyclohexyl-methyl-4-(2-naphthyl)-indenyl]zirconiumdichloride;
(Methyl)(3,3,3-trifluoropropyl)silanediylbis[2-cyclohexyl-methyl-4-(4-methyl-phenyl)-indenyl]zirconiumdichloride;
(Methyl)(3,3,3-trifluoropropyl)silanediylbis[2-cyclohexyl-methyl-4-(4-biphenyl)-indenyl]zirconiumdichloride;
(Methyl)(3,3,3-trifluoropropyl)silanediylbis[2-cyclohexyl-methyl-4-(4-ethyl-phenyl)-indenyl]zirconiumdichloride;
(Methyl)(3,3,3-trifluoropropyl)silanediylbis[2-cyclohexyl-methyl-4-(4-n-propyl-phenyl)-indenyl]zirconiumdichloride;
(Methyl)(3,3,3-trifluoropropyl)silanediylbis[2-cyclohexyl-methyl-4-(4-i-propyl-phenyl)-indenyl]zirconiumdichloride;
(Methyl)(3,3,3-trifluoropropyl)silanediylbis[2-cyclohexyl-methyl-4-(4-t-butyl-phenyl)-indenyl]zirconiumdichloride;
(Methyl)(3,3,3-trifluoropropyl)silanediylbis[2-cyclohexyl-methyl-4-(4-sec-butyl-phenyl)-indenyl]zirconiumdichloride;
(Methyl)(3,3,3-trifluoropropyl)silanediylbis[2-cyclohexyl-methyl-4-(4-cyclohexyl-phenyl)-indenyl]zirconiumdichloride;
(Methyl)(3,3,3-trifluoropropyl)silanediylbis[2-cyclohexyl-methyl-4-(4-trimethylsilyl-phenyl)-indenyl]zirconiumdichloride;
(Methyl)(3,3,3-trifluoropropyl)silanediylbis[2-cyclohexyl-methyl-4-(4-adamantyl-phenyl)-indenyl]zirconiumdichloride;
(Methyl)(3,3,3-trifluoropropyl)silanediylbis[2-cyclohexyl-methyl-4-(3-biphenyl)-indenyl]zirconiumdichloride;
(Methyl)(3,3,3-trifluoropropyl)silanediylbis[2-cyclohexyl-methyl-4-(3,5-dimethyl-phenyl)-indenyl]zirconiumdichloride;
(Methyl)(3,3,3-trifluoropropyl)silanediylbis[2-cyclohexyl-methyl-4-(3,5-di-(trifluoromethyl)-phenyl)-indenyl]zirconiumdichloride;
(Methyl)(3,3,3-trifluoropropyl)silanediylbis[2-cyclohexyl-methyl-4-(3,5-terphenyl)-indenyl]zirconiumdichloride;
(Methyl)(3,3,3-trifluoropropyl)silanediylbis[2-cycloheptyl-methyl-4-(1-naphthyl)-indenyl]zirconiumdichloride;
(Methyl)(3,3,3-trifluoropropyl)silanediylbis[2-cycloheptyl-methyl-4-(2-naphthyl)-indenyl]zirconiumdichloride;
(Methyl)(3,3,3-trifluoropropyl)silanediylbis[2-cycloheptyl-methyl-4-(4-methyl-phenyl)-indenyl]zirconiumdichloride;
(Methyl)(3,3,3-trifluoropropyl)silanediylbis[2-cycloheptyl-methyl-4-(4-biphenyl)-indenyl]zirconiumdichloride;
(Methyl)(3,3,3-trifluoropropyl)silanediylbis[2-cycloheptyl-methyl-4-(4-ethyl-phenyl)-indenyl]zirconiumdichloride;
(Methyl)(3,3,3-trifluoropropyl)silanediylbis[2-cycloheptyl-methyl-4-(4-n-propyl-phenyl)-indenyl]zirconiumdichloride;
(Methyl)(3,3,3-trifluoropropyl)silanediylbis[2-cycloheptyl-methyl-4-(4-i-propyl-phenyl)-indenyl]zirconiumdichloride;
(Methyl)(3,3,3-trifluoropropyl)silanediylbis[2-cycloheptyl-methyl-4-(4-t-butyl-phenyl)-indenyl]zirconiumdichloride;
(Methyl)(3,3,3-trifluoropropyl)silanediylbis[2-cycloheptyl-methyl-4-(4-sec-butyl-phenyl)-indenyl]zirconiumdichloride;
(Methyl)(3,3,3-trifluoropropyl)silanediylbis[2-cycloheptyl-methyl-4-(4-cyclohexyl-phenyl)-indenyl]zirconiumdichloride;
(Methyl)(3,3,3-trifluoropropyl)silanediylbis[2-cycloheptyl-methyl-4-(4-trimethylsilyl-phenyl)-indenyl]zirconiumdichloride;
(Methyl)(3,3,3-trifluoropropyl)silanediylbis[2-cycloheptyl-methyl-4-(4-adamantyl-phenyl)-indenyl]zirconiumdichloride;
(Methyl)(3,3,3-trifluoropropyl)silanediylbis[2-cycloheptyl-methyl-4-(3-biphenyl)-indenyl]zirconiumdichloride;
(Methyl)(3,3,3-trifluoropropyl)silanediylbis[2-cycloheptylmethyl-4-(3,5-dimethyl-phenyl)-indenyl]zirconiumdichloride;
(Methyl)(3,3,3-trifluoropropyl)silanediylbis[2-cycloheptyl-methyl-4-(3,5-di-(trifluoromethyl)-phenyl)-indenyl]zirconiumdichloride;
(Methyl)(3,3,3-trifluoropropyl)silanediylbis[2-cycloheptyl-methyl-4-(3,5-terphenyl)-indenyl]zirconiumdichloride;
(Methyl)(3,3,3-trifluoropropyl)silanediylbis[2-adamantylmethyl-4-(1-naphthyl)-indenyl]zirconiumdichloride;
(Methyl)(3,3,3-trifluoropropyl)silanediylbis[2-adamantylmethyl-4-(2-naphthyl)-indenyl]zirconiumdichloride;
(Methyl)(3,3,3-trifluoropropyl)silanediylbis[2-adamantylmethyl-4-(4-methyl-phenyl)-indenyl]zirconiumdichloride;
(Methyl)(3,3,3-trifluoropropyl)silanediylbis[2-adamantylmethyl-4-(4-biphenyl)-indenyl]zirconiumdichloride;
(Methyl)(3,3,3-trifluoropropyl)silanediylbis[2-adamantylmethyl-4-(4-ethyl-phenyl)-indenyl]zirconiumdichloride;
(Methyl)(3,3,3-trifluoropropyl)silanediylbis[2-adamantylmethyl-4-(4-n-propyl-phenyl)-indenyl]zirconiumdichloride;
(Methyl)(3,3,3-trifluoropropyl)silanediylbis[2-adamantylmethyl-4-(4-i-propyl-phenyl)-indenyl]zirconiumdichloride;
(Methyl)(3,3,3-trifluoropropyl)silanediylbis[2-adamantylmethyl-4-(4-t-butyl-phenyl)-indenyl]zirconiumdichloride;
(Methyl)(3,3,3-trifluoropropyl)silanediylbis[2-adamantylmethyl-4-(4-sec-butyl-phenyl)-indenyl]zirconiumdichloride;
(Methyl)(3,3,3-trifluoropropyl)silanediylbis[2-adamantylmethyl-4-(4-cyclohexyl-phenyl)-indenyl]zirconiumdichloride;
(Methyl)(3,3,3-trifluoropropyl)silanediylbis[2-adamantylmethyl-4-(4-trimethylsilyl-phenyl)-indenyl]zirconiumdichloride;
(Methyl)(3,3,3-trifluoropropyl)silanediylbis[2-adamantylmethyl-4-(4-adamantyl-phenyl)-indenyl]zirconiumdichloride;
(Methyl)(3,3,3-trifluoropropyl)silanediylbis[2-adamantylmethyl-4-(3-biphenyl)-indenyl]zirconiumdichloride;
(Methyl)(3,3,3-trifluoropropyl)silanediylbis[2-adamantylmethyl-4-(3,5-dimethyl-phenyl)-indenyl]zirconiumdichloride;

(Methyl)(3,3,3-trifluoropropyl)silanediylbis[2-adamantylm-
    ethyl-4-(3,5-di-(trifluoromethyl)-phenyl)-indenyl]zirco-
    niumdichloride;
(Methyl)(3,3,3-trifluoropropyl)silanediylbis[2-adamantylm-
    ethyl-4-(3,5-terphenyl)-indenyl]zirconiumdichloride;
(Methyl)(3,3,3-trifluoropropyl)silanediylbis[2-bicyclo
    [2.2.1]heptylmethyl-4-(1-naphthyl)-indenyl]zirconium-
    dichloride;
(Methyl)(3,3,3-trifluoropropyl)silanediylbis[2-bicyclo
    [2.2.1]heptylmethyl-4-(2-naphthyl)-indenyl]zirconium-
    dichloride;
(Methyl)(3,3,3-trifluoropropyl)silanediylbis[2-bicyclo
    [2.2.1]heptylmethyl-4-(4-methyl-phenyl)-indenyl]zirco-
    niumdichloride;
(Methyl)(3,3,3-trifluoropropyl)silanediylbis[2-bicyclo
    [2.2.1]heptylmethyl-4-(4-biphenyl)-indenyl]zirconium-
    dichloride;
(Methyl)(3,3,3-trifluoropropyl)silanediylbis[2-bicyclo
    [2.2.1]heptylmethyl-4-(4-ethyl-phenyl)-indenyl]zirconi-
    umdichloride;
(Methyl)(3,3,3-trifluoropropyl)silanediylbis[2-bicyclo
    [2.2.1]heptylmethyl-4-(4-n-propyl-phenyl)-indenyl]zir-
    coniumdichloride;
(Methyl)(3,3,3-trifluoropropyl)silanediylbis[2-bicyclo
    [2.2.1]heptylmethyl-4-(4-i-propyl-phenyl)-indenyl]zirco-
    niumdichloride;
(Methyl)(3,3,3-trifluoropropyl)silanediylbis[2-bicyclo
    [2.2.1]heptylmethyl-4-(4-t-butyl-phenyl)-indenyl]zirco-
    niumdichloride;
(Methyl)(3,3,3-trifluoropropyl)silanediylbis[2-bicyclo
    [2.2.1]heptylmethyl-4-(4-sec-butyl-phenyl)-indenyl]zir-
    coniumdichloride;
(Methyl)(3,3,3-trifluoropropyl)silanediylbis[2-bicyclo
    [2.2.1]heptylmethyl-4-(4-cyclohexyl-phenyl)-indenyl]
    zirconiumdichloride;
(Methyl)(3,3,3-trifluoropropyl)silanediylbis[2-bicyclo
    [2.2.1]heptylmethyl-4-(4-trimethylsilyl-phenyl)-indenyl]
    zirconiumdichloride;
(Methyl)(3,3,3-trifluoropropyl)silanediylbis[2-bicyclo
    [2.2.1]heptylmethyl-4-(4-adamantyl-phenyl)-indenyl]zir-
    coniumdichloride;
(Methyl)(3,3,3-trifluoropropyl)silanediylbis[2-bicyclo
    [2.2.1]heptylmethyl-4-(3-biphenyl)-indenyl]zirconium-
    dichloride;
(Methyl)(3,3,3-trifluoropropyl)silanediylbis[2-bicyclo
    [2.2.1]heptylmethyl-4-(3,5-dimethyl-phenyl)-indenyl]zir-
    coniumdichloride;
(Methyl)(3,3,3-trifluoropropyl)silanediylbis[2-bicyclo
    [2.2.1]heptylmethyl-4-(3,5-di-(trifluoromethyl)-phenyl)-
    indenyl]zirconiumdichloride;
(Methyl)(3,3,3-trifluoropropyl)silanediylbis[2-bicyclo
    [2.2.1]heptylmethyl-4-(3,5-terphenyl)-indenyl]zirconi-
    umdichloride;
Dimethylsilanediylbis[2-cyclohexylmethyl-4-(1-naphthyl)-
    6-methyl-indenyl]zirconiumdichloride;
Dimethylsilanediylbis[2-cyclohexylmethyl-4-(2-naphthyl)-
    6-methyl-indenyl]zirconiumdichloride;
Dimethylsilanediylbis[2-cyclohexylmethyl-4-(4-methyl-
    phenyl)-6-methyl-indenyl]zirconiumdichloride;
Dimethylsilanediylbis[2-cyclohexylmethyl-4-(4-biphenyl)-
    6-methyl-indenyl]zirconiumdichloride;
Dimethylsilanediylbis[2-cyclohexylmethyl-4-(4-ethyl-phe-
    nyl)-6-methyl-indenyl]zirconiumdichloride;
Dimethylsilanediylbis[2-cyclohexylmethyl-4-(4-n-propyl-
    phenyl)-6-methyl-indenyl]zirconiumdichloride;
Dimethylsilanediylbis[2-cyclohexylmethyl-4-(4-i-propyl-
    phenyl)-6-methyl-indenyl]zirconiumdichloride;
Dimethylsilanediylbis[2-cyclohexylmethyl-4-(4-t-butyl-
    phenyl)-6-methyl-indenyl]zirconiumdichloride;
Dimethylsilanediylbis[2-cyclohexylmethyl-4-(4-sec-butyl-
    phenyl)-6-methyl-indenyl]zirconiumdichloride;
Dimethylsilanediylbis[2-cyclohexylmethyl-4-(4-cyclo-
    hexyl-phenyl)-6-methyl-indenyl]zirconiumdichloride;
Dimethylsilanediylbis[2-cyclohexylmethyl-4-(4-trimethyl-
    silyl-phenyl)-6-methyl-indenyl]zirconiumdichloride;
Dimethylsilanediylbis[2-cyclohexylmethyl-4-(4-adamantyl-
    phenyl)-6-methyl-indenyl]zirconiumdichloride;
Dimethylsilanediylbis[2-cyclohexylmethyl-4-(3-biphenyl)-
    6-methyl-indenyl]zirconiumdichloride;
Dimethylsilanediylbis[2-cyclohexylmethyl-4-(3,5-dim-
    ethyl-phenyl)-6-methyl-indenyl]zirconiumdichloride;
Dimethylsilanediylbis[2-cyclohexylmethyl-4-(3,5-di-(trif-
    luoromethyl)-phenyl)-6-methyl-indenyl]zirconium-
    dichloride;
Dimethylsilanediylbis[2-cyclohexylmethyl-4-(3,5-terphe-
    nyl)-6-methyl-indenyl]zirconiumdichloride;
Dimethylsilanediylbis[2-cyclohexylmethyl-4-(1-naphthyl)-
    7-methyl-indenyl]zirconiumdichloride;
Dimethylsilanediylbis[2-cyclohexylmethyl-4-(2-naphthyl)-
    7-methyl-indenyl]zirconiumdichloride;
Dimethylsilanediylbis[2-cyclohexylmethyl-4-(4-methyl-
    phenyl)-7-methyl-indenyl]zirconiumdichloride;
Dimethylsilanediylbis[2-cyclohexylmethyl-4-(4-biphenyl)-
    7-methyl-indenyl]zirconiumdichloride;
Dimethylsilanediylbis[2-cyclohexylmethyl-4-(4-ethyl-phe-
    nyl)-7-methyl-indenyl]zirconiumdichloride;
Dimethylsilanediylbis[2-cyclohexylmethyl-4-(4-n-propyl-
    phenyl)-7-methyl-indenyl]zirconiumdichloride;
Dimethylsilanediylbis[2-cyclohexylmethyl-4-(4-i-propyl-
    phenyl)-7-methyl-indenyl]zirconiumdichloride;
Dimethylsilanediylbis[2-cyclohexylmethyl-4-(4-t-butyl-
    phenyl)-7-methyl-indenyl]zirconiumdichloride;
Dimethylsilanediylbis[2-cyclohexylmethyl-4-(4-sec-butyl-
    phenyl)-7-methyl-indenyl]zirconiumdichloride;
Dimethylsilanediylbis[2-cyclohexylmethyl-4-(4-cyclo-
    hexyl-phenyl)-7-methyl-indenyl]zirconiumdichloride;
Dimethylsilanediylbis[2-cyclohexylmethyl-4-(4-trimethyl-
    silyl-phenyl)-7-methyl-indenyl]zirconiumdichloride;
Dimethylsilanediylbis[2-cyclohexylmethyl-4-(4-adamantyl-
    phenyl)-7-methyl-indenyl]zirconiumdichloride;
Dimethylsilanediylbis[2-cyclohexylmethyl-4-(3-biphenyl)-
    7-methyl-indenyl]zirconiumdichloride;
Dimethylsilanediylbis[2-cyclohexylmethyl-4-(3,5-dim-
    ethyl-phenyl)-7-methyl-indenyl]zirconiumdichloride;
Dimethylsilanediylbis[2-cyclohexylmethyl-4-(3,5-di-(trif-
    luoromethyl)-phenyl)-7-methyl-indenyl]zirconium-
    dichloride;
Dimethylsilanediylbis[2-cyclohexylmethyl-4-(3,5-terphe-
    nyl)-7-methyl-indenyl]zirconiumdichloride,
as well as the analogous zirconiumdimethyl-compounds and
zirconium-biphenolates and zirconium-bisphenolates.

Instead of the preferred pure chiral bridged racemic or
pseudoracemic metallocene compounds of formulas 1 and
1a, mixtures of the metallocenes of formulas 1 and 1a and the
corresponding meso or pseudomeso metallocenes may be
used in the catalyst preparation. However, the preparation of
the isomerically pure racemic form is especially preferred for
the use of metallocenes in the polymerization of olefins to
isotactic polyolefins, since the corresponding meso form may
produce undesired atactic polypropylene ("PP"). The "iso-
merically pure" racemic form is understood to mean a rac:
meso ratio of greater than 5:1 preferably of at least 10:1, more
preferred of at least 15:1 and most preferred of at least 20:1.

As used herein the term "racemic" (or "rac") includes
"pseudoracemic" (or "pseudorac"), and the term "meso"
includes "pseudomeso."

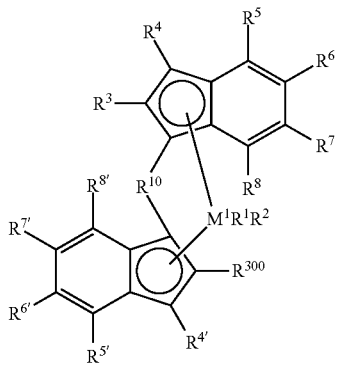

rac/pseudoracemic isomer

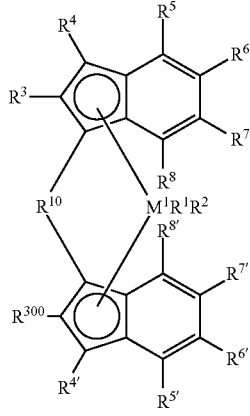

meso/pseudomeso isomer

The present invention also includes a process for producing the transition-metal compounds of formulas 1 and 1a of the invention.

An object of the invention is thus a process for producing compounds of formula 1a, (Formula 1a)

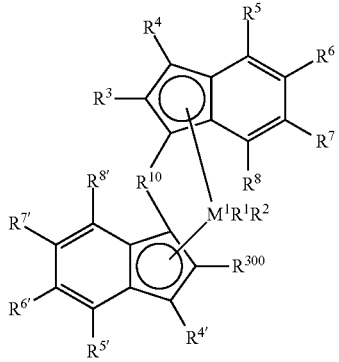

in which the variables R and $M^1$ have the meaning specified above, including the preferred embodiments, comprising the steps of:

a) Deprotonation of the compound of formula 2:

(Formula 2)

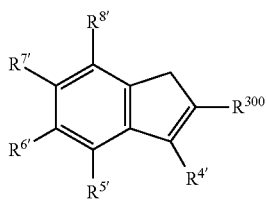

with a base, in which $R^{300}$, $R^{4'}$, $R^{5'}$, $R^{6'}$, $R^{7'}$, and $R^{8'}$ have the meaning specified above.

b) If $R^{10}$ has the meaning $M^{12}R^{40}R^{41}$, where $M^{12}$, $R^{40}$, $R^{41}$ have the meanings specified above, then the further production proceeds by the reaction of the deprotonated compounds from step (a) with $R^{40}R^{41}M^{12}X_2$ to form the compound of formula 3 or formula 4, depending on the quantitative proportions used, where $R^{40}$, $R^{41}$, and $M^{12}$ have the meanings specified above, and X may be the same or different and means a halogen atom, preferably chlorine, bromine, or iodine, or another leaving group, preferably triflate, tosylate, or mesylate.

(Formula 3)

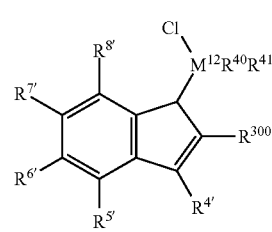

(Formula 4)

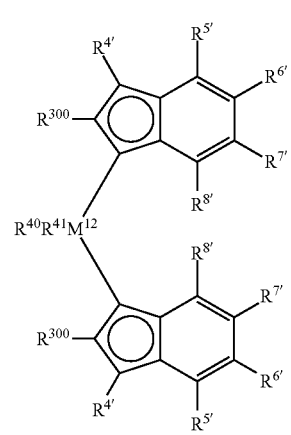

c) After the production of chlorosilane indenes or chlorogermane indenes of formula 3, these are reacted with a metal-indene compound of formula 5

(Formula 5)

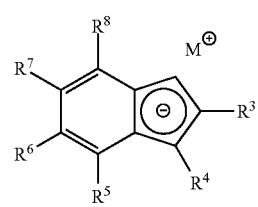

in which M stands for Li, Na, or K, and $R^3$, $R^4$, $R^5$, $R^6$, $R^7$, and $R^8$ have the meanings specified above, to obtain the compound of formula 6.

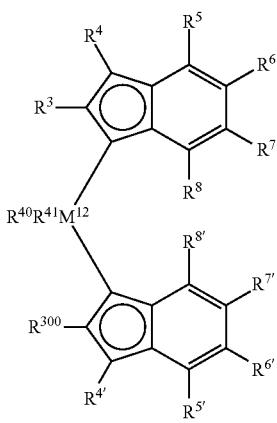

(Formula 6)

d) Reaction of the compound of formula 4 or 6 with a base and addition of $M^1Cl_4$, in which $M^1$ stands for zirconium, titanium, or hafnium, to form the compound of formula 1a.

In step (a), the compound of formula 2, for example, 2-(cyclohexylmethyl)-7-(4'-tert-butylphenyl)indene in an inert solvent, which consists of one or more aromatic or aliphatic hydrocarbons and/or one or more polar, aprotic solvents, is deprotonated with a strong base, for example, n-butyllithium. The deprotonation is carried out at temperatures of −70° C. to 80° C., and preferably 0° C. to 80° C. The resulting metal salt is then reacted directly, without further isolation, in step (b) with a silicon compound or germanium compound that contains two leaving groups. Preferential production of the compound of formula 3 or the compound of formula 4 can be achieved by adjustment of the quantitative proportions. Compounds of formula 3 are reacted in step (c) with a metal-indenyl compound of formula 5. In the following step (d), the bis(indenyl)silanes of formula 4 or 6 are doubly deprotonated with a strong base, such as n-butyllithium, in an inert solvent, which consists of one or more aromatic or aliphatic hydrocarbons and/or one or more polar, aprotic solvents, and the bislithium salt formed in this way is reacted, without isolation, directly with a source of Ti, Zr, or Hf to obtain the compound of formula 1a. The deprotonation is carried out at temperatures of −70° C. to 80° C., and preferably 0° C. to 80° C. Depending on the nature of the ligand system of formula 4 or 6, the metallocenes are isolated directly from the reaction mixture with rac:meso ratios or pseudo-rac:meso ratios of greater than 5:1 preferably of at least 10:1, more preferred of at least 15:1 and most preferred of at least 20:1 or further rac:meso separation steps have to be applied to reach rac:meso ratios or pseudo-rac:meso ratios of at least 5:1 preferably of at least 10:1, more preferred of at least 15:1 and most preferred of at least 20:1 to obtain a suitable catalyst.

In FIG. 1, the individual steps of the process of the invention for producing transition-metal compounds of formulas 1a are shown once again for the example of a preferred embodiment.

In addition, the present invention relates to a catalyst system comprising at least one compound of formulas 1 or 1a and at least one cocatalyst.

A suitable cocatalyst component which may be present according to the present invention in the catalyst system comprises at least one compound of the type of an aluminoxane, a Lewis acid or an ionic compound which reacts with a metallocene to convert the latter into a cationic compound.

Aluminoxanes are oligomeric or polymeric aluminum oxy compounds, which may exist in the form of linear, cyclic, caged or polymeric structures. Although the exact structure(s) of aluminoxanes is still unknown, it is well accepted that alkylaluminoxanes have the general formula 7.

(Formula 7).

Examples for cyclic, linear or cage structures of aluminoxanes are depicted in the formulas 8, 9 and 10:

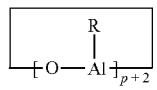

(Formula 8)

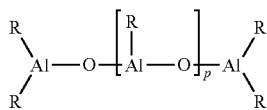

(Formula 9)

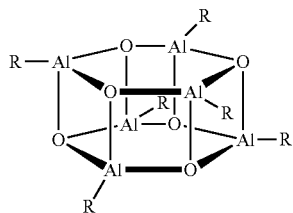

(Formula 10)

The radicals R in the formulas (7), (8), (9) and (10) can be identical or different and are each a $C_1$-$C_{20}$ group such as an alkyl group of from 1 to about 6 carbon atoms, an aryl group of from 6 to about 18 carbon atoms, benzyl or hydrogen and p is an integer from 2 to 50, preferably from 10 to 35.

Preferably, the radicals R are identical and are methyl, isobutyl, n-butyl, phenyl or benzyl, particularly preferably methyl.

If the radicals R are different, they are preferably methyl and hydrogen, methyl and isobutyl or methyl and n-butyl, with hydrogen, isobutyl or n-butyl preferably being present in a proportion of from 0.01 to 40% (number of radicals R).

The aluminoxane can be prepared in various ways by known methods. One of the methods comprises the reaction of an aluminum-hydrocarbon compound and/or a hydridoaluminum-hydrocarbon compound with water, which may be gaseous, solid, liquid or bound as water of crystallization, in an inert solvent such as toluene. To prepare an aluminoxane having different alkyl groups R, two different trialkylaluminums ($AlR_3$+$AlR'_3$) corresponding to the desired composition and reactivity are reacted with water, cf. S. Pasynkiewicz, Polyhedron 9 (1990) 429 and EP-A-0 302 424.

Regardless of the method of preparation, all aluminoxane solutions have in common a variable content of unreacted aluminum starting compound which is present in free form or as an adduct.

Furthermore, instead of the aluminoxane compounds of the formulas 7, 8, 9 or 10, it is also possible to use modified aluminoxanes in which the hydrocarbon radicals or hydrogen atoms have been partly replaced by alkoxy, aryloxy, siloxy or amide radicals.

The amounts of aluminoxane and metallocene used in the preparation of the supported catalyst system can be varied within a wide range. However, it has been found to be advantageous to use the metallocene compound of formulas 1 or 1a and the aluminoxane compounds in such amounts that the atomic ratio of aluminum from the aluminoxane compounds to the transition metal from the metallocene compound is in the range from 10:1 to 1000:1, preferably from 20:1 to 500:1 and in particular in the range from 30:1 to 400:1. In the case of methylaluminoxane, preference is given to using ≧30% strength toluene solutions, but the use of 10% strength solutions is also possible.

As Lewis acid, preference is given to using compounds of the formula 11

$$M^2X^1X^2X^3 \qquad \text{(Formula 11)}$$

where $M^2$ is an element of Group 13 of the Periodic Table of Elements, in particular B, Al or Ga, preferably B or Al, $X^1$, $X^2$ and $X^3$ are the same or different and each are a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for $X^1$, $X^2$ and $X^3$ are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl.

Preferred Lewis acids are trimethylaluminum, triethylaluminum, triisobutylaluminum, tributylaluminum, trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl) borane, tris(tolyl)borane, tris(3,5-dimethyl-phenyl)borane, tris(3,5-difluorophenyl)borane and/or tris(3,4,5-trifluorophenyl)borane.

Particular preference is given to tris(pentafluorophenyl) borane.

As ionic cocatalysts, preference is given to using compounds which contain a non-coordinating anion such as tetrakis(pentafluorophenyl)borate, tetraphenylborate $SbF_6^-$, $CF_3SO_3^-$ or $ClO_4^-$. Suitable counterions are either Lewis acid or Broenstedt acid cation.

As Broensted acids, particular preference is given to protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium, N,N-dimethylbenzylammonium, N,N-dimethylcyclohexylammonium, Suitable Lewis-acid cations are cations of the formula 12

$$[(Y^{a+})Q_1Q_2\ldots Q_z]^{d+} \qquad \text{(Formula 12)}$$

where Y is an element of Groups 1 to 16 of the Periodic Table of the Elements, $Q_1$ to Q are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, cycloalkyl groups of from 3 to about 10 carbon atoms, which may in turn bear alkyl groups of from 1 to about 10 carbon atoms as substitutents, halogen, alkoxy groups of from 1 to 28 carbon atoms, aryloxy groups of from 6 to 15 carbon atoms, silyl or mercaptyl groups.

a is an integer from 1-6,
z is an integer from 0 to 5 and
d corresponds to the difference a-z, but d is larger than or equal to 1

Particularly suitable cations are carbonium cations such as triphenylcarbenium, oxonium cations, sulfonium cations such as tetrahydrothiophenium, phosphonium cations such as triethylphosphonium, triphenylphosphonium and diphenylphosphonium, and also cationic transition metal complexes such as the silver cation and the 1,1'-dimethylferrocenium cation.

Preferred ionic compounds which can be, used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tributylammoniumtetra(pentaffluorophenyl)aluminate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate
N,N-dimethylaniliniumtetra(phenyl)borate,
N,N-diethylaniliniumtetra(phenyl)borate,
N,N-dimethylaniliniumtetrakis(pentafluorophenyl)borate,
N,N-dimethylaniliniumtetrakis(pentafluorophenyl)aluminate,
di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
triphenylcarbeniumtetrakis(pentafluorophenyl)aluminate,
triphenylcarbeniumtetrakis(phenyl)aluminate,
ferroceniumtetrakis(pentafluorophenyl)borate and/or
ferroceniumtetraki s(pentafluorophenyl)aluminate, Preference is given to triphenylcarbeniumtetrakis(pentafluorophenyl)borate, N,N-dimethylcyclohexylammoniumtetrakis(pentafluorophenyl)borate or N,N-dimethylbenzylammoniumtetrakis(pentafluorophenyl)borate.

It is also possible to use mixtures of all of the above and below mentioned cation-forming compounds. Preferred mixtures comprise aluminoxanes and an ionic compound, and/or a Lewis acid.

Other useful cocatalyst components are likewise borane or carborane compounds such as
7,8-dicarbaundecaborane(13),
undecahydrido-7,8-dimethyl-7,8-dicarbaundecaborane,
dodecahydrido-1-phenyl-1,3-dicarbanonaborane,
tri(butyl)ammoniumun decahydrido-8-ethyl-7,9-dicarbaundecaborate,
4-carbanonaborane(14),
bis(tri(butyl)ammonium)nonaborate,
bis(tri(butyl)ammonium)undecaborate,
bis(tri(butyl)ammonium)dodecaborate,
bis(tri(butyl)ammonium)decachlorodecaborate,
tri(butyl)ammonium-1-carbadecaborate,
tri(butyl)ammonium-1-carbadodecaborate,
tri(butyl)ammonium-1-trimethylsilyl-1-carbadecaborate,
tri(buyl)ammoniumbis(nonahydrido-1,3-dicarbanonaborato)cobaltate(III),
tri(butyl)ammonium bis(undecahydrido-7,8-dicarbaundecaborato)ferrate(III).

The amount of Lewis acids or ionic compounds having Lewis-acid or Broensted-acid cations is preferably from 0.1 to 20 equivalents, preferably from 1 to 10 equivalents, based on the metallocene compound of the formulas 1 or 1a.

Combinations of at least one Lewis base with bimetallic compounds of the type $R_i^{17}M^3(\text{—O-}M^3R_j^{18})_v$ or $R_i^{18}M^3(\text{—O-}M^3R_j^{17})_v$ (formula 13), as described in Patent Application WO 99/40129, are likewise important as cocatalyst systems.

In this regard, $R^{17}$ and $R^{18}$ are the same or different and represent a hydrogen atom, a halogen atom, a $C_1$-$C_{40}$ carbon-containing group, especially an alkyl group of from 1 to about 20 carbon atoms, haloalkyl of from 1 to about 20 carbon atoms, alkoxy of from 1 to about 10 carbon atoms, aryl of from 6 to about 20 carbon atoms, haloaryl of from 6 to about 20 carbon atoms, aryloxy of from 6 to about 20 carbon atoms, arylalkyl of from 7 to about 40 carbon atoms, haloarylalkyl of from 7 to about 40 carbon atoms, alkylaryl of from 7 to about 40 carbon atoms, or haloalkylaryl of from 7 to about 40 carbon atoms. $R^{17}$ may also be an —$OSiR^{51}_3$ group, in which the $R^{51}$ groups are the same or different and have the same meaning as $R^{17}$, $M^3$ is the same or different and represents an element of main group III of the periodic table of elements, i, j, and v each stands for a whole number 0, 1, or 2, and i+j+v is not equal to 0.

Preferred cocatalyst systems are the compounds of formulas (A) and (B)

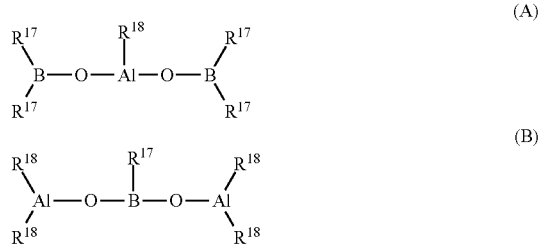

where $R^{17}$ and $R^{18}$ have the same meaning as specified above.

Furthermore, compounds that are generally to be regarded as preferred are those formed by the reaction of at least one compound of formulas (C) and/or (D) and/or (E) with at least one compound of formula (F).

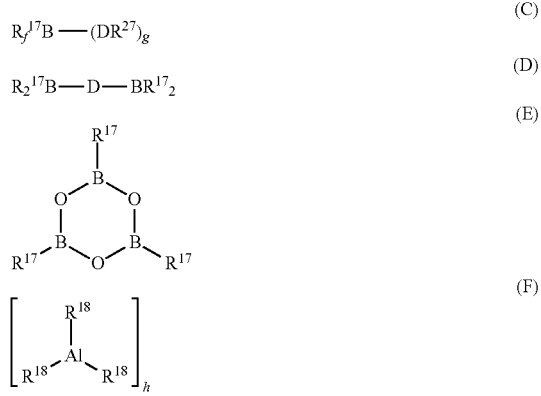

in which
$R^{27}$ may be a hydrogen atom or a boron-free $C_1$-$C_{40}$ carbon-containing group, such as an alkyl of from 1 to about 20 carbon atoms, aryl of from 6 to about 20 carbon atoms, arylalkyl of from 7 to about 40 carbon atoms, and alkylaryl of from 7 to about 40 carbon atoms, and in which $R^{17}$, $R^{18}$ have the same meaning as specified above, D is an element of main Group VI of the periodic table of elements or an $NR^{61}$ group, where $R^{61}$ is a hydrogen atom or a $C_1$-$C_{20}$ hydrocarbon group, such as alkyl of from 1 to about 20 carbon atoms or aryl of from 6 to about 20 carbon atoms, f is a whole number from 0 to 3, g is a whole number from 0 to 3 where f+g corresponds to the valency of Boron, and h is a whole number from 1 to 10.

The bimetallic compounds of formula 13 are possibly combined with an organometallic compound of formula 14, i.e., $[M^4R^{19}_q]_k$, in which $M^4$ is an element of main Group I, II, or III of the periodic table of the elements, $R^{19}$ is the same or different and represents a hydrogen atom, a halogen atom, a $C_1$-$C_{40}$ carbon-containing group, an alkyl group of from 1 to about 20 carbon atoms, an aryl group of from about 6 to about 40 carbon atoms, arylalkyl of from 7 to about 40 carbon atoms, and alkylaryl of from 7 to about 40 carbon atoms, q is a whole number from 1 to 3, and k is a whole number from 1 to 4.

The organometallic compounds of formula 14 are preferably neutral Lewis acids, in which $M^4$ stands for lithium, magnesium, and/or aluminum, especially aluminum. Examples of preferred organometallic compounds of formula 14 are trimethylaluminum, triethylaluminum, triisopropylaluminum, trihexylaluminum, trioctylaluminum, tri-n-butylaluminum, tri-n-propylaluminum, triisoprene aluminum, dimethyl aluminum monochloride, aluminum monochloride, diisobutyl aluminum monochloride, methyl aluminum sesquichloride, ethyl aluminum sesquichloride, dimethyl aluminum hydride, aluminum hydride, diisopropyl aluminum hydride, dimethyl aluminum(trimethylsiloxide), dimethyl aluminum(triethylsiloxide), phenylalan, pentafluorophenylalan, and o-tolylalan.

The catalyst system of the invention contains an organoboroaluminum compound, which contains units of formula 13, as the cocatalytically active chemical compound. Compounds of formula 13 in which $M^3$ stands for boron or aluminum are preferred. The compounds that contain units of formula 13 may be present as monomers or as linear, cyclic, or cage-like oligomers. Two or more chemical compounds that contain units of formula 13 may also form dimers, trimers, or higher combinations among themselves by Lewis acid-base interactions.

Preferred cocatalytically active bimetallic compounds correspond to formulas 15 and 16,

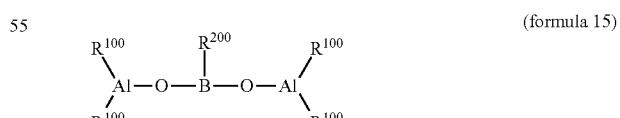

(formula 15)

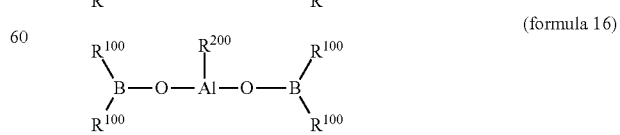

(formula 16)

in which $R^{100}$ and $R^{200}$ have the same meaning as the substituents $R^{17}$ and $R^{18}$ in formula 13.

Examples of the cocatalytically active compounds of formulas 15 and 16 are

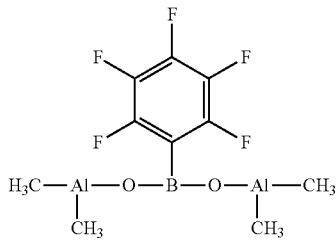

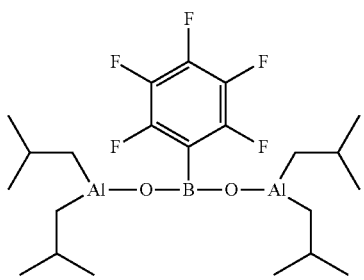

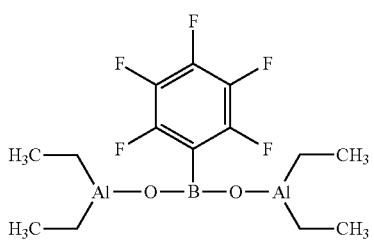

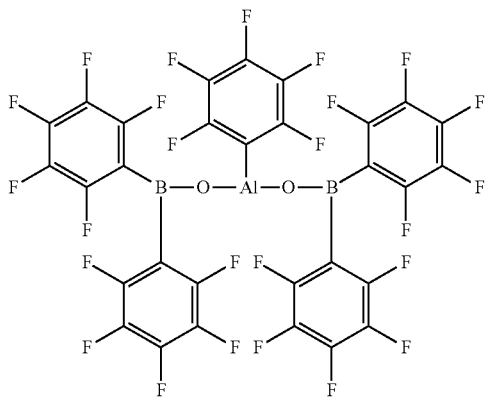

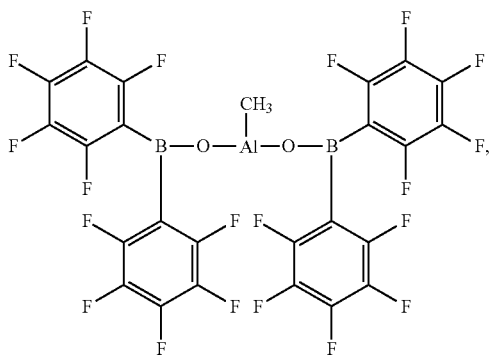

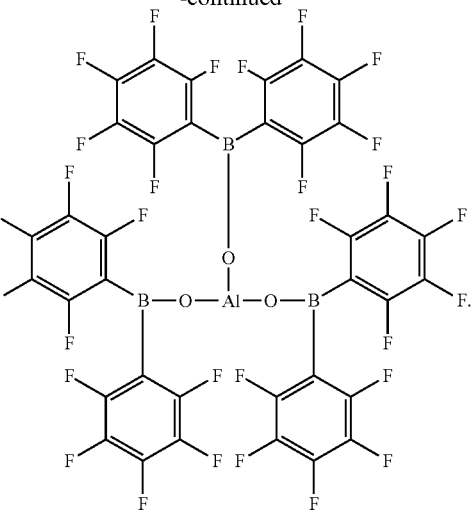

The compounds named in EP-A-924,223, DE 196 22 207.9, EP-A-601,830, EP-A-824,112, EP-A-824,113, WO 99/06,414, EP-A-811,627, WO 97/11,775, DE 196 06 167.9 and DE 198 04 970 can be used as additional cocatalysts, which may be present in unsupported or supported form.

The amount of cocatalysts of formula 13 and/or 15 and/or 16 used in the catalyst of the present invention can vary from 0.1 to 500 equivalents, preferably from 1 to 300 equivalents, most preferably from 5 to 150 equivalents, based on the used amount of metallocene compound of the formulas 1 or 1a.

The catalyst system of the present invention can further comprise, as additional component, a metal compound of the formula 17, $$M^5(R^{22})_r(R^{23})_s(R^{24})_t \qquad \text{(Formula 17)}$$

wherein
$M^5$ is an alkali, an alkali earth metal or a metal of Group 13 of the Periodic Table of the Elements,
$R^{22}$ is a hydrogen atom, alkyl of from 1 to about 10 carbon atoms, aryl of from 6 to about 15 carbon atoms, or alkylaryl or arylalkyl each having from 1 to 10 carbon atoms in the alkyl part and from 6 to 20 carbon atoms in the aryl part,
$R^{23}$ and $R^{24}$ are each a hydrogen atom, a halogen atom, alkyl of from 1 to about 10 carbon atoms, $C_6$-$C_{15}$-aryl of from about 6 to about 15 carbon atoms, or alkylaryl, arylalkyl or alkoxy each having from 1 to 10 carbon atoms in the alkyl part and from 6 to 20 carbon atoms in the aryl radical,
r is an integer from 1 to 3 and s and t are integers from 0 to 2, where the sum r+s+t corresponds to the valency of $M^5$,
where this component is not identical with the above mentioned cocatalyst compounds. It is also possible to use mixtures of various metal compounds of the formula 17.

Among the metal compounds of the formula 17 preference is given to those in which $M^5$ is lithium, magnesium or aluminum and $R^{23}$ and $R^{24}$ are each alkyl of from 1 to about 10 carbon atoms. Particularly preferred metal compounds of the formula 17 are n-butyllithium, n-butyl-n-octyl-magnesium, n-butyl-n-heptylmagnesium, tri-n-hexylaluminum, triisobutylaluminum, triethylaluminum, trimethylaluminum or mixtures thereof.

If a metal compound of the formula 17 is used, it is preferably present in the catalyst system in such an amount that the molar ratio of $M^5$ to the transition metal from the metallocene compound of formulas 1 or 1a is from 800:1 to 1:1, in particular from 200:1 to 2:1.

The support component of the catalyst system of the present invention can be any organic or inorganic inert solid or a mixture of such solids, in particulate porous solids such as hydrotalcites, talc, inorganic oxides and finely divided polymer powders.

Suitable inorganic oxides, which are preferably employed include from the Periodic Table of Elements Groups 1, 2, 3, 4, 5, 12, 13 and 14, metal oxides such as silicon dioxide, aluminum oxide, aluminosilicates, zeolites, MgO, $ZrO_2$, $TiO_2$ or $B_2O_3$, CaO, ZnO, $ThO_2$, $Na_2O$, $K_2O$, $LiO_2$ or mixed oxides like Al/Si oxides, Mg/Al oxides or Al/Mg/Si oxides. Other suitable inorganic support materials are $Na_2CO_3$, $K_2CO_3$, $CaCO_3$, $MgCl_2$, $Na_2SO_4$, $Al_2(SO_4)_3$, $BaSO_4$, $KNO_3$, $Mg(NO_3)_2$ and $Al(NO_3)_3$.

Suitable polymer powders are homopolymers, copolymers, crosslinked polymers or polymer blends. Examples of such polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The preferred support materials have a specific surface area in the range from 10 to 1000 $m^2/g$, a pore volume in the range from 0.1 to 5 $cm^3/g$ and a mean particle size of from 1 to 500 μm. Preference is given to supports having a specific surface area in the range from 50 to 500 $m^2/g$, a pore volume in the range from 0.5 to 3.5 $cm^3/g$ and a mean particle size in the range from 5 to 250 μm. Particular preference is given to supports having a specific surface area in the range from 200 to 400 $m^2/g$, a pore volume in the range from 0.8 to 3.0 $cm^3/g$ and a mean particle size of from 10 to 100 μm.

The support materials can be thermally and/or chemically be pretreated in order to adjust certain properties of the carrier such as the water and/or the hydroxyl group content.

If the support material has a low moisture content or residual solvent content, dehydration or drying before use can be omitted. If this is not the case, as when using silica gel as support material, dehydration or drying is advisable. Thermal dehydration or drying of the support material can be carried out under reduced pressure with or without simultaneous inert gas blanketing (nitrogen). The drying temperature is in the range from 80° C. to 1000° C., preferably from 150° C. to 800° C. and most preferred from 150° C. to 400° C. The duration of the drying process can be from 1 to 24 hours. But shorter or longer drying periods are also possible.

In a preferred embodiment of the present invention, support materials with a weight loss on dryness (LOD) of 0.5 wt. % or less, and even more preferred with a LOD of 0.3 wt % or less are used. Higher amounts of physically adsorbed water up to 1 wt % are possible, but result in reduced catalyst activities. The loss on ignition (LOI) of the support material is preferably 1 wt % or greater or even more preferred between 1.5 and 3.5 wt %. The weight loss on dryness (LOD) is thereby defined as the weight loss between room temperature and 300° C. and the weight loss on ignition (LOI) as the weight loss between 300° C. and 1000° C.

In addition or alternatively, dehydration or drying of the support material can also be carried out by chemical means, by reacting the adsorbed water and/or the surface hydroxyl groups with suitable passivating agents. Reaction with the passivating reagent can convert the hydroxyl groups completely or partially into a form, which does not show any adverse interaction with the catalytically active centers. Suitable passivating agents are silicon halides, silanes or amines, eg. silicon tetrachloride, chlorotrimethylsilane, dichlorodialkylsilanes, dimethylaminotrichlorosilane, N,N-dimethylanilin or N,N-dimethylbenzylamine or organometallic compounds of aluminum, boron and magnesium, eg. aluminoxanes, trimethylaluminum, triethylaluminum, triisobutylaluminum, diisobutylaluminum hydride, triethylborane or dibutylmagnesium.

As outlined above, organic support materials such as finely divided polymer powders, can also be used and should, before use, likewise be freed from any adhering moisture, solvent residues or other impurities by means of appropriate purification and drying operations.

Preference is given to using silica gels having the defined parameters as support materials. Spray dried silica grades, which inherently exhibit meso and macro pores, cavities and channels are preferred over granular silica grades.

The supported catalyst system according to this invention can be made in various ways.

In one embodiment of the present invention, at least one of the above-described metallocene components of formulas 1 or 1a is brought into contact in a suitable solvent with at least one cocatalyst component, preferably giving a soluble reaction product, an adduct or a mixture. The obtained composition is mixed with the dehydrated or passivated support material, the solvent is removed and the resulting supported metallocene catalyst system is dried to ensure that the solvent is completely or mostly removed from the pores of the support material. The supported catalyst is obtained as a free-flowing powder.

As an example, the process for preparing a free-flowing and, if desired, prepolymerized supported catalyst system comprises the following steps:

a) preparing a metallocene/cocatalyst mixture in a suitable solvent or suspension medium, where the metallocene component has one of the above-described structures, b) applying the metallocene/cocatalyst mixture to a porous, preferably inorganic, if necessary thermally or chemically pretreated support, c) removing the major part of solvent from the resulting mixture, d) isolating the supported catalyst system and e) if desired, prepolymerizing the resulting supported catalyst system with one or more olefinic monomer(s), to obtain a prepolymerized supported catalyst system.

In another embodiment of this invention the metallocene/cocatalyst composition is mixed with the dehydrated or passivated support material, the supported catalyst is recovered and optionally washed with an aromatic hydrocarbon and/or paraffinic hydrocarbon solvent. The isolated catalyst is then dispersed in a non-reactive suspension media such as a paraffinic hydrocarbon solvent, a mineral oil or a wax of mixtures thereof.

In a further embodiment of this invention the catalyst is prepared according to the procedure disclosed in WO 06/60544, WO 00/05277 and WO 98/01481.

As an example, in WO 06/60544, a free flowing and, if desired, prepolymerized supported catalyst system is prepared comprising the following steps:

a) contacting at least one support material with a first portion of at least one co-catalyst in a suitable solvent b) impregnating the co-catalyst loaded support with a suspension or solution, which comprises at least one metallocene and a second portion of at least one co-catalyst in a suitable solvent c) isolating the supported catalyst system and f) if desired, prepolymerizing the resulting supported catalyst system with one or more olefinic monomer(s), to obtain a prepolymerized supported catalyst system.

Thus, as an example, the process according to WO 06/60544 for preparing a free-flowing and, if desired, prepolymerized supported catalyst system comprises the following steps:

a) Contacting a support material with a first composition which includes at least one aluminoxane in a first solvent at a temperature of about 10 to 30° C. followed by keeping the mixture at about 20° C. for 0 to 12 hours, subsequently heating the resulting mixture to a temperature of 30 to 200° C. and keeping the mixture at 30 to 200° C. for 30 minutes to 20 hours, optionally followed by removing all or part of the first solvent and/or optionally followed by one or more washing step(s) using a suitable solvent, b) Suspending and/or dissolving, respectively, at least one metallocene of formula 1 and/or 1a and a second portion of an aluminoxane or of a mixture of aluminoxanes or of an ionic compound and/or a Lewis acid in a second solvent or suspension medium at a temperature of 0 to 100° C., optionally followed by a preactivation time of 1 minute to 200 hours at a temperature of 10 to 100°, c) Applying the mixture prepared in b) to the aluminoxane loaded support material produced in a), at a temperature of 10 to 100° C. and a contact time of 1 minute to 24 hours, d) Removing the major part of the solvent from the resulting mixture and optionally washing the resulting supported catalyst with a suitable solvent, e) Isolating the supported catalyst system and f) Optionally prepolymerizing the resulting supported catalyst system with one or more olefinic monomer(s), to obtain a prepolymerized supported catalyst system.

More specifically, as an example, the process according to WO 06/60544 for preparing a free-flowing and, if desired, prepolymerized supported catalyst system comprises the following steps:

the process for preparing a free-flowing supported catalyst system according to the present invention comprises the following steps:

a) Contacting a support material with a first composition which includes at least 5 mmol of an aluminoxane or of a mixture of aluminoxanes per g support material in a first solvent at a temperature of about 20° C. followed by keeping the mixture at about 20° C. for 0.15 to 2 hours, subsequently heating the resulting mixture to a temperature of 50 to 160° C. and keeping the mixture at 50 to 160° C. for 1 to 6 hours, optionally followed by removing all or part of the first solvent and/or optionally followed by one or more washing step(s) using a suitable solvent, b) Suspending and/or dissolving, respectively, at least 0.5 mmole of a second portion of an aluminoxane or of a mixture of aluminoxanes per g support material and at least 0.1 mol % of the employed second portion of an aluminoxane or of a mixture of aluminoxanes per g support material of at least one metallocene of formula 1 and/or 1a in a second solvent or suspension medium at a temperature of 20 to 50° C., optionally followed by a preactivation time of 1 minute to 200 hours at a temperature of 20 to 30°, c) Applying the mixture prepared in b) to the aluminoxane loaded support material produced in a), at a temperature of 10 to 100° C. and a contact time of 1 minute to 24 hours, d) Removing the major part of the solvent from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a preferred embodiment, as an example, the process according to WO 06/60544 for preparing a free-flowing and, if desired, prepolymerized supported catalyst system comprises the following steps:

a) Contacting an optionally thermally pretreated silica support material with at least 10 mmol of an aluminoxane per g support material in toluene at a temperature of about 20° C. followed by subsequently heating the resulting mixture to a temperature of 50 to 110° C. and keeping the mixture at 50 to 110° C. for I to 6 hours, optionally followed by removing all or part of the toluene, and/or optionally followed by one or more washing step(s) using a suitable solvent, b) Suspending and/or dissolving, respectively, at least 0.5 mmole of a second portion of an aluminoxane per g support material and at least 0.1 mol % of the employed second portion of an aluminoxane or of a mixture of aluminoxanes per g support material of at least one metallocene of formula 1 and/or 1a in toluene at a temperature of 20 to 50° C., optionally followed by a preactivation time of 1 minute to 200 hours at a temperature of 20 to 30°, c) Applying the mixture prepared in b) to the aluminoxane loaded support material produced in a), at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a more preferred embodiment, as an example, the process according to WO 06/60544 for preparing a free-flowing and, if desired, prepolymerized supported catalyst system comprises the following steps:

a) Contacting an optionally thermally pretreated silica support material with a weight loss on dryness (LOD) of 0.5 wt. % or less and a weight loss on ignition (LOI) of 1.0 wt. % or greater with a first composition which includes at least 10 mmol of methylaluminoxane per g support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a suitable solvent, b) Suspending and/or dissolving, respectively, at least 1 mmole of a second portion of methylaluminoxane per g support material and at least 0.1 mol % of the employed second portion of methylaluminoxane per g support material of at least one metallocene of formula 1 and/or 1a in toluene at a temperature of 20 to 50° C., optionally followed by a preactivation time of 1 minute to 200 hours at a temperature of 20 to 30°, c) Applying the mixture prepared in b) to the methylaluminoxane loaded support material produced in a), by passing the impregnation suspension or solution b) through the methylaluminoxane loaded support material in a direct flow or by using an incipient wetness impregnation technique, where the volume of the impregnation suspension or solution or the total liquid volume used in the impregnation step, respectively, does not exceed 250% of the total pore volume of the support material, at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a particular preferred embodiment, as an example, the process according to WO 06/60544 for preparing a free-flowing and, if desired, prepolymerized supported catalyst system comprises the following steps:

a) Contacting an optionally thermally pretreated silica support material with a weight loss on dryness (LOD) of 0.3 wt. % or less and a weight loss on ignition (LOI) between 1.5 and 3.5 wt. %, with at least 10 mmol of methylaluminoxane per g support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a suitable solvent, b) Suspending and/or dissolving, respectively, at least 1 mmole of a second portion of methylaluminoxane per g support material and at least 0.1 mol % of the employed second portion of methylaluminoxane per g support material of at least one metallocene of formula 1a in toluene at a temperature of 20 to 50° C., optionally followed by a preactivation time of 1 minute to 200 hours at a temperature of 20 to 30°, c) Applying the mixture prepared in b) to the methylaluminoxane loaded support material produced in a), by passing the impregnation suspension or solution b) through the aluminoxane loaded support material a) in a direct flow or by using an incipient wetness impregnation technique, where the volume of the impregnation suspension or solution or the total liquid volume used in the impregnation step, respectively, does not exceed 250% of the total pore volume of the support material, at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures. of 30 to 60° C., and f) Optionally prepolymerizing the resulting supported catalyst system with one or more olefinic monomer(s), to obtain a prepolymerized supported catalyst system.

According to the present invention, for preparing a free-flowing and, if desired, prepolymerized supported catalyst system, in step b) of the catalyst preparations as mentioned above, instead of an aluminoxane or a mixture of aluminoxanes, at least one alkyl compound of elements of main Groups I to III of the Periodic Table, for example a magnesium alkyl, a lithium alkyl or an aluminum alkyl like trimethylaluminum, triethylaluminum, triisobutyllaluminum, triisopropylaluminum, trihexylaluminum, trioctylaluminum, tri-n-butylaluminum, tri-n-propylaluminum, triisoprene aluminum, dimethyl aluminum monochloride, aluminum monochloride, diisobutyl aluminum monochloride, methyl aluminum sesquichloride, ethyl aluminum sesquichloride, dimethyl aluminum hydride, aluminum hydride, diisopropyl aluminum hydride, dimethyl aluminum(trimethylsiloxide), dimethyl aluminum (triethylsiloxide), phenylalan, pentafluorophenylalan, and o-tolylalan, can be used. Preferred aluminum alkyls are trimethylaluminum, triethylaluminum, triisobutylaluminum.

In an even further embodiment of the present invention a free flowing and, if desired, prepolymerized supported catalyst system is prepared comprising the following steps:

a) preparing a trialkylaluminium/borinic acid mixture in a suitable solvent or suspension medium b) applying the trialkylaluminium/borinic acid mixture to a porous, preferably inorganic, if necessary thermally or chemically pretreated support, which was prior treated with a base like N,N-diethylbenzylamine, N,N-dimethylbenzylamine, N-benzyldimethylamine, N-benzyldiethylamine, N-benzylbutylamine, N-benzyl tertbutylamine, N-benzylisopropylamine, N-benzylmethylamine, N-benzylethylamine, N-benzyl-1-phenylethylamine, N-benzyl-2-phenylethylamine, N,N-dimethylbenzylamine, N,N-diethylbenzylamine, N-methyl-N-ethylbenzylamine, N-methyldibenzylamine and N-ethyldi(benzyl)amine, c) removing the major part of solvent from the resulting mixture to obtain a supported cocatalyst, d) preparing a metallocene/supported cocatalyst mixture in a suitable solvent or suspension medium, where the metallocene component has one of the above-described structures, e) isolating the supported catalyst system and f) if desired, prepolymerizing the resulting supported catalyst system with one or more olefinic monomer(s), to obtain a prepolymerized supported catalyst system.

Preferred solvents for the preparation of the metallocene/cocatalyst mixture are hydrocarbons and hydrocarbon mixtures, which are liquid at the selected reaction temperature and in which the individual components preferably dissolve. The solubility of the individual components is, however, not a prerequisite as long as it is ensured that the reaction product of metallocene and cocatalyst components is soluble in the solvent selected. Suitable solvents are alkanes such as pentane, isopentane, hexane, isohexane, heptane, octane and nonane, cycloalkanes such as cyclopentane and cyclohexane and aromatics such as benzene, toluene, ethylbenzene and diethylbenzene. Very particular preference is given to toluene, heptane and ethylbenzene.

For a preactivation, the metallocene in the form of a solid is dissolved in a solution of the cocatalyst in a suitable solvent. It is also possible to dissolve the metallocene separately in a suitable solvent and subsequently to combine this solution with the cocatalyst solution. Preference is given to using toluene. The preactivation time is from 1 minute to 200 hours. The preactivation can take place at room temperature of 25° C. In individual cases, the use of higher temperatures can reduce the required preactivation time and give an additional increase in activity. Elevated temperatures in this case refer to a range from 25° C. to 100° C.

The preactivated solution or the metallocene/cocatalyst mixture is subsequently combined with an inert support material, usually silica gel, which is in the form of a dry powder or as a suspension in one of the above mentioned solvents. The support material is preferably used as powder. The preactivated metallocene/cocatalyst solution or the metallocene/cocatalyst mixture can be either added to the initially charged support material, or else the support material can be introduced into the initially charged solution.

The volume of the preactivated solution or the metallocene/cocatalyst mixture can exceed 100% of the total pore volume of the support material used or else be up to 100% of the total pore volume.

The temperature at which the preactivated solution or the metallocene/cocatalyst mixture is brought into contact with the support material can vary within the range from 0° C. to 100° C. However, lower or higher temperatures are also possible.

While the solvent is completely or mostly removed from the supported catalyst system, the mixture can be stirred and, if desired, also heated. Preferably, both the visible portion of the solvent and the portion in the pores of the support material are removed. The removal of the solvent can be carried out in a conventional way using reduced pressure and/or purging with inert gas. During the drying process, the mixture can be heated until the free solvent has been removed, which usually takes from 1 to 3 hours at a preferred temperature of from 30° C. to 60° C. The free solvent is the visible portion of the solvent in the mixture. For the purposes of the present invention, residual solvent is the portion present in the pores.

As an alternative to the complete removal of the solvent, the supported catalyst system can also be dried until only a certain residual solvent content is left, with the free solvent having been completely removed. Subsequently, the supported catalyst system can be washed with a low-boiling hydrocarbon such as pentane or hexane and dried again.

The supported catalyst system prepared according to the present invention can be used either directly for the polymerization of olefins or be prepolymerized with one or more olefinic monomers, with or without the use of hydrogen as molar mass regulating agent, prior to use in a polymerization process. The procedure for the prepolymerization of supported catalyst systems is described in WO 94/28034.

As additive, it is possible to add, during or after the preparation of the supported catalyst system, a small amount of an olefin, preferably an alpha-olefin such as styrene or phenyldimethylvinylsilane as activity-increasing component or an antistatic, as described in U.S. Ser. No. 08/365,280. The molar ratio of additive to metallocene component of formulas 1 or 1a is preferably from 1:1000 to 1000:1, very particularly preferably from 1:20 to 20:1.

The present invention also provides a process for preparing a polyolefin by polymerization of one or more olefins in the presence of the catalyst system of the present invention comprising at least one transition metal component of the formulas 1 or 1a. For the purposes of the present invention, the term polymerization refers to both homopolymerization and copolymerization and the term copolymerization includes terpolymerisation or copolymerisation of more than three different monomers.

Preference is given to polymerizing olefins of the formula $R'''$—CH=CH—$R''$, where $R'''$ and $R''$ are identical or different and are each a hydrogen atom or a radical having from 1 to 20 carbon atoms, in particular from 1 to 10 carbon atoms, and $R'''$ and $R''$ together with the atoms connecting them can form one or more rings.

Suitable olefins are 1-olefins, eg. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene, ethylnorbornadiene and cyclic olefins such as norbornene, tetracyclododecene or methylnorbornene. In the process of the present invention, preference is given to homopolymerizing propene or ethene or copolymerizing propene with ethene and/or one or more 1-olefins having from 4 to 20 carbon atoms, eg. 1-butene or hexene, and/or one or more dienes having from 4 to 20 carbon atoms, eg. 1,4-butadiene, norbornadiene, ethylidenenorbornene or ethylnorbornadiene. Very suitable copolymers are ethene-propene copolymers, propene-1-pentene copolymers and ethene-propene-1-butene, ethene-propene-1-pentene or ethene-propene-1,4-hexadiene terpolymers.

The polymerization is carried out at from −60° C. to 300° C., preferably from 50° C. to 200° C., very particularly preferably from 50° C. to 95° C. The pressure is from 0.5 to 2000 bar, preferably from 5 to 100 bar.

The polymerization can be carried out in solution, in bulk, in suspension or in the gas phase, continuously or batchwise, in one or more stages. As an example, impact copolymers are preferably produced in more than one stage. The homopolymer or random copolymer content of such a polymer can be produced in (a) first stage(s) and the copolymer rubber content can be produced in (a) consecutive stage(s).

The supported catalyst system prepared according to the present invention can be used as sole catalyst component for the polymerization of olefins or preferably in combination with at least one alkyl compound of elements of main Groups I to III of the Periodic Table, for example an aluminum alkyl, magnesium alkyl or lithium alkyl or an aluminoxane. The alkyl compound is added to the monomer or suspension medium and serves to free the monomer of substances, which can impair the catalytic activity. The amount of alkyl compound added depends on the quality of the monomers used.

To prepare olefin polymers having a broad or bimodal molecular weight distribution or a broad or bimodal melting range, it is recommended to use a catalyst system comprising two or more different metallocenes and/or two or more different cocatalysts. Alternatively two or more different catalyst systems of the present invention can be used as a mixture.

As molar mass regulator and/or to increase the activity, hydrogen is added if required.

The catalyst system may be supplied to the polymerization system as a solid or in the form of a paste or suspension in a hydrocarbon or may be treated with inert components, such as paraffins, oils, or waxes, to achieve better metering. If the catalyst system is to be metered into the reactor together with the monomer to be polymerized or the monomer mixture to be polymerized, the mixing unit and the metering line are preferably cooled.

Furthermore, an additive such as an antistatic or an alcohol can be used in the process of the present invention, for example to improve the particle morphology of the olefin polymer. In general it is possible to use all antistatics which are suitable in olefin polymerization processes. It is preferred to dose the antistatic directly into the polymerization system, either together with or separately from the catalyst system used.

The polymers prepared using the catalyst systems of the present invention display an uniform particle morphology and contain no fines. No agglomerates or deposits are obtained in the polymerization using the catalyst system of the present invention.

The catalyst systems of the present invention give polymers such as polypropylene having high molecular weight and cover a broad range of stereospecificity and regiospecificity.

The copolymers which can be prepared using the catalyst system based on metallocenes of formula 1 or 1a of the present invention have a significantly higher molar mass compared to the prior art. At the same time, such copolymers can be prepared using the catalyst system of the present invention at a high productivity and at industrially relevant process parameters without deposit formation.

The polymers prepared by the process of the present invention are suitable, in particular, for producing products such as fibers, filaments, injection-molded parts, films, sheets, caps, closures, bottles or large hollow bodies such as pipes with excellent properties.

EXAMPLES

General Procedures

The preparation and handling of the organometallic compounds were carried out under argon using Schlenk techniques or in a glove box. All solvents were purged with argon and dried over molecular sieves before use.

The metallocenes produced were characterized by $^1$H-NMR spectroscopy using a Bruker DMX 500 spectrometer, operating at 500 MHz using CDCl$_3$ as the solvent.

The polymers produced were characterized by $^1$H-NMR, $^{13}$C-NMR, DSC, GPC, TREF/ATREF, Melt Flow Rate and IR spectroscopy.

1. Gel Permeation Chromatography (GPC), Determination of Mw and Mw/Mn

A Waters Alliance/GPCV2000 equipped with a refractometer, a triple capillary on-line viscometer (Waters Corporation, 34 Maple Street, Milford, Massachusetts, 01757 USA) and a light scattering detector PD 2040 (Precision Detectors Inc., 34 Williams Way, Bellingham, Mass., USA) was used for the determination of the molar mass data of the samples. 0.05 wt % solutions of the samples in 1,2,4-trichlorobenzene were analyzed at a temperature of 145° C. using a Mixed B light scattering quality column (Polymer Labs 1110-6100LS) and a Mixed B guard column (Polymer Labs 1110-1120). Weight average molar mass (Mw) and the ratio of weight average molar mass to number average molar mass (Mw/Mn) were calculated using the Cumulative Matching. % Broad Standard procedure that is available in the Waters Millennium 3.2 GPC software module.

2. NMR Spectroscopy

Samples were prepared by weighing 0.32 g of polymer into 2.5 ml of a 1,2,4-trichlorobenzene/deuterobenzene-d6 (4:1 volume) mixture. Samples were heated to 125° C. and mixed until a homogeneous solution was formed (typically 1-4 hours). Spectra were obtained at 120° C. on a Varian Inova 500 instrument (Varian Inc., 3120 Hansen Way, Palo Alto, Calif., 94304, USA) operating at a $^{13}$C-spectrometer frequency of 125.7 MHz and using a 10 mm probe. Spectra were obtained using 5000 scans employing a π/2 pulse of 10.0 μs, a recycle delay of 10.0 s and an acquisition time of 2.5 s. Waltz-16 decoupling remained on throughout the pulse sequence to gain the signal to noise enhancement due to the effects of nOe. Spectra were processed with 1 Hz of line broadening. The mmmm peak in the methyl region of the spectrum was used as an internal chemical shift reference and was set to 21.85 ppm.

3. Differential Scanning Calorimetry (DSC), Determination of the Polymer Melting Point Tm DSC measurements were carried out using a Mettler Toledo DSC 822e (Mettler-Toledo Inc., 1900 Polaris Parkway, Columbus, Ohio, 43240, USA). 4 mg of sample were weighed into a standard aluminum pan and subjected to the following temperature schedule:

The samples were heated from room temperature to 220° C. at a heating rate of 20° C./min, maintained at this temperature for 5 min, then cooled down to −55° C. at a cooling rate of 20° C./min, maintained at the same temperature for 5 min, then heated to 220° C. at a heating rate of 20° C./min. The melting point was determined from the second heating run as the temperature where the main peak was observed in the curve.

4. Analytical TREF (ATREF)

The TREF experiment is carried out on a TREF system built from a modified Waters 2000CV instrument (Waters Corporation, 34 Maple Street, Milford, Mass., 01757 USA). The 2000CV instrument is maintained at 140° C. in o-dichlorobenzene (ODCB) solvent at 1 ml/min flowrate. To detect the polyolefin fractions eluting from the TREF column, the system uses a heated infrared IR4 detector (PolymerChar Company, Valencia Technology Park, P.O. Box 176, Valencia, Va., E-46980, PATERNA, Spain). For cooling and heating of the TREF column, the system uses a temperature-programmable HAAKE Phoenix II oil bath (Thermo Electron Corporation, 401 Millcreek Road, Marietta, Ohio 45750, USA). The TREF separation column is a stainless steel column of 100 mm long and 0.75 mm diameter packed with 20-micrometer cross-linked polystyrene beads. This TREF column is maintained at the 140° C. temperature in the oil bath before the sample analyses. Polymer samples are dissolved in ODCB solvent at 140° C. at a concentration of 2 mg/ml. One ml of the test sample of the resultant ODCB solution is injected into the TREF column by the auto-injection system of the Waters 2000CV instrument with a flowrate of ODCB set at 1 ml/min. Following the sample injection, the ODCB flow is diverted away from the TREF column. As the sample is kept inside the column, the column is allowed to cool down in the oil bath from 140° C. down to 0° C. at the cooling rate of 1.5° C./min. In this cooling step, the polymer molecules in the test sample are precipitated onto the packing beads in the TREF column. While the column is still at 0° C. temperature, a flow of hot ODCB at 1 ml/min is re-introduced to the TREF column for 2 minutes to elute the soluble fraction of the polymer sample and detected by the IR detector set at 3.4 micrometer wavelength. Then, the temperature is raised at a heating rate of 2° C./min while the ODCB flow is maintained at 1 ml/min through the TREF column to elute the higher melting polymer fractions which are being detected on-line by the IR4 detector.

5. Melt Flow Rate (MFR)

The MFR of the samples were determined according to ISO 1133 at 230° C. Two different loads were used: 2.16 kg and 5 kg. Values are reported as MFR(230/2.16) and MFR (230/5), respectively.

6. Productivity

The productivity of a catalyst is determined by dividing the produced mass of polypropylene by the mass of catalyst used and the reaction time.

7. Yield

The yield of a sample is determined by dividing the isolated amount of the desired product divided by the theoretical achievable amount of the product.

The following abbreviations are employed:
PP=polypropylene
MC=metallocene
Cat=supported catalyst system
h=hour
T$_g$=glass transition temperature in ° C., determined by differential scanning calorimetry (DSC, conditions see above)

Synthesis of Metallocenes

Example 1

Dimethylsilandiyl-bis-(2-(cyclohexylmethyl)-4-(4'-tert-butylphenyl)-1-indenyl)-zirconium dichloride (2-Bromo-ethyl)-cyclohexane

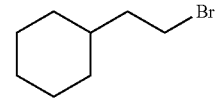

In a 1 l—roundbottom flask equipped with a reflux condenser 164 g concentrated sulphuric acid and 200 g hydrobromic acid (48% in water) were added subsequently under cooling with an ice bath to 88.7 g (0.693 mole) 2-cyclohexyl-ethanol. The mixture was refluxed for 6 h and after cooling to room temperature given to 400 g of ice. The aqueous phase was extracted with 400 ml pentane. The organic layer was washed with a 2 M NaOH-solution and with water, dried over magnesium sulphate, and the solvent was removed in vacuo. The product was distilled in vacuo to yield 112.7 g (85%) of (2-bromo-ethyl)-cyclohexane as a colourless oil. $^1$H-NMR (400 MHz, CDCl$_3$): δ=3.40 (2H, t, CH$_2$Br), 1.73-1.61 (m, 7H), 1.44 (m, 1H), 1.26-1.11 (m, 3H), 0.92-0.84 (m, 2H) ppm.

1-(2-Chloro-phenyl)-3-cyclohexyl-propan-1-one

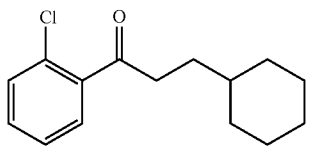 [SMILES: O=C(CCC1CCCCC1)c1ccccc1Cl]

15.57 g (640 mmole) Magnesium turnings were placed in a 1 l—roundbottom flask equipped with a dropping funnel and a reflux condenser, and 50 ml of THF were added. The magnesium was etched slightly with a few crystals of iodine and then 2 g of (2-bromo-ethyl)-cyclohexane were added and the mixture was heated locally. After the start of the Grignard-formation the rest of the (2-bromo-ethyl)-cyclohexane in 350 ml of THF (112.65 g in total, 589 mmole) were added within a period of 20 min. The mixture was refluxed for 1.5 h and then cooled to room temperature. In a separate 2 l—roundbottom flask 70.5 g (513 mmole) of 2-chloro-benzonitrile and 156 mg (0.16 mole %) copper(I)iodide were dissolved in 130 ml of THF. The Grignard-solution was added dropwise over a period of 30 min and the reaction mixture was refluxed for 3 h. After standing overnight at room temperature, a mixture of 190 ml water and 127 ml concentrated hydrochloric acid were added very carefully, causing a strongly exothermic reaction. The mixture was stirred at 50° C. for 1 h and the layers were separated. The aqueous layer was extracted twice with 150 ml of toluene each. The combined organic layers were washed twice with 2 M sulphuric acid, once with a saturated sodium bicarbonate solution and once with a saturated sodium chloride solution. After drying over magnesium sulphate the solvent was evaporated in vacuo to yield 133.5 g (quant.) of the desired phenone as slightly brown oil. $^1$H-NMR (400 MHz, CDCl$_3$): δ=7.41-7.14 (m, 4H, aromatic), 2.91 (t, 2H, COCH$_2$), 1.71-1.55, 1.28-1.10, 0.93-0.85 (3×m, 13H) ppm.

7-Chloro-2-cyclohexylmethyl-indan-1-one

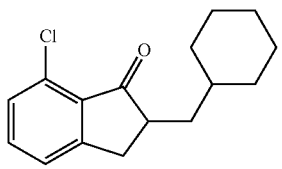 [SMILES: O=C1c2c(Cl)cccc2CC1CC1CCCCC1]

66 g (263 mmole) 1-(2-Chloro-phenyl)-3-cyclohexyl-propan-1-one, 77.5 g (2.1 eq.) urotropine and 72.6 g (2.7 eq.) of acetic anhydride were placed in a 500 ml roundbottom flask and the mixture was stirred at 80° C. for 4 h. Then 100 ml water and 100 ml 2M NaOH were added and the mixture was extracted two times with 200 ml dichloromethane each. The organic layer was washed two times with 100 ml saturated aqueous ammonium chloride and dried over magnesium sulphate. The solvent amount was reduced in vacuo to a total of 150 ml volume and the solution was added dropwise over a period of 2.5 h to 660 g of hot (70-75° C.) concentrated sulphuric acid. After stirring for an additional 30 min at 75° C. the mixture was allowed to stand overnight at room temperature. The mixture was given to approx. 500 g of ice and extracted three times with 150 ml dichloromethane each. The organic layer was washed twice with 150 ml of a saturated sodium bicarbonate solution and once with 100 ml of a saturated sodium chloride solution. After drying over magnesium sulphate the solvent was removed in vacuo. The product was purified by column chromatography on silica (heptane/dichloromethane 5:1) to yield 40.0 g (61%) of the desired product as a slightly off-white oil, which slowly crystallized. $^1$H-NMR (400 MHz, CDCl$_3$): δ=7.42 (t, 1H, aromatic), 7.29 (d, 1H, aromatic), 7.24 (d, 1H, aromatic), 3.25 (dd, 1H, COCH), 2.71 (m, 2H, benzylic), 1.78-0.87 (m, 13H, aliphatic) ppm.

7-(4'-tert-Butyl-phenyl)-2-cyclohexylmethyl-indan-1-one

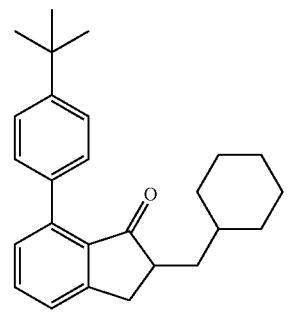 [SMILES: CC(C)(C)c1ccc(-c2cccc3c2C(=O)C(CC2CCCCC2)C3)cc1]

60 g (228 mmole) 7-Chloro-2-cyclohexylmethyl-indan-1-one, 49 g (1.2 eq.) 4-tert-butyl-benzene boronic acid, 53 g sodium carbonate, 750 ml ethylene glycol and 150 ml water were placed in a 2 l—roundbottom flask equipped with a mechanical stirrer and a reflux condenser. The mixture was degassed three times by slight evacuation and recharging with argon. A premixed catalyst solution consisting of 103 mg (0.2 mole %) palladium acetate, 3 ml NaTPPTS (2.6 M in water, 0.8 mole %) and 2 ml of water was added and the mixture was refluxed at 125° C. until complete conversion (approx. 4 h). 300 ml of water were added and the mixture was extracted three times with 150 ml of toluene each. The combined organic layers were washed twice with 100 ml water and once with 100 ml of a saturated sodium chloride solution. Drying over magnesium sulphate and evaporation of the solvent in vacuo yielded 87.2 g (quant.) of the desired product as a yellow sticky oil. $^1$H-NMR (400 MHz, CDCl$_3$): δ=7.54 (t, 1H, aromatic), 7.43, 7.38 (2×d, 4H, aromatic), 7.24 (m, 2H, aromatic), 3.30 (m, 1H, COCH), 2.80-2.67 (3×m, 2H, benzylic), 1.85-1.47 (m, 7H, aliphatic), 1.35 (s, 9H, C(CH$_3$)$_3$), 1.27-0.87 (m, 6H, aliphatic) ppm.

7-(4'-tert-Butyl-phenyl)-2-cyclohexylmethyl-1H-indene

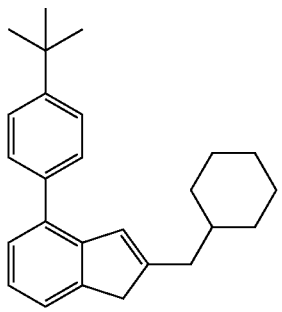 [SMILES: CC(C)(C)c1ccc(-c2cccc3c2C=C(CC2CCCCC2)C3)cc1]

82.3 g (229 mmole) 7-(4'-tert-Butyl-phenyl)-2-cyclohexylmethyl-indan-1-one were dissolved in 292 ml toluene in a 1 l—roundbottom flask equipped with a reflux condenser. 9.5 g (1.1 eq.) sodium borohydride were added. Then 40 ml (4.3 eq.) methanol were added at 50° C. and the mixture was stirred for 3 h at 50° C. An additional 1 g of sodium borohydride and 5 ml methanol were added and the mixture was stirred another 2 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 350 ml of toluene. After addition of 0.7 g p-toluene sulfonic acid the mixture was heated to reflux using a Dean-Stark-trap until TLC showed complete conversion (90 min). The solution was washed twice with a saturated NaHCO₃-solution, once with water and once with a saturated sodium chloride solution. Drying over magnesium sulphate, evaporation of the solvent and crystallization from 800 ml ethanol afforded 67.3 g (86%) of the desired indene as white crystals. $^1$H-NMR (400 MHz, CDCl$_3$): δ=7.45, 7.33, 7.25, 7.14 (4×m, 7H, aromatic), 6.69 (s, 1H, =CH), 3.35 (s, 2H, benzylic), 2.34 (d, 2H, aliphatic), 1.71-1.50 (m, 6H, aliphatic), 1.39 (s, 9H, C(CH$_3$)$_3$), 1.24-0.87 (m, 5H, aliphatic) ppm.

Dimethylsilandiyl-bis-(2-(cyclohexylmethyl)-4-(4'-tert-butylphenyl)-1-indenyl)-zirconium dichloride

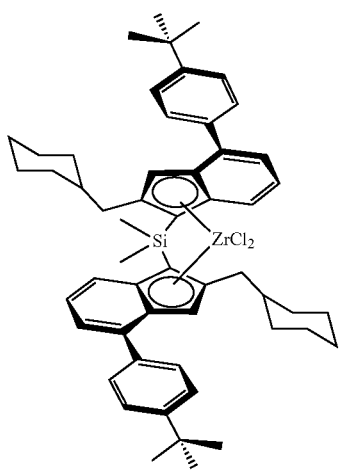

20 g (58 mmole) 7-(4'-tert-Butyl-phenyl)-2-cyclohexylmethyl-1H-indene were dissolved in 340 ml toluene and 20 ml of THF in a 1000 ml —roundbottom flask. 24.4 ml of n-butyl lithium (2.6 M in toluene, 63.4 mmole, 1.1 eq.) were added at room temperature and the solution was stirred for 1 h at 80° C. After cooling to 40° C. 3.5 ml (3.74 g, 29 mmole, 0.5 eq.) dimethyldichlorosilane were added in one portion and the mixture was stirred at 60° C. for 8.5 h. The solvent mixture was removed in vacuo (purity of the ligand>99% according to GC—analysis) and the ligand was dissolved in 200 ml of diethyl ether (yellowish suspension due to LiCl). 23.8 ml of n-butyl lithium (61.9 mmole, 1.07 eq. regarding to "indene", 2.6 M in toluene) were added at room temperature and the mixture was stirred overnight at room temperature. Then 7.1 g (30.5 mmole, 0.525 eq. regarding to "indene") zirconium tetrachloride were added in portions. The orange-yellow suspension was stirred for 5 h at room temperature and the solid was isolated by filtration. Washing with 2 portions of 30 ml diethyl ether each and drying in vacuo yielded 22.7 g of the crude complex (rac/meso=1.5:1, containing lithium chloride). The racemic complex was isolated by fractional crystallization from toluene. Yield: 8.1 g (9 mmol, 31%) as a bright yellow powder. $^1$H-NMR (400 MHz, CDCl$_3$): δ=7.61 (d, 2H, aromatic), 7.57, 7.44 (2×d, 8H, aromatic), 7.36 (d, 2H, aromatic), 7.22, 7.15, 7.07 (3×m, 10H, aromatic+toluene), 6.94 (s, 2H, indenyl-H), 2.64 ("dd", 2H, indenyl-CH$_2$), 2.34 (s, toluene) 2.13 ("dd", 2H, indenyl-CH$_2$), 1.75-1.45 (m, 10H, aliphatic), 1.33 (s, 18H, C(CH$_3$)$_3$), 1.31 (s, 6H, Si(CH$_3$)$_2$), 1.12-0.76 (m, 12H, aliphatic) ppm.

Example 2

Dimethylsilandiyl-bis-(2-(cyclohexylmethyl)-4-(1-naphthyl)-1-indenyl)-zirconium dichloride

7-(1-Naphthyl)-2-cyclohexylmethyl-indan-1-one

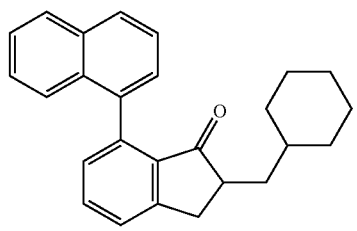 [SMILES: O=C1c2c(cccc2-c2cccc3ccccc23)CC1CC1CCCCC1]

18.5 g (70.4 mmole) 7-Chloro-2-cyclohexylmethyl-indan-1-one, 14.5 g (1.2 eq.) naphthyl boronic acid, 16.4 g sodium carbonate, 230 ml ethylene glycol and 45 ml water were placed in a 1 l—roundbottom flask equipped with a mechanical stirrer and a reflux condenser. The mixture was degassed three times by slight evacuation and recharging with argon. A premixed catalyst solution consisting of 32 mg (0.2 mole %) palladium acetate, 0.94 ml NaTPPTS (2.6 M in water, 0.8 mole %) and 3 ml of water was added and the mixture was refluxed at 125° C. until complete conversion (approx. 5 h). 100 ml of water were added and the mixture was extracted three times with 100 ml of toluene each. The combined organic layers were washed twice with 100 ml water and once with 100 ml of a saturated sodium chloride solution. Drying over magnesium sulphate and evaporation of the solvent in vacuo yielded 24 g (96%) of the desired product as a yellow sticky oil. $^1$H-NMR (400 MHz, CDCl$_3$): δ=7.86 (d, 2 h, aromatic), 7.63 (m, 1H, aromatic), 7.52 (m, 2H, aromatic), 7.43 (m, 2H, aromatic), 7.33 (m, 3H, aromatic), 2.39 (m, 1H, (C=O)CH), 2.85, 2.67 (2×m, 2H, benzylic), 1.90-0.80 (m, 13H, aliphatic) ppm.

7-(1-Naphthyl)-2-cyclohexylmethyl-1H-indene

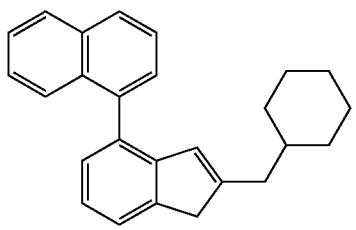 [SMILES: C1=C(CC2CCCCC2)Cc2cccc(-c3cccc4ccccc34)c21]

24 g (68 mmole) 7-(1-Naphthyl)-2-cyclohexylmethyl-indan-1-one were dissolved in 85 ml toluene in a 500 ml—roundbottom flask equipped with a reflux condenser. 2.82 g (1.1 eq.) sodium borohydride were added. Then 11.8 ml (4.3 eq.) methanol were added at 50° C. and the mixture was stirred for 5 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 250 ml of toluene. After addition of 0.5 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate and evaporation of the solvent afforded 21.65 g (95%) of the desired indene as a slightly offwhite oil. $^1$H-NMR (400 MHz, CDCl$_3$): δ=7.88 (m, 2H, aromatic), 7.73 (d, 1H, aromatic), 7.55-7.19 (m, 7H, aromatic), 6.10 (s, 1H, C=CH), 3.40 (s, 2H, benzylic) 2.25 (d, 2H CH$_2$Cy), 1.67-0.80 (m, 11H, aliphatic) ppm.

Dimethylsilandiyl-bis-(2-(cyclohexylmethyl)-4-(1-naphthyl)-1-indenyl)-zirconium dichloride

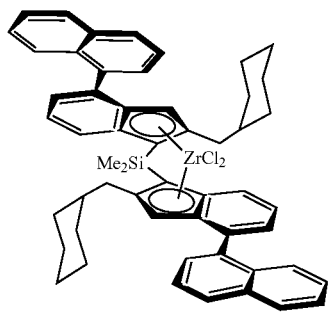

10 g (30 mmole) 7-(1-naphthyl)-2-cyclohexyl-methyl-1H-indene were dissolved in 170 ml toluene and 10 ml of THF in a 500 ml—roundbottom flask. 12.4 ml of n-butyl lithium (2.6 M in toluene, 31 mmole, 1.05 eq.) were added at room temperature and the solution was stirred for 1 h at 80° C. After cooling to 40° C. 1.91 g (15 mmole, 0.5 eq.) dimethyldichlorosilane were added in one portion and the mixture was stirred at 60° C. for 22 h. The solvent mixture was removed in vacuo and the ligand was dissolved in 100 ml of diethyl ether. 12.4 ml of n-butyl lithium (2.6 M in toluene, 31 mmole, 1.05 eq.) were added at room temperature and the mixture was stirred overnight at room temperature. Then 3.65 g (15.6 mmole, 0.52 eq. regarding to "indene") zirconium tetrachloride were added in portions. The orange-yellow suspension was stirred for 6 h at room temperature and the solid was isolated by filtration. Washing with 2 portions of 30 ml diethyl ether each and drying in vacuo yielded 11.3 g of the crude complex (rac/meso=1.7:1, containing lithium chloride). The racemic complex was isolated by fractional crystallization from toluene. Yield: 2.77 g (3 mmole, 21%) as a bright orange powder. $^1$H-NMR (400 MHz, CDCl$_3$): δ=7.85 (m, 4H, aromatic), 7.71 (m, 4H, aromatic), 7.51 (m, 4H, aromatic), 7.43-7.10 (4×m, 8H, aromatic), 6.40 (s, 2H, indenyl-CH), 2.67, 2.03 (2×m, 4H, CH$_2$Cy), 1.65-0.68 (m, 28H, aliphatic+Si(CH$_3$)$_2$) ppm.

Example 3

Dimethylsilandiyl-bis-(2-(cyclohexylmethyl)-4-(4'-methylphenyl)-1-indenyl)-zirconium dichloride 7-(4'-Methylphenyl)-2-cyclohexylmethyl-indan-1-one

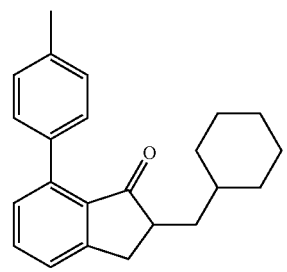 [SMILES: Cc1ccc(-c2cccc3c2C(=O)C(CC2CCCCC2)C3)cc1]

24.16 g (91.9 mmole) 7-Chloro-2-cyclohexylmethyl-indan-1-one, 15.0 g (1.2 eq.) 4-methylphenyl boronic acid, 19.49 g sodium carbonate, 303 ml ethylene glycol and 57 ml water were placed in a 1 l—roundbottom flask equipped with a mechanical stirrer and a reflux condenser. The mixture was degassed three times by slight evacuation and recharging with argon. A premixed catalyst solution consisting of 41 mg (0.2 mole %) palladium acetate, 1.2 ml NaTPPTS (2.6 M in water, 0.8 mole %) and 2 ml of water was added and the mixture was refluxed at 125° C. until complete conversion (approx. 8 h). 100 ml of water were added and the mixture was extracted three times with 100 ml of toluene each. The combined organic layers were washed twice with 100 ml water and once with 100 ml of a saturated sodium chloride solution. Drying over magnesium sulphate and evaporation of the solvent in vacuo yielded 30.57 g (quant.) of the desired product as a yellow sticky oil. $^1$H-NMR (400 MHz, CDCl$_3$): δ=7.60-7.19 (m, 7H, aromatic), 3.31 (m, 1H, (C=O)CH), 2.91-2.61 (m, 2H, benzylic), 2.38 (s, 3H, Ph-CH$_3$), 1.80-0.85 (m, 10H, aliphatic) ppm.

7-(4'-Methylphenyl)-2-cyclohexylmethyl-1H-indene

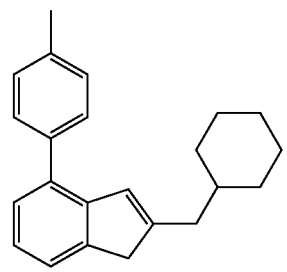 [SMILES: Cc1ccc(-c2cccc3c2C=C(CC2CCCCC2)C3)cc1]

30.5 g (95.7 mmole) 7-(4'-Methylphenyl)-2-cyclohexylmethyl-indan-1-one were dissolved in 89 ml toluene in a 500 ml—roundbottom flask equipped with a reflux condenser. 3.62 g (1.0 eq.) sodium borohydride were added. Then 17.9 ml (4.35 eq.) methanol were added at 50° C. and the mixture was stirred for 8 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 200 ml of toluene. After addition of 0.4 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate and evaporation of the solvent afforded 29 g (quant.) of the desired indene as a slightly offwhite oil. $^1$H-NMR (400 MHz, CDCl$_3$): δ=7.42-7.14 (m, 7H, aromatic), 6.66 (s, 1H, C=CH), 3.36 (s, 2H, benzylic), 2.41 (s, 3H, PhCH$_3$), 2.35 (d, 2H, CH$_2$Cy), 1.70-0.83 (m, 11H, aliphatic) ppm.

Dimethylsilandiyl-bis-(2-(cyclohexylmethyl)-4-(4'-methylphenyl)-1-indenyl)-zirconium dichloride

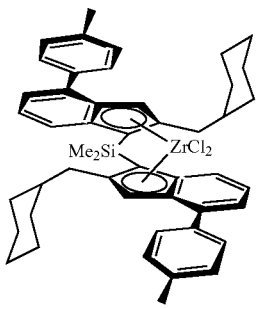

5 g (16.5 mmole) 7-(4'-Methylphenyl)-2-cyclohexyl-methyl-1H-indene were dissolved in 97 ml toluene and 5.7 ml of THF in a 250 ml—roundbottom flask. 6.9 ml of n-butyl lithium (2.5 M in toluene, 17.4 mmole, 1.05 eq.) were added at room temperature and the solution was stirred for 1 h at 80° C. After cooling to 40° C. 1.0 ml (8.3 mmole, 0.5 eq.) dimethyldichlorosilane were added in one portion and the mixture was stirred at 60° C. for 6 h. The solvent mixture was removed in vacuo and the ligand was dissolved in 55 ml of diethyl ether. 6.6 ml of n-butyl lithium (2.5 M in toluene, 16.5 mmole, 1.0 eq.) were added at room temperature and the mixture was stirred overnight at room temperature. Then 1.93 g (8.3 mmole, 0.5 eq. regarding to "indene") zirconium tetrachloride were added in portions. The orange-yellow suspension was stirred for 3 h at room temperature and the solid was isolated by filtration. Washing with 2 portions of 30 ml diethyl ether each and drying in vacuo yielded 4.24 g of the crude complex (rac/meso=1.8:1, containing lithium chloride). The racemic complex was isolated by fractional crystallization from toluene. Yield: 0.76 g (0.9 mmole, 11%) as a bright yellow powder. $^1$H-NMR (400 MHz, CDCl$_3$): δ=7.61 (d, 2H, aromatic), 7.52 (d, 4H, aromatic), 7.35 (d, 2H, aromatic), 7.27-7.06 (m, 6H, aromatic), 6.89 (s, 2H, indenyl-CH), 2.64, 2.11 (2×m, 4H, CH$_2$Cy), 2.36 (s, 6H, PhCH$_3$), 1.66-0.73 (m, 28H, aliphatic+Si(CH$_3$)$_2$) ppm.

Example 4

Dimethylsilandiyl-bis-(2-(cyclohexylmethyl)-4-(3',5'-dimethylphenyl)-1-indenyl)-zirconium dichloride 7-(3',5'-Dimethylphenyl)-2-cyclohexylmethyl-indan-1-one

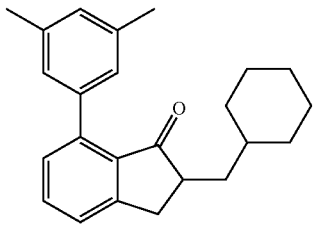 [SMILES: Cc1cc(C)cc(-c2cccc3c2C(=O)C(CC2CCCCC2)C3)c1]

20 g (76 mmole) 7-Chloro-2-cyclohexylmethyl-indan-1-one, 13.7 g (1.2 eq.) 2,3-dimethylphenyl boronic acid, 17.75 g sodium carbonate, 250 ml ethylene glycol and 50 ml water were placed in a 1 l—roundbottom flask equipped with a mechanical stirrer and a reflux condenser. The mixture was degassed three times by slight evacuation and recharging with argon. A premixed catalyst solution consisting of 34 mg (0.2 mole %) palladium acetate, 1 ml NaTPPTS (2.6 M in water, 0.8 mole %) and 2 ml of water was added and the mixture was refluxed at 125° C. until complete conversion (approx. 4 h). 100 ml of water were added and the mixture was extracted three times with 100 ml of toluene each. The combined organic layers were washed twice with 100 ml water and once with 100 ml of a saturated sodium chloride solution. Drying over magnesium sulphate and evaporation of the solvent in vacuo yielded 27.7 g (quant.) of the desired product as a yellow sticky oil. $^1$H-NMR (400 MHz, CDCl$_3$): δ=7.55 (t, 1H, aromatic), 7.39 (d, 1H, aromatic), 7.28-7.02 (m, 3H, aromatic), 3.34 (m, 1H, (C=O)CH), 2.81-2.69 (m, 2H, benzylic), 2.37 (s, 6H, Ph-CH$_3$), 1.89-0.89 (m, 10H, aliphatic) ppm.

7-(3',5'-Dimethylphenyl)-2-cyclohexylmethyl-1H-indene

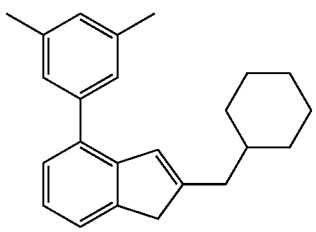 [SMILES: Cc1cc(C)cc(-c2cccc3c2C=C(CC2CCCCC2)C3)c1]

25.3 g (76.1 mmole) 7-(3',5'-Dimethylphenyl)-2-cyclohexyl-methyl-indan-1-one were dissolved in 90 ml toluene in a 500 ml—roundbottom flask equipped with a reflux condenser. 3.17 g (1.1 eq.) sodium borohydride were added. Then 13.3 ml (4.35 eq.) methanol were added at 50° C. and the mixture was stirred for 3 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 90 ml of toluene. After addition of 0.3 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate and evaporation of the solvent afforded 22.1 g (92%) of the desired indene as a slightly offwhite oil. $^1$H-NMR (400 MHz, CDCl$_3$): δ=7.35 (d, 1H, aromatic), 7.24 (m, 1H, aromatic), 7.15 (m, 3H, aromatic), 7.01 (s, 1H, aromatic), 6.68 (s, 1H, C=CH), 3.37 (s, 2H, benzylic), 2.39 (s, 6H, PhCH$_3$), 2.36 (d, 2H, CH$_2$Cy), 1.74-0.91 (m, 11H, aliphatic) ppm.

Dimethylsilandiyl-bis-(2-(cyclohexylmethyl)-4-(3',5'-dimethylphenyl)-1-indenyl)-zirconium dichloride

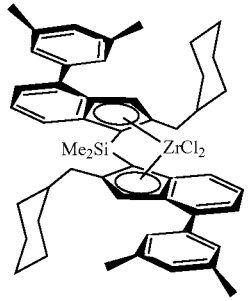

2 g (6.32 mmole) 7-(3',5'-Dimethylphenyl)-2-cyclo-hexylmethyl-1H-indene were dissolved in 34 ml toluene and 2 ml of THF in a 100 ml—roundbottom flask. 2.65 ml of n-butyl lithium (2.5 M in toluene, 6.63 mmole, 1.05 eq.) were added at room temperature and the solution was stirred for 1 h at 80° C. After cooling to 40° C. 408 mg (3.2 mmole, 0.5 eq.) dimethyldichlorosilane were added in one portion and the mixture was stirred at 60° C. for 18 h. After cooling to room temperature 2.65 ml of n-butyl lithium (2.5 M in toluene, 6.63 mmole, 1.05 eq.) were added at room temperature and the mixture was stirred for 1 h at 80° C. After cooling to room temperature 781 mg (3.35 mmole, 0.53 eq. regarding to "indene") zirconium tetrachloride were added in portions. The orange-yellow suspension was stirred for 20 h at room temperature and the LiCl was removed by filtration over celite. The celite pad was washed once with 20 ml of toluene and the solvent was removed in vacuo. The racemic complex was isolated by fractional crystallization from toluene, followed by washing with diethyl ether. Yield: 0.20 g (0.24 mmole, 7.5%) as a bright yellow powder. $^1$H-NMR (400 MHz, CDCl$_3$): δ=7.59 (d, 2H, aromatic), 7.35 (d, 2H, aromatic), 7.28-6.92 (m, 8H, aromatic), 6.78 (s, 2H, indenyl-CH), 2.65, 2.15 (2×m, 4H, CH$_2$Cy), 2.38 (s, 12H, PhCH$_3$), 1.64-0.86 (m, 28H, aliphatic+Si(CH$_3$)$_2$) ppm.

Example 5

Dimethylsilandiyl-bis-(2-(tert-butylmethyl)-4-(4'-tert-butylphenyl)-1-indenyl)-zirconium dichloride 1-Bromo-3,3-dimethyl-butane

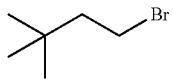

In a 1 l—roundbottom flask equipped with a reflux condenser 232 g concentrated sulphuric acid and 283 g hydrobromic acid (48% in water) were added successively under cooling with an ice bath to 100 g (0.98 mole) 3,3-dimethyl-1-butanol. The mixture was refluxed for 6 h and after cooling to room temperature given to 400 g of ice. The aqueous phase was extracted with 400 ml pentane. The organic layer was washed with a 2 M NaOH-solution and with water, dried over magnesium sulphate, and the solvent was removed in vacuo. The product was distilled in vacuo to yield 88.1 g (55%) of 1-bromo-3,3-dimethyl-butane as a colourless oil. $^1$H-NMR (400 MHz, CDCl$_3$): δ=3.35 (m, 2H, CH$_2$Br), 1.80 (m, 2H, CH$_2$), 0.90 (s, 9H, t-Bu) ppm.

1-(2-Chloro-phenyl)-4,4-dimethyl-pentan-1-one

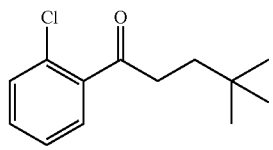

14.1 g (580 mmole) Magnesium turnings were placed in a 1 l—roundbottom flask equipped with a dropping funnel and a reflux condenser, and 60 ml of THF were added. The magnesium was etched slightly with a few crystals of iodine and then 2 g of 1-bromo-3,3-dimethyl-butane were added and the mixture was heated locally. After the start of the Grignard-formation the rest of the 1-bromo-3,3-dimethyl-butane in 350 ml of THF (88.1 g in total, 533 mmole) were added within a period of 20 min. The mixture was refluxed for 1.5 h and then cooled to room temperature. In a separate 2 l—roundbottom flask 63.9 g (464 mmole) of 2-chloro-benzonitrile and 141 mg (0.16 mole %) copper(I)iodide were dissolved in 265 ml of THF. The Grignard-solution was added dropwise over a period of 30 min and the reaction mixture was refluxed for 3 h. After standing overnight at room temperature, a mixture of 190 ml water and 127 ml concentrated hydrochloric acid were added very carefully, causing a strongly exothermic reaction. The mixture was stirred at 50° C. for 1 h and the layers were separated. The aqueous layer was extracted twice with 150 ml of toluene each. The combined organic layers were washed twice with 2 M sulphuric acid, once with a saturated sodium bicarbonate solution and once with a saturated sodium chloride solution. After drying over magnesium sulphate the solvent was evaporated in vacuo to yield 103.8 g (quant.) of the desired phenone as slightly brown oil. $^1$H-NMR (400 MHz, CDCl$_3$): δ=7.41-7.26 (m, 4H, aromatic), 2.87 (m, 2H, COCH$_2$), 1.59 (m, 2H, CH$_2$-t-Bu), 0.90 (s, 9H, t-Bu) ppm.

7-Chloro-2-(2,2-dimethyl-propyl)-indan-1-one

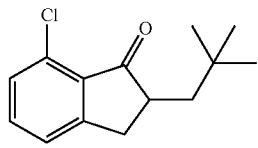 [SMILES: CC(C)(C)CC1Cc2cccc(Cl)c2C1=O]

101.8 g (453 mmole) 1-(2-Chloro-phenyl)-4,4-dimethyl-pentan-1-one, 133.4 g (2.1 eq.) urotropine and 124.7 g (2.7 eq.) of acetic anhydride were placed in a 1000 ml roundbottom flask and the mixture was stirred at 80° C. for 4 h. Then 200 ml water and 200 ml 2M NaOH were added and the mixture was extracted two times with 250 ml dichloromethane each. The organic layer was washed two times with 150 ml saturated aqueous ammonium chloride and dried over magnesium sulphate. The solvent amount was reduced in vacuo to a total of 250 ml volume and the solution was added dropwise over a period of 2.5 h to 1000 g of hot (70-75° C.) concentrated sulphuric acid. After stirring for an additional 30 min at 75° C. the mixture was allowed to stand overnight at room temperature. The mixture was given to approx. 800 g of ice and extracted three times with 250 ml dichloromethane each. The organic layer was washed twice with 250 ml of a saturated sodium bicarbonate solution and once with 200 ml of a saturated sodium chloride solution.

After drying over magnesium sulphate the solvent was removed in vacuo. The product was purified by column chromatography on silica (heptane/dichloromethane 1:1) to yield 79.4 g (74%) of the desired product as a slightly off-white oil, which slowly crystallized. $^1$H-NMR (400 MHz, CDCl$_3$): δ=7.44 (t, 1H, aromatic), 7.30 (d, 1H, aromatic), 7.27 (d, 1H, aromatic), 3.38 (dd, 1H, COCH), 2.79, 2.60 (2×m, 21-1, benzylic), 2.10, 1.21 (2×m, 1H, CH$_2$-t-Bu), 0.90 (s, 9H, t-Bu) ppm.

7-(4'-tert-Butyl-phenyl)-2-(2,2-dimethyl-propyl)-indan-1-one

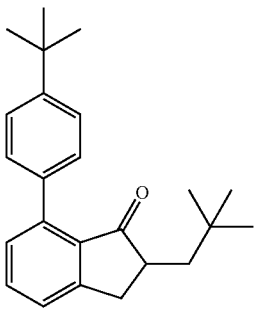 [SMILES: CC(C)(C)CC1Cc2cccc(-c3ccc(C(C)(C)C)cc3)c2C1=O]

35 g (148 mmole) 7-Chloro-2-(2,2-dimethyl-propyl)-indan-1-one, 31.6 g (1.2 eq.) tert-butylphenyl boronic acid, 34.5 g sodium carbonate, 438 ml ethylene glycol and 88 ml water were placed in a 1 l—roundbottom flask equipped with a mechanical stirrer and a reflux condenser. The mixture was degassed three times by slight evacuation and recharging with argon. A premixed catalyst solution consisting of 67 mg (0.2 mole %) palladium acetate, 1.94 ml NaTPPTS (2.6 M in water, 0.8 mole %) and 2 ml of water was added and the mixture was refluxed at 125° C. until complete conversion (approx. 4 h). 100 ml of water were added and the mixture was extracted three times with 100 ml of toluene each. The combined organic layers were washed twice with 100 ml water and once with 100 ml of a saturated sodium chloride solution. Drying over magnesium sulphate and evaporation of the solvent in vacuo yielded 58.82 g (quant.) of the desired product as a yellow sticky oil. $^1$H-NMR (400 MHz, CDCl$_3$): δ=7.58 (t, 1H, aromatic), 7.48-7.17 (m, 6H, aromatic), 3.48 (m, 1H, (C=O)CH), 2.88, 2.63 (2×m, 2H, benzylic), 2.38 (s, 1H), 2.13 (m, 1H, CH$_2$-t-Bu), 1.40 (s, 9H, Ph-t-Bu), 1.03 (s, 9H, CH$_2$-t-Bu) ppm.

4-(4'-tert-Butyl-phenyl)-2-(2,2-dimethyl-propyl)-1H-indene

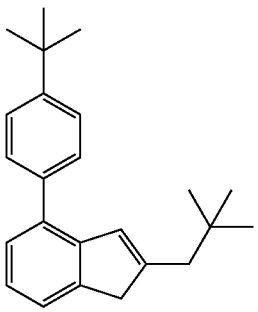 [SMILES: CC(C)(C)CC1=Cc2c(cccc2-c2ccc(C(C)(C)C)cc2)C1]

50 g (150 mmole) 7-(4'-tert-Butyl-phenyl)-2-(2,2-dimethyl-propyl)-indan-1-one were dissolved in 180 ml toluene in a 500 ml—roundbottom flask equipped with a reflux condenser. 6.22 g (1.1 eq.) sodium borohydride were added. Then 26.1 ml (4.3 eq.) methanol were added at 50° C. and the mixture was stirred for 4 h at 50° C. Another 3.11 g sodium borohydride and 10.3 g methanol were added and the mixture was stirred at 50° C. overnight. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 300 ml of toluene. After addition of 1 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate, evaporation of the solvent and recrystallization from 500 ml ethanol afforded 35.3 g (74%) of the desired indene as white crystals. $^1$H-NMR (400 MHz, CDCl$_3$): δ=7.47 (s, 4H, aromatic), 7.34 (d, 1H, aromatic), 7.25 (d, 1H, aromatic), 7.16 (t, 1H, aromatic), 6.72 (s, 1H, C=CH), 3.44 (s, 2H, benzylic), 2.36 (s, 2H, CH$_2$-t-Bu), 1.37 (s, 9H, Ph-t-Bu), 0.96 (s, 9H, CH$_2$-t-Bu) ppm.

Dimethylsilandiyl-bis-(2-(tert-butylmethyl)-4-(4'-tert-butylphenyl)-1-indenyl)zirconium dichloride

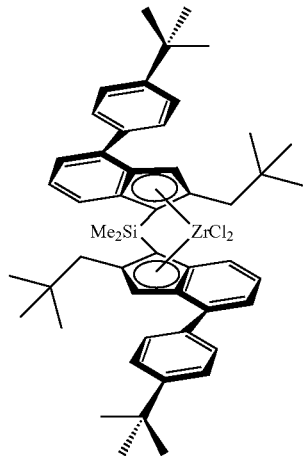

2 g (6.28 mmole) 4-(4-tert-Butyl-phenyl)-2-(2,2-dimethyl-propyl)-1H-indene were dissolved in 34 ml toluene and 2 ml of THF in a 100 ml—roundbottom flask. 2.64 ml of n-butyl lithium (2.5 M in toluene, 6.6 mmole, 1.05 eq.) were added at room temperature and the solution was stirred for 1 h at 80° C. After cooling to 40° C. 405 mg (3.2 mmole, 0.5 eq.) dimethyldichlorosilane were added in one portion and the mixture was stirred at 60° C. for 17 h. The solvent was removed in vacuo and 20 ml diethyl ether were added. 2.64 ml of n-butyl lithium (2.5 M in toluene, 6.6 mmole, 1.05 eq.) were added at room temperature and the mixture was stirred overnight at room temperature. After cooling to room temperature 776 mg (3.3 mmole, 0.53 eq. regarding to "indene") zirconium tetrachloride were added in portions. The orange-yellow suspension was stirred for 5 h at room temperature and the complex was isolated by filtration and washing with diethyl ether to yield 1.59 g crude complex. The racemic form was isolated by fractional recrystallization from toluene. Yield: 0.65 g (24%) as a bright yellow powder. $^1$H-NMR (400 MHz, CDCl$_3$): δ=7.62 (d, 2H, aromatic), 7.58, 7.45 (2×d, 8H, aromatic), 7.37 (d, 2H, aromatic), 7.23, 7.16, 7.08 (3×m, 10H, aromatic+toluene), 6.93 (s, 2H, indenyl-H), 2.64 (d, 2H, indenyl-CH$_2$), 2.34 (s, toluene), 2.15 (d, 2H, indenyl-CH$_2$), 1.35 (s, 6H, Si(CH$_3$)$_2$), 1.32 (s, 18H, Ph-t-Bu), 0.83 (s, 18H, CH$_2$-t-Bu) ppm.

Example 6

Dimethylsilandiyl-bis-(2-(1-adamantylmethyl)-4-(4'-tert-butylphenyl)-1-indenyl)-zirconium dichloride 1-(2-Bromo-ethyl)-adamantane

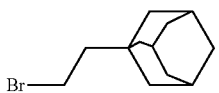 [SMILES: BrCCC12CC3CC(CC(C3)C1)C2]

In a 1 l—roundbottom flask equipped with a reflux condenser 164 g concentrated sulphuric acid and 200 g hydrobromic acid (48% in water) were added subsequently under cooling with an ice bath to 126.20 g (0.70 mole) 2-(1-adamantyl)ethanol. The mixture was refluxed for 6 h and after cooling to room temperature given to 400 g of ice. The aqueous phase was extracted with 400 ml pentane. The organic layer was washed with a 2 M NaOH-solution and with water, dried over magnesium sulphate, and the solvent was removed in vacuo. The product was distilled in vacuo to yield 153.2 g (90%) of (1-(2-Bromo-ethyl)-adamantane as a colourless oil. $^1$H-NMR (400 MHz, CDCl$_3$): δ=3.29 (t, 2H, CH$_2$Br), 1.71 (t, 2H, CCH$_2$CH$_2$Br), 1.56-1.17 (m, 15H, aliphatic) ppm.

1-(2-Chloro-phenyl)-3-(1-adamantyl)-propan-1-one

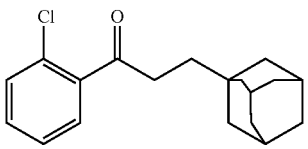 [SMILES: O=C(CCC12CC3CC(CC(C3)C1)C2)c1ccccc1Cl]

15.57 g (640 mmole) Magnesium turnings were placed in a 1 l—roundbottom flask equipped with a dropping funnel and a reflux condenser, and 50 ml of THF were added. The magnesium was etched slightly with a few crystals of iodine and then 2 g of (1-(2-bromo-ethyl)-adamantane were added and the mixture was heated locally. After the start of the Grignard-formation the rest of the (1-(2-bromo-ethyl)-adamantane in 350 ml of THF (143.5 g in total, 590 mmole) were added within a period of 20 min. The mixture was refluxed for 1.5 h and then cooled to room temperature. In a separate 2 l—roundbottom flask 70.5 g (513 mmole) of 2-chloro-benzonitrile and 156 mg (0.16 mole %) copper(I)iodide were dissolved in 130 ml of THF. The Grignard-solution was added dropwise over a period of 30 min and the reaction mixture was refluxed for 3 h. After standing overnight at room temperature, a mixture of 190 ml water and 127 ml concentrated hydrochloric acid were added very carefully, causing a strongly exothermic reaction. The mixture was stirred at 50° C. for 1 h and the layers were separated. The aqueous layer was extracted twice with 150 ml of toluene each. The combined organic layers were washed twice with 2 M sulphuric acid, once with a saturated sodium bicarbonate solution and once with a saturated sodium chloride solution. After drying over magnesium sulphate the solvent was evaporated in vacuo to yield 178.7 g (quant.) of the desired phenone as slightly brown oil. $^1$H-NMR (400 MHz, CDCl$_3$): δ=7.39-7.12 (m, 4H, aromatic), 2.55 (t, 2H, COCH$_2$), 1.40-1.13 (m, 17H, aliphatic) ppm.

7-Chloro-2-(1-adamantylmethyl)-indan-1-one

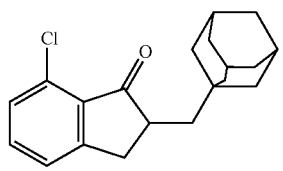 [SMILES: O=C1c2c(Cl)cccc2CC1CC12CC3CC(CC(C3)C1)C2]

78.7 g (260 mmole) 1-(2-Chloro-phenyl)-3-(1-adamantyl)-propan-1-one, 77.5 g (2.1 eq.) urotropine and 72.6 g (2.7 eq.) of acetic anhydride were placed in a 500 ml roundbottom flask and the mixture was stirred at 80° C. for 4 h. Then 100 ml water and 100 ml 2M NaOH were added and the mixture was extracted two times with 200 ml dichloromethane each. The organic layer was washed two times with 100 ml saturated aqueous ammonium chloride and dried over magnesium sulphate. The solvent amount was reduced in vacuo to a total of 150 ml volume and the solution was added dropwise over a period of 2.5 h to 660 g of hot (70-75° C.) concentrated sulphuric acid. After stirring for an additional 30 min at 75° C. the mixture was allowed to stand overnight at room temperature. The mixture was given to approx. 500 g of ice and extracted three times with 150 ml dichloromethane each. The organic layer was washed twice with 150 ml of a saturated sodium bicarbonate solution and once with 100 ml of a saturated sodium chloride solution. After drying over magnesium sulphate the solvent was removed in vacuo. The product was purified by column chromatography on silica (heptane/dichloromethane 5:1) to yield 58 g (71%) of the desired product as a slightly off-white glassy solid. $^1$H-NMR (400 MHz, CDCl$_3$): δ=7.39 (t, 1H, aromatic), 7.27 (d, 1H, aromatic), 7.21 (d, 1H, aromatic), 3.37 (dd, 1H, COCH), 2.70 (m, 2H, benzylic), 1.36-1.18 (m, 17H, aliphatic) ppm.

7-(4'-tert-Butyl-phenyl)-2-(1-adamantylmethyl)-indan-1-one

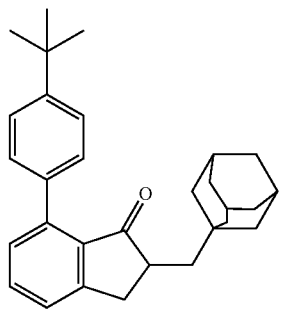 [SMILES: CC(C)(C)c1ccc(-c2cccc3c2C(=O)C(CC24CC5CC(CC(C5)C2)C4)C3)cc1]

71.8 g (228 mmole) 7-Chloro-2-(1-adamantylmethyl)-indan-1-one, 49 g (1.2 eq.) 4-tert-butyl-benzene boronic acid, 53 g sodium carbonate, 750 ml ethylene glycol and 150 ml water were placed in a 2 l—roundbottom flask equipped with a mechanical stirrer and a reflux condenser. The mixture was degassed three times by slight evacuation and recharging with argon. A premixed catalyst solution consisting of 103 mg (0.2 mole %) palladium acetate, 3 ml NaTPPTS (2.6 M in water, 0.8 mole %) and 2 ml of water was added and the mixture was refluxed at 125° C. until complete conversion (approx. 6 h). 300 ml of water were added and the mixture was extracted three times with 150 ml of toluene each. The combined organic layers were washed twice with 100 ml water and once with 100 ml of a saturated sodium chloride solution. Drying over magnesium sulphate and evaporation of the solvent in vacuo yielded 94.1 g (quant.) of the desired product as a yellow sticky oil. $^1$H-NMR (400 MHz, CDCl$_3$): δ=7.52 (t, 1H, aromatic), 7.41, 7.36 (2×d, 4H, aromatic), 7.21 (m, 2H, aromatic), 3.37 (m, 1H, COCH), 2.77-2.68 (m, 2H, benzylic), 1.42-1.18 (m, 26H, aliphatic & C(CH$_3$)$_3$) ppm.

7-(4'-tert-Butyl-phenyl)-2-(1-adamantylmethyl)-1H-indene

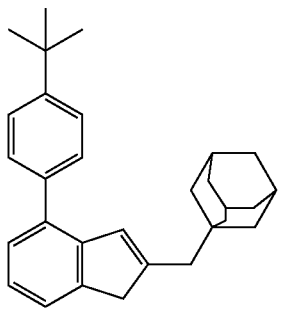 [SMILES: CC(C)(C)c1ccc(-c2cccc3c2C=C(CC24CC5CC(CC(C5)C2)C4)C3)cc1]

94.0 g (228 mmole) 7-(4'-tert-Butyl-phenyl)-2-(1-adamantylmethyl)-indan-1-one were dissolved in 291 ml toluene in a 1 l—roundbottom flask equipped with a reflux condenser. 9.5 g (1.1 eq.) sodium borohydride were added. Then 40 ml (4.3 eq.) methanol were added at 50° C. and the mixture was stirred for 6 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 350 ml of toluene. After addition of 0.7 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate, evaporation of the solvent and crystallization from 900 ml ethanol afforded 76.9 g (85%) of the desired indene as white crystals. $^1$H-NMR (400 MHz, CDCl$_3$): δ=7.44, 7.32, 7.23, 7.12 (4×m, 7H, aromatic), 6.63 (s, 1H, =CH), 3.32 (s, 2H, benzylic), 2.29 (d, 2H, aliphatic), 1.69-1.15 (m, 15H, aliphatic), 1.38 (s, 9H, C(CH$_3$)$_3$) ppm.

Dimethylsilandiyl-bis-(2-(1-adamantylmethyl)-4-(4'-tert-butylphenyl)-1-indenyl)-zirconium dichloride

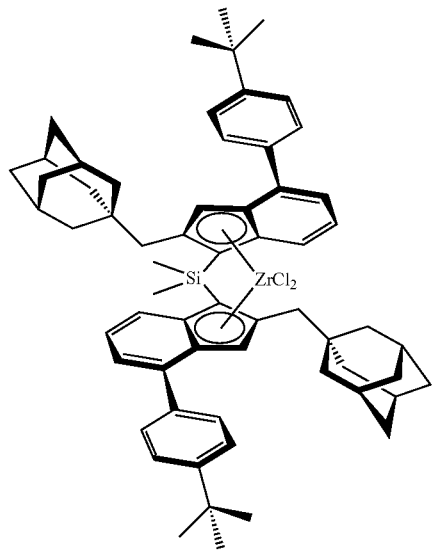

23 g (58 mmole) 7-(4'-tert-Butyl-phenyl)-2-(1-adamantylmethyl)-1H-indene were dissolved in 340 ml toluene and 20 ml of THF in a 1000 ml—roundbottom flask. 24.4 ml of n-butyl lithium (2.6 M in toluene, 63.4 mmole, 1.1 eq.) were added at room temperature and the solution was stirred for 1 h at 80° C. After cooling to 40° C. 3.5 ml (3.74 g, 29 mmole, 0.5 eq.) dimethyldichlorosilane were added in one portion and the mixture was stirred at 60° C. for 8.5 h. The solvent mixture was removed in vacuo (purity of the ligand>94% according to GC—analysis) and the ligand was dissolved in 200 ml of diethyl ether (yellowish suspension due to LiCl). 23.8 ml of n-butyl lithium (61.9 mmole, 1.07 eq. regarding to "indene", 2.6 M in toluene) were added at room temperature and the mixture was stirred overnight at room temperature. Then 7.1 g (30.5 mmole, 0.525 eq. regarding to "indene") zirconium tetrachloride were added in portions. The orange-yellow suspension was stirred overnight at room temperature and the solid was isolated by filtration. Washing with 2 portions of 35 ml diethyl ether each and drying in vacuo yielded 25.1 g of the crude complex (rac/meso=1.6:1, containing lithium chloride). The racemic complex was isolated by fractional crystallization from toluene. Yield: 9.8 g (9.7 mmol, 33%) as a bright yellow powder. $^1$H-NMR (400 MHz, CDCl$_3$): δ=7.62 (d, 2H, aromatic), 7.55, 7.42 (2×d, 8H, aromatic), 7.32 (d, 2H, aromatic), 7.21, 7.15, 7.08 (3×m, 10H, aromatic+toluene), 6.83 (s, 2H, indenyl-H), 2.53 ("dd", 2H, indenyl-CH$_2$), 2.34 (s, toluene) 2.09 ("dd", 2H, indenyl-CH$_2$), 1.75-1.15 (m, 30H, aliphatic), 1.34 (s, 18H, C(CH$_3$)$_3$), 1.32 (s, 6H, Si(CH$_3$)$_2$) ppm.

Example 7

(Methyl)(n-propyl)silandiyl-bis-(2-(cyclohexylmethyl)-4-(4'-tert-butylphenyl)-1-indenyl)-zirconium dichloride

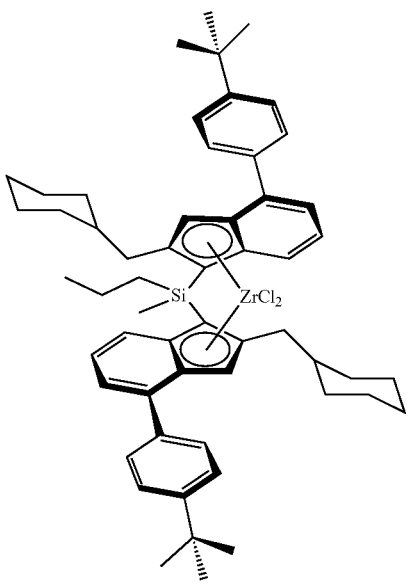

2.0 g (5.8 mmole) 7-(4'-tert-Butyl-phenyl)-2-cyclohexylmethyl-1H-indene were dissolved in 10 ml dimethoxy ethane in a 100 ml—roundbottom flask. 2.44 ml of n-butyl lithium (2.6 M in toluene, 6.34 mmole, 1.1 eq.) were added at room temperature and the solution was stirred for 1 h at 80° C. After cooling to 40° C. 456 mg (2.9 mmole, 0.5 eq.) (methyl)(n-propyl)dichlorosilane were added in one portion and the mixture was stirred at 60° C. for 17 h. The solvent mixture was removed in vacuo (purity of the ligand>99% according to GC—analysis) and the ligand was dissolved in 20 ml of diethyl ether (yellowish suspension due to LiCl). 2.44 ml of n-butyl lithium (6.34 mmole, 1.05 eq. regarding to "indene", 2.6 M in toluene) were added at room temperature and the mixture was stirred overnight at room temperature. Then 718 mg (3.08 mmole, 0.53 eq. regarding to "indene") zirconium tetrachloride were added in portions. The orange-yellow suspension was stirred for 5 h at room temperature and the lithium chloride was removed by filtration and washing two times with 5 ml of diethyl ether each. The solvent was removed in vacuo and the residue was recrystallized from heptane to yield 660 mg (0.707 mmole, 24%) of the racemic complex as a bright yellow powder. $^1$H-NMR (400 MHz, CDCl$_3$): δ=7.62 (d, 2H, aromatic), 7.57, 7.44 (2×d, 8H, aromatic), 7.35 (d, 2H, aromatic), 7.11-7.06 (m, 2H, aromatic), 6.94 (s, 2H, indenyl-H), 2.63 ("dd", 2H, indenyl-CH$_2$), 2.13 ("dd", 2H, indenyl-CH$_2$), 1.88 (m, 4H, aliphatic), 1.67-1.45 (m, 12H aliphatic), 1.35 (s, 18H, C(CH$_3$)$_3$), 1.32 (s, 3H, SiCH$_3$), 1.31-0.76 (m, 14H, aliphatic) ppm.

Comparative Example 8

Dimethylsilanediylbis(2-methylindenyl)zirconium dichloride

Preparation of Dimethylbis(2-methylindenyl)silane 8.0 g (61.4 mmoles) of 2-methylindene were introduced into 175 mL of toluene and 13 mL of THF, and 24.6 mL of n-butyllithium (2.5 M in toluene) were added without interruption at room temperature. After this addition was complete, the mixture was heated to 80° C. and stirred at this temperature for one hour. It was allowed to cool to 40° C., then 3.96 g (30.7 mmoles) of dimethyldichlorosilane were slowly added dropwise. After this addition, the reaction solution was stirred for three hours at 60° C. and then overnight at room temperature. 70 mL of water were added and the phases that form were separated. The organic phase was washed with 100 mL of water, and the aqueous phase was extracted three times with a total of 100 mL of toluene. The combined organic phases were dried over magnesium sulfate. After separation of the magnesium sulfate, the solvent was removed and the residue was purified by column chromatography. The desired product was isolated in a yield of 8.16 g (84%) (purity 99%).

$^1$H-NMR (400 MHz, CDCl$_3$):
7.55-7.12 (m, 8H, arom-H), 6.40 (s, br, 2H, olefin-H indene), 3.51, 3.48 (each s, each 1H, SiC-H), 2.09, 2.04 (each s, each 3H, CH$_3$), 1.71 (s, 6H, CH$_3$), 0.08 (s, 6H, SiMe$_2$).

Dimethylsilanediylbis(2-methylindenyl)zirconium dichloride

A solution of 5.0 g (15.8 mmoles) of dimethylbis(2-methylindenyl)silane in 45 mL of tetrahydrofuran was treated with 12.6 mL of an n-butyllithium solution (2.5 M in hexane) and stirred for 16 hours at room temperature. The reaction solution was cooled to 0° C. and 1.84 g (7.9 mmoles) of zirconium tetrachloride were added in portions. After this addition, the solution was heated to room temperature and stirred for two hours at this temperature. The precipitate that forms was filtered through a G3 fritted glass filter, and the residue was washed once with 10 mL of diethyl ether. The residue was then dried in a vacuum, and the desired product was obtained in a yield of 1.89 g (50%) with a rac:meso ratio close to 1:1. The isomers must be separated in a subsequent step to obtain selective catalysts for propylene polymerization.

$^1$H-NMR (400 MHz, CDCl$_3$):
7.75-6.85 (m, 10H, arom-H), 2.24 (s, 6H, CH$_3$), 1.25 (s, 6H, aliph-H).

Comparative Example 9

Dimethylsilanediylbis(2-methyl-4,5-benzoindenyl) zirconium dichloride

Dimethylbis(2-methyl-4,5-benzoindenyl)silane

A solution of 7.0 g (38.8 mmoles) of the isomeric mixture of 2-methyl-4,5-benzoindene and 2-methyl-6,7-benzoindene in 65 mL of tetrahydrofuran was treated with 15.6 mL of an n-butyllithium solution (2.5 M in hexane) and heated under reflux for one hour. The resulting red solution was then added dropwise at room temperature to a solution of 2.51 g (19.4 mmoles) of dimethyldichlorosilane in 10 mL of THF, and the resulting solution was heated under reflux for 5-6 hours. The reaction solution was then cooled to room temperature and poured into ice water. The aqueous phase was repeatedly extracted with 60 mL of diethyl ether. After the organic phase has been dried with magnesium sulfate, the solvent was removed and the residue was purified by column chromatography. The desired product was isolated in a yield of 4.85 g (60%).

$^1$H-NMR (400 MHz, CDCl$_3$):

8.01-7.36 (m, 12H, arom-H), 7.21 (s, br, 2H, olefin-H indene), 3.96 (s, 2H, SiC—H), 2.43 (s, 6H, CH$_3$), −0.22 (s, 6H, SiMe$_2$).

Dimethylsilanediylbis(2-methyl-4,5-benzoindenyl) zirconium dichloride

A solution of 3.0 g (7.2 mmoles) of dimethylbis(2-methyl-4,5-benzo-indenyl)silane in 30 mL of tetrahydrofuran was treated with 5.8 mL of an n-butyllithium solution (2.5 M in hexane) and stirred for 16 hours at room temperature. The reaction solution was cooled to 0° C. and 1.68 g (7.2 mmoles) of zirconium tetrachloride were added in portions. After this addition, the solution was warmed to room temperature and stirred for two hours at this temperature. The precipitate that forms was filtered through a G3 fritted glass filter and the residue was washed once with 5 mL of diethyl ether. The residue was then dried in a vacuum, and the desired product was obtained in a yield of 2.32 g (56%) with a rac:meso ratio of about 1:1. The isomers must be separated in a subsequent step to obtain selective catalysts for propylene polymerization.

$^1$H-NMR (400 MHz, CDCl$_3$):
7.85-7.10 (m, 14H, arom-H), 2.25 (s, 6H, CH$_3$), 1.30 (s, 6H, CH$_3$).

Comparative Example 10

Dimethylsilanediylbis(2-methyl-4-(4'-tert-butylphenyl)indenyl)zirconiumdichloride

Dimethylbis(2-methyl-4-(4'-tert-butylphenyl)indenyl)silane 8.0 g (30.5 mmoles) of 2-methyl-4-(4'-tert-butylphenyl)-1-indene were introduced into 180 mL of toluene and 10 mL of THF, then 12.4 mL of n-butyllithium solution (2.5 M in toluene) were added without interruption at room temperature. After this addition was complete, the mixture was heated to 80° C. and stirred at this temperature for one hour. It was allowed to cool to 40° C., then 2.0 g (15.3 mmoles) of dimethyldichlorosilane were slowly added dropwise. After this addition, the reaction solution was stirred for three hours at 60° C. and then overnight at room temperature. 80 mL of water were added and the phases that form were separated. The organic phase was washed with 80 mL of water, and the aqueous phase was extracted three times with a total of 80 mL of toluene. The combined organic phases were dried over magnesium sulfate. After separation of the magnesium sulfate, the solvent was removed and the residue was purified by column chromatography. The desired product was isolated in a yield of 7.27 g (80%) (purity 97%).

$^1$H-NMR (400 MHz, CDCl$_3$):
7.73-7.12 (m, 16H, arom-H), 6.75 (s, br, 2H, olefin-H indene), 3.76 (s, 2H, SiC—H), 2.17 (s, 6H, CH$_3$), −0.20 (m, 6H, SiMe$_2$).

Dimethylsilanediylbis(2-methyl-4-(4'-tert-butylphenyl)indenyl)zirconiumdichloride 143 g (0.54 moles) of 2-methyl-4-(4'-tert-butylphenyl)-1-indene were introduced into 2.4 L of toluene and 143 mL of tetrahydrofuran, and 234 mL of an n-butyllithium solution (2.5 M in toluene) were added without interruption at room temperature. After this addition was complete, the mixture was heated to 80° C. and stirred for one hour at this temperature. It was allowed to cool to 40° C., then 33.6 g (0.26 moles) of dimethyldichlorosilane were added dropwise to this reaction solution. The reaction solution was stirred for three hours at 60° C. It was cooled to room temperature, and then 218 mL of an n-butyllithium solution (2.5 M in toluene) were added dropwise. After this addition was complete, the solution was heated to 80° C. and stirred for one hour at this temperature. It was allowed to cool to room temperature, then 71.1 g (0.305 moles) of zirconium tetrachloride were added in portions. The solution was stirred for two hours at 45° C. and the precipitate that forms was separated by filtration through a G3 fritted glass filter and then carefully washed with 700 mL portions of tetrahydrofuran. The residue was dried in an oil-pump vacuum, and the product was obtained in a yield of 155 g (80%) and with a rac:meso ratio of 1:1. The isomers must be separated in an additional step to obtain selective catalysts for propylene polymerization.

$^1$H-NMR (400 MHz, CDCl$_3$):
7.63-6.85 (m, 16H, arom-H), 2.44 (s, 3H, meso-CH$_3$), 2.24 (s, 3H, rac-CH$_3$), 1.46 (s, 1.5H, meso-SiMe$_2$), 1.33-1.29 (m, 21H, tert-butyl, rac-SiMe$_2$), 1.23 (s, 1.5H, meso-CH$_3$).

Comparative Example 11

Dimethylsilanediyl(2-methyl-4-(4'-tert-butylphenyl)indenyl)(2-isopropyl-4-(4'-tert-butylphenyl)indenyl)zirconium dichloride

Dimethylsilanediyl(2-methyl-4-(4'-tert-butylphenyl)-1-indene)(2-isopropyl-4-(4'-tert-butylphenyl)-1-indene)

16.8 g (57.7 mmoles) of 2-isopropyl-4-(4'-tert-butylphenyl)-1-indene were introduced into 131 mL of toluene and 5.0 mL of THF, and 21.5 mL of an n-butyllithium solution (2.68 M in toluene) were added without interruption at room temperature. After this addition was complete, the mixture was heated to 80° C. and stirred for one hour at this temperature. It was then allowed to cool to room temperature. The resulting reaction solution was added dropwise to a solution of 20.5 g (57.7 mmoles) of (2-methyl-4-(4'-tert-butylphenyl)-1-indenyl)dimethylchlorosilane in 246 mL of toluene over a period of one hour. The mixture was stirred overnight at room temperature. Then 60 mL of water were added and the phases which form were separated. The organic phase was washed with 100 mL of water and the combined aqueous phases were extracted twice with a total of 100 mL of toluene. The combined organic phases were dried over magnesium sulfate. After filtering off the magnesium sulfate, the solvent was removed and the residue was dried in an oil pump vacuum. The desired product was isolated in a yield of 31.6 g (90%) (purity: 90%).

$^1$H-NMR (400 MHz, CDCl$_3$):
7.51-7.1 (m, 14H, arom-H), 6.71, 6.62 (each s, each 1H, olefin-H-indene), 3.35, 3.31 (each s, each 2H, CH$_2$—H), 2.65 (m, 1H, CH-isopropyl), 2.41 (s, 3H CH$_3$—H), 1.35, 1.33 (each s, each 9H, tert-butyl), 1.15 (d, 6H, isopropyl-CH$_3$), 0.2, 0.0 (each d, each 3H, SiCH$_3$).

Dimethylsilanediyl(2-methyl-4-(4'-tert-butylphenyl)indenyl)(2-isopropyl-4-(4'-tert-butylphenyl)indenyl)zirconium dichloride 36.6 g (60 mmoles) of dimethylsilanediyl(2-methyl-4-(4'-tert-butylphenyl)-1-indene)(2-isopropyl-4-(4'-tert-butylphenyl)-1-indene) were introduced into 366 ml of diethyl ether, and 44.9 mL of an n-butyllithium solution (2.68 M in toluene) were added without interruption at room temperature. After this addition was complete, the mixture was stirred over night at this temperature. It was then cooled to 0° C. and 14.0 g (60 mmoles) of zirconium tetrachloride were added in portions. The mixture was allowed to warm to room temperature and was stirred for another two hours at this temperature. The precipitate that forms was separated by filtration through a G3 fritted glass filter and was washed with two 50 mL portions of tetrahydrofuran and with one 70 mL portion of pentane. The residue was dried in an oil-pump vacuum, and the product was obtained in a yield of 23.5 g (50%) and with a rac:meso ratio of about 1:1. The isomers must be separated in a subsequent step to obtain selective catalysts for propylene polymerization.

$^1$H-NMR (400 MHz, CDCl$_3$):

7.7-6.9 (m, 14H, arom-H), 3.26 (m, 1H, CH-isopropyl), 2.23 (s, 3H, CH$_3$), 1.31 (s, 18H, tert-butyl), 1.33, 1.32 (each s, each 3H, Si—CH$_3$), 1.08, 1.03 (each d, each 3H, isopropyl-CH$_3$).

Preparation of Methylaluminoxane Treated Silica

Example 12

To a stirred suspension of 293 g of silica (Grace XPO2107, dried at 180° C. and 1 mbar for 16 hours, LOD<0.5 wt % and LOI=2.6 wt %) in 1500 mL of toluene is added slowly 300 mL of a 30 wt-% solution of methylaluminoxane in toluene (Albemarle Corporation) at room temperature. During the addition the temperature must not exceed 30° C. After the addition is complete, the mixture is stirred for two hours at room temperature and separated by filtration. The residue is washed with two 1500 mL portions of toluene and three 1500 mL portions of isohexane and dried in vacuum to constant weight. The methylaluminoxane treated silica is obtained as a free-flowing powder in a yield of 408 g.

Preparation of Supported Metallocene Catalysts

Example 13

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 326 mg of rac-dimethylsilanediyl-bis-(2-(cyclohexylmethyl)-4-(4'-tert-butyl-phenyl)-1-indenyl)-zirconium dichloride (prepared in Example 1) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 12.0 g.

Example 14

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 321 mg of rac-dimethylsilanediyl-bis-(2-(cyclohexylmethyl)-4-(1-naphthyl)-1-indenyl)-zirconium dichloride (prepared in Example 2) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 11.8 g.

Example 15

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 295 mg of rac-dimethylsilanediyl-bis-(2-(cyclohexylmethyl)-4-(4'-methylphenyl)-1-indenyl)-zirconium dichloride (prepared in Example 3) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 11.0 g.

Example 16

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 305 mg of rac-dimethylsilanediyl-bis-(2-(cyclohexylmethyl)-4-(3',5'-dimethylphenyl)-1-indenyl)-zirconium dichloride (prepared in Example 4) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 12.1 g.

Example 17

10.0 g of the methylaluminoxane treated silica prepared in Example 12 are placed in a fitted glass filter as a column with a smooth surface. A minimal amount of toluene is added and the treated silica is carefully stirred with a spatula to remove any air pockets in the column. The excess toluene is removed by filtration leaving a smooth surface. In a separate flask 307 mg of rac-dimethylsilanediyl-bis-(2-(tert-butylmethyl)-4-(4'-tert-butylphenyl)-1-indenyl)-zirconium dichloride (prepared in Example 5) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 11.4 g.

Example 18

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 363 mg of rac-dimethylsilanediyl-bis-(2-(1-adamantylmethyl)-4-(4'-tert-butylphenyl)-1-indenyl)-zirconium dichloride (prepared in Example 6) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 11.8 g.

Example 19

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 333 mg of rac-(n-propyl)(methyl)silanediyl-bis-(2-(cyclohexylmethyl)-4-(4'-tert-butyl-phenyl)-1-indenyl)-zirconium dichloride (prepared in Example 7) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 10.7 g.

Comparative Example 20

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 171 mg of rac-dimethylsilanediyl-bis-(2-methylindenyl)-zirconium dichloride (prepared in Comparative Example 8) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 12.2 g.

Comparative Example 21

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 207 mg of rac-dimethylsilanediyl-bis-(2-methyl-4,5-benzoindenyl)-zirconium dichloride (prepared in Comparative Example 9) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.5 g.

Comparative Example 22

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 267 mg of rac-dimethylsilanediyl-bis-(2-methyl-4-(4'-tert-butylphenyl)-1-indenyl)-zirconium dichloride (prepared in Comparative Example 10) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.9 g.

Comparative Example 23

10.0 g of the methylaluminoxane treated silica prepared in Example 12 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 277 mg of rac-dimethylsilanediyl(2-methyl-4-(4'-tert-butylphenyl)indenyl)(2-isopropyl-4-(4'-tert-butylphenyl)indenyl)zirconium dichloride (prepared in Comparative Example 11) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.9 g.

Example 24

To a stirred suspension of 100 g of silica (Grace XPO8001, dried at 180° C. and 1 mbar for 16 hours, LOD<0.5 wt % and LOI=2.5 wt %) in 480 mL of toluene is added slowly 250 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 500 mL portions of toluene and three 500 mL portions of isohexane and dried in vacuum to constant weight. The methylaluminoxane treated silica is obtained as a free-flowing powder in a yield of 180 g.

10.0 g of the methylaluminoxane treated silica are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 363 mg of rac-dimethylsilanediyl-bis-(2-(1-adamantylmethyl)-4-(4'-tert-butylphenyl)-1-indenyl)-zirconium dichloride (prepared in Example 6) are mixed with 10 mL of toluene and 33.4 mL of a 10 wt-% solution of triisobutylaluminum in heptane (Akzo Nobel). The slurry is stirred at room temperature for one hour. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing powder in a yield of 12 g.

Polymerizations:

Polymerization Procedure (batch propylene homo- and co-polymerization):

A dry and nitrogen purged 5 $dm^3$ autoclave equipped with a stirrer is charged with if desired 100 g of metallocene polymer seed bed. Optionally, a certain amount of hydrogen is metered in. Triisobutylaluminum (1 $cm^3$ of a 10 wt.-% solution in heptane), liquid propylene (one-half of the total amount used for the run), and optionally, a certain amount of ethylene are metered in and the mixture is stirred for at least 5 minutes (stirrer speed 200 rpm) at 20° C. Then supported metallocene catalyst, suspended in 5 $cm^3$ of white oil, is injected with liquid propylene (one-half of total amount used for the run). The reactor is heated to the internally measured run temperature (65, 60 or 30° C.) within 11 minutes. The polymerization reaction is allowed to proceed at the run temperature for either 15 or 60 minutes. During the 60 min copolymerization runs the reactor pressure was maintained by continuous feeding of ethylene and propylene. The polymerization is stopped by releasing the monomer and cooling down the reactor. The polymer is discharged and dried under reduced pressure.

Fifty-eight separate tests of inventive examples and comparative examples and the results in the aggregate are shown in Tables 1 and 2. In additions, Tables 3 through 12 have been created to isolate various reactor conditions.

Analysis of Results

While the invention of the present application is so exceptional that it shows unexpected improvements over the whole class of Metallocenes, the applicants note that true comparisons of the effect of this invention must be evaluated upon metallocenes of similar structure of the indenyl group at other than the 2 position. Therefore, while part of this analysis will make aggregate comparisons between the several inventive examples and the comparative examples, individual catalyst comparisons should only be made when the substitutions in all positions of the indenyl groups other than the 2 position are the same to ensure the comparison of apples to apples. Therefore, individual catalyst comparisons should only be made between inventive examples 13, 17 and 18 (various n-branched in the two position of the indenyl group) to comparative examples 22 (straight chain in the two position of the indenyl group) and 23 (α-branched in the two position of the indenyl) because the substitutions in all positions of the indenyl groups other than the 2 position are the same.

Table 1 and Table 2 represent the raw data presented by test runs; the remaining tables 3-12 break that data out by the ratio of propylene to ethylene (or if it is a propylene homopolymer) and whether hydrogen was used in the polymerization process.

Propylene Homopolymers
Analysis 1: Production of Propylene Polymers without the Ethylene Comonomer and not in the Presence of Hydrogen.

Table 3 shows the results of eight experimental Metallocene catalysts conforming to the requirements of the invention compared to four comparative examples. In the aggregate, the catalysts of the present invention showed more than a 50% increase in productivity while at the same time showing more than a 200% increase in Molecular Weight and almost a two degree Celcius increase in melting point (significant when the range of melting points for homopolymer polypropylene is 144 to 153). Further the catalysts of the current invention produced products with an aggregate MFR 2.16 of less than 1.5% of that of the comparative products and an aggregate MFR 5 of just greater than 2% of the comparative examples. This dramatic drop in MFR indicates a dramatic increase of Molecular Weight (more than 200%) and opens full access to application fields like film, pipe or sheets, where a high Molecular Weight is mandatory.

The individual catalyst comparisons between inventive samples 13, 17 and 18 and comparative examples 22 and 23 are just as dramatic. When examples 13, 17 and 18 are compared to comparative example 22, all three inventive examples exhibit significantly lower MFR 2.16, MFR 5 rates and increases in Molecular Weight. Specifically for MFR 2.16, the inventive examples 13; 17 and 18 show a respective reduction of 60%, and greater than 99%, and greater than 99% of the original value of example 22. For the MFR 5, the inventive examples 13, 17 and 18 show a respective reduction of 78%, 89% and greater than 99% of the original value of example 22. For the molecular weight, the inventive examples 13, 17 and 18 show a respective increase of 16%, 5% and 26% over the original value. Even more surprisingly is that the inventive examples showed these dramatic improvements in product properties at approximately the same productivity levels, and in the case of inventive example 13, a 59% increase in productivity.

When examples 13, 17 and 18 are compared to comparative example 23, all three inventive examples exhibit significantly lower MFR 2.16, MFR 5 rates and increases in Molecular Weight. Specifically for MFR 2.16, the inventive examples 13, 17 and 18 show a respective reduction of 88%, greater than 99%, and greater than 99% of the original value of example 23. For MFR 5, inventive examples 13, 17 and 18 show a respective reduction of 90%, 95% and greater than 99% of the original value of example 23. For the molecular weight, the inventive examples 13, 17 and 18 show a respective increase of 118%, 97% and 137% over the original value. Productivity was also massively enhanced, respectively by a 277%, 93% and 103% increase over the original value.

Analysis 2: Production of Propylene Polymers without the Ethylene Comonomer and with the Presence of Hydrogen.

Table 4 shows the results of eight experimental Metallocene catalysts conforming to the requirements of the invention compared to four comparative examples. However, in this case, hydrogen was added during the polymerization process to enhance catalyst productivity and to regulate the Molecular Weight. In the aggregate, the catalysts of the present invention showed more than a 94% increase in productivity while at the same time showing more than a 32% increase in Molecular Weight and almost a one point three degree Celcius increase in melting point (significant when the range of melting points for homopolymer polypropylene is 146 to 155). Further the catalysts of the current invention produced products with an aggregate MFR 2.16 of less than 34% of that of the comparative products and an aggregate MFR 5 of just greater than 31% of the comparative examples.

The individual catalyst comparisons between inventive samples 13, 17 and 18 and comparative examples 22 and 23 again are dramatic.

When examples 13, 17 and 18 are compared to comparative example 23, all three inventive examples exhibit significantly lower MFR 2.16, MFR 5 rates and increases in Molecular Weight. Specifically for MFR 2.16, the inventive examples 13, 17 and 18 show a respective reduction of 76%, 60%, and 76% of the original value of example 23. For MFR 5, inventive examples 13, 17 and 18 show a respective reduction of 78%, 64% and 80% of the original value of example 23. For the molecular weight, the inventive examples 13, 17 and 18 show a respective increase of 61%, 18% and 65% over the original value. Productivity was also significantly enhanced, respectively by a 109%, 84% and 84% increase over the original value.

When examples 13, 17 and 18 are compared to comparative example 22, productivity was significantly enhanced, respectively by a 67%, 47% and 47% increase over the original value, while making a product comparable commercial quality. A direct comparison of MFR and Molecular Weight values is not applicable in this case. The metallocene of the comparative example is well known to have a poor response to hydrogen, which would keep the molecular weight high and the MFR's low. The inventive examples all provide a far superior hydrogen response, which should lead to dramatically lower molecular weights and higher MFR's. That the inventive examples provide similar molecular weights and MFR responses (similar quality products) at far higher productivities, a very unexpected result.

Propylene/Ethylene Copolymers

The properties of products made from the inventive catalysts were tested at various levels of an ethylene/propylene mix to form copolymers. With the introduction of a new variable, the propylene to ethylene ration, far fewer datapoints were taken for the copolymers at each ratio because resources became limited. In each case the inventive catalyst from example 13 was tested, usually against the comparative catalyst from example 23. Occasionally other inventive catalysts were tested, but without a significant number of inventive catalysts being tested, an aggregate number would not be statistically significant for each propylene to ethylene ratio, with the exception of the ratio of 0.38, for which there were numberous data points. However, an analysis was conducted on the aggregate of all copolymers which shows significant and unexpected results.

Analysis 3: Aggregate Values of all Propylene/Ethylene Copolymers.

Table 5 represents the average values for productivity, MFR and molecular weight for all test runs of the inventive catalysts when used to make propylene/ethylene copolymer as compared to the comparative catalysts when used to make the same. Whenever a value is reported as "less than" or "greater than" a value, that value is adjusted to the nearest number that would make the inventive examples look poorest and the comparative examples look best. In short, Table 5 is created in a manner to show the worst case for the inventive examples and the best case for the comparative examples.

Even with these adjustments, the inventive catalysts, in the aggregate, show dramatic improvement over the comparative catalysts. The aggregate productivity of the inventive examples when used to make copolymers demonstrates a small improvement (1.5%) when compared to the comparative examples. However, this improvement proves to be quite significant when it is taken in light of the dramatic improvements to MFR 2.16, MFR 5 and Molecular Weight, all highly desirable qualities. In the aggregate when making copolymers, the inventive catalysts have a MFR 2.16 value that is less than 0.2% of that of the comparative catalysts, demonstrating an extremely significant improvement. Likewise, in the aggregate when making copolymers, the inventive catalysts have a MFR 5 value that is 0.5% of that of the comparative catalysts, again demonstrating an extremely significant improvement. In the aggregate when making copolymers, the inventive catalysts have an increase in molecular weight of 74% over that of the comparative catalysts. In the aggregate, the inventive catalysts are clearly and unexpected far superior to those of the comparative catalysts.

Analysis 4: Production of Propylene/Ethylene Copolymers with a Propylene/Ethylene Ratio of Approximately 48 and without the Presence of Hydrogen.

In this case, only one inventive catalyst (example 13) was tested against one comparative catalyst, (example 23), the results being presented in Table 6. As before, the inventive catalyst showed significant improvements over the comparative catalyst in all measured levels. Specifically for MFR 2.16, the inventive example 13 showed a 50% reduction of the original value of example 23. For MFR 5, inventive example 13 showed a 45% reduction of the original value of example 23. The molecular weight of the inventive example 13 showed an increase of 26% over the original value. Productivity was also significantly enhanced, with the inventive sample having a 118% increase over the comparative example's value.

Analysis 5: Production of Propylene/Ethylene Copolymers with a propylene/Ethylene Ratio of Approximately 31.5 and without the Presence of Hydrogen.

In this case, two inventive catalyst (examples 13 and 14) and one comparative catalyst (example 23), were tested, the results being presented in Table 7. However, as noted before, the only valid comparison may be made between inventive catalyst (example 13) and the comparative catalyst (example 23) because the substitutions are the same in all positions other than in 2 position of the indenyl group. Inventive example 14 is not considered in this analysis, nor would it be valid to do so.

As before, the inventive catalyst showed improvements over the comparative catalyst in all measured levels. While the MFR 2.16 value was the same for both examples, for MFR 5, inventive example 13 showed a 14% reduction of the original value of example 23. The molecular weight of the inventive example 13 showed an increase of 11.5% over the original value. Productivity was significantly enhanced, with the inventive sample having a 73% increase over the comparative example's value.

Analysis 6: Production of Propylene/Ethylene Copolymers with a Propylene/Ethylene Ratio of Approximately 15.8 and without the Presence of Hydrogen.

In this case, two inventive catalyst (examples 13 and 14) and one comparative catalyst (example 23) were tested, the results being presented in Table 8. However, as noted before, the only valid comparison may be made between inventive catalyst (example 13) and the comparative catalyst (example 23) because the substitutions are the same in all positions other than in 2 position of the indenyl group. Inventive example 14 is not considered in this analysis, nor would it be valid to do so.

In this case, once again the inventive catalyst achieves remarkably better productivity (12.5%) while still creating a comparable product of similar commercial value. The significantly increased productivity combined with the previously mentioned fact that Metallocene catalysts that are symmetrically substituted in the 2 position are far easier and more cost effective to make than asymmetrically substituted metallocenes demonstrate that this is an unexpectedly superior Metallocene catalyst.

Analysis 7: Production of Propylene/Ethylene Copolymers with a Propylene/Ethylene Ratio of Approximately 10.1 and without the Presence of Hydrogen.

In this case, two inventive catalyst (examples 13 and 14) and one comparative catalyst (example 23), were tested, the results being presented in Table 9. However, as noted before, the only valid comparison may be made between inventive catalyst (example 13) and the comparative catalyst (example 23) because the substitutions are the same in all positions other than in 2 position of the indenyl group. Inventive example 14 is not considered in this analysis, nor would it be valid to do so.

As with Analysis 6, the inventive catalyst in this example achieves better productivity (1.8%) while still creating a comparable product of similar commercial value. The increased productivity combined with the previously mentioned fact that Metallocene catalysts that are symmetrically substituted in the 2 position are significantly easier and more cost effective to make than asymmetrically substituted metallocenes demonstrate that this is an unexpectedly superior Metallocene catalyst.

Analysis 8: Production of Propylene/Ethylene Copolymers with a Propylene/Ethylene Ratio of Approximately 0.5 and without the Presence of Hydrogen.

In this case, two inventive catalyst (examples 13 and 19) and one comparative catalyst (example 21), were tested, the results being presented in Table 10. However, as noted before, the only valid comparison may be made between inventive catalyst with substitutions that are the same in all positions other than in 2 position of the indenyl group. These cases do not provide any opportunity for comparative analysis, but are provided for informational purposes only.

Analysis 9: Production of Propylene/Ethylene Copolymers with a Propylene/Ethylene Ratio of Approximately 0.5 and without the Presence of Hydrogen.

In this case, two inventive catalyst (examples 13 and 19) and two comparative catalyst (examples 20 and 21), were tested, the results being presented in Table 11. However, as noted before, the only valid comparison may be made between inventive catalyst with substitutions that are the same in all positions other than in 2 position of the indenyl group. These cases do not provide any opportunity for comparative analysis, but are provided for informational purposes only.

Analysis 10: Production of Propylene/Ethylene Copolymers with a Propylene/Ethylene Ratio of Approximately 0.5 and without the Presence of Hydrogen.

Table 12 shows the results of eight experimental Metallocene catalysts conforming to the requirements of the invention compared to four comparative examples. In the aggregate, the catalysts of the present invention showed more than a 525% increase in Molecular Weight. Further the catalysts of the current invention produced products with an aggregate MFR 2.16 of less than 0.15% of that of the comparative products and an aggregate MFR 5 of just greater than 0.43% of the comparative examples. The productivity of these samples could not be determined in these cases because in all of these examples and comparative examples amorphous propylene/ethylene rubbers have been produced. Such polymers generally stick to the autoclace walls and to the stirrer and a quantitative discharge of the autoclave was not possible which makes the determination of the productivities unreliable. Commercially, polymers containing such rubber components are produced in a two step polymerisation where in a first step a homo polymer is produced and in a second step the rubber is produced. This measure reduces the stickiness of the material and allows the commercial production and use of such important materials for applications where low temperature toughness is required (applications like bumpers for cars, frigerator and deep freezer food packaging, crates and pails).

The individual catalyst comparisons between inventive samples 13, 17 and 18 and comparative examples 22 are just as dramatic. (Recall, other comparisons would not be valid due to alternative substitutions in all positions other than in 2 position of the indenyl group). When examples 13, 17 and 18 are compared to comparative example 22, all three inventive examples exhibit significantly lower MFR 2.16 and MFR 5 rates. The Molecular Weights stayed the same or increased. Specifically for MFR 2.16, the inventive examples 13, 17 and 18 show a respective reduction of 34%, 98%, and greater than 99% of the original value of example 22. For the MFR 5, the inventive examples 13, 17 and 18 show a respective reduction of 36%, 98%, and greater than 99% of the original value of example 22. For the molecular weight, the inventive examples 13 produced the same molecular weight of comparative example 22 and examples 17 and 18 show a respective increase of 159% and 347% over the original value.

The examples of the inventive catalyst consistently show dramatic improvement over the comparative examples in gains of productivity and molecular weight, and reductions in the MFR values.

TABLE 1

Polymerisations

| Poly. Example | Catalyst from | H2 [mg] | C3 [g] | C2 [g] | Catalyst [mg] | Polym. Temp. [° C.] | Polym. Time [min] | Yield [g] | Productivity [g polymer/ g catalyst * hour] |
|---|---|---|---|---|---|---|---|---|---|
| 1 | Ex 13 | — | 1838 | — | 61 | 65 | 60 | 478 | 7,800 |
| 2 | Ex 13 | 50 | 1837 | — | 55 | 65 | 60 | 1117 | 19,900 |
| 3 | Ex 13 | 50 | 1837 | — | 43 | 65 | 60 | 820 | 19,100 |
| 4 | Ex 13 | — | 1192 | 25 | 30 | 60 | 60 | 183 | 6,100 |
| 5 | Ex 13 | — | 1182 | 38 | 30 | 60 | 60 | 135 | 4,500 |
| 6 | Ex 13 | — | 1836 | 60 | 75 | 65 | 15 | 190 | 10,100 |
| 7 | Ex 13 | | 1185 | 75 | 30 | 60 | 60 | 108 | 3,600 |
| 8 | Ex 13 | — | 1115 | 110 | 30 | 60 | 60 | 98 | 3,300 |
| 9 | Ex 13 | — | 1767 | 120 | 75 | 65 | 15 | 195 | 10,400 |
| 10 | Ex 13 | — | 1700 | 180 | 75 | 65 | 15 | 210 | 11,200 |
| 11 | Ex 13 | — | 55 | 100 | 50 | 60 | 60 | | |
| 12 | Ex 13 | — | 55 | 125 | 50 | 60 | 60 | | |
| 13 | Ex 13 | — | 55 | 142 | 50 | 60 | 60 | | |
| 14 | Ex 14 | — | 1838 | — | 107 | 65 | 60 | 152 | 1,420 |
| 15 | Ex 14 | 50 | 1836 | — | 76 | 65 | 60 | 318 | 4,180 |
| 16 | Ex 14 | — | 1185 | 38 | 60 | 60 | 60 | 73 | 1,220 |
| 17 | Ex 14 | — | 1174 | 75 | 60 | 60 | 60 | 75 | 1,250 |
| 18 | Ex 14 | — | 1099 | 110 | 60 | 60 | 60 | 65 | 1,080 |
| 19 | Ex 14 | — | 55 | 142 | 50 | 60 | 60 | | |
| 20 | Ex 15 | — | 1838 | — | 100 | 65 | 60 | 350 | 3500 |
| 21 | Ex 15 | 50 | 1837 | — | 50 | 65 | 60 | 510 | 10200 |
| 22 | Ex 15 | — | 55 | 142 | 50 | 60 | 60 | | |
| 23 | Ex 16 | — | 1837 | — | 106 | 65 | 60 | 318 | 3000 |
| 24 | Ex 16 | 50 | 1837 | — | 47 | 65 | 60 | 478 | 10200 |
| 25 | Ex 16 | — | 55 | 142 | 50 | 60 | 60 | | |
| 26 | Ex 17 | — | 1837 | — | 105 | 65 | 60 | 422 | 4000 |
| 27 | Ex 17 | 50 | 1836 | — | 26 | 65 | 60 | 457 | 17500 |
| 28 | Ex 17 | — | 55 | 142 | 50 | 60 | 60 | | |
| 29 | Ex 18 | — | 1837 | — | 97 | 65 | 60 | 410 | 4200 |
| 30 | Ex 18 | 50 | 1836 | — | 30 | 65 | 60 | 490 | 17500 |
| 31 | Ex 18 | — | 55 | 142 | 50 | 60 | 60 | | |
| 32 | Ex 19 | — | 1836 | — | 103 | 65 | 60 | 303 | 6000 |
| 33 | Ex 19 | 50 | 1837 | — | 62 | 65 | 60 | 604 | 18300 |
| 34 | Ex 19 | — | 55 | 100 | 50 | 60 | 60 | | |
| 35 | Ex 19 | — | 55 | 125 | 50 | 60 | 60 | | |
| 36 | Ex 19 | — | 55 | 142 | 50 | 60 | 60 | | |
| 37 | Comp 20 | — | 1837 | — | 100 | 65 | 60 | 210 | 2,100 |
| 38 | Comp 20 | 50 | 1834 | — | 65 | 65 | 60 | 194 | 5,970 |
| 39 | Comp 20 | — | 55 | 100 | 50 | 60 | 60 | | waxy material |
| 40 | Comp 20 | — | 55 | 125 | 50 | 60 | 60 | | waxy material |
| 41 | Comp 20 | — | 55 | 142 | 50 | 60 | 60 | | waxy material |
| 42 | Comp 21 | — | 1838 | — | 101 | 65 | 60 | 369 | 3,650 |
| 43 | Comp 21 | 50 | 1837 | — | 82 | 65 | 60 | 525 | 6,400 |
| 44 | Comp 21 | — | 55 | 100 | 50 | 60 | 60 | | waxy material |
| 45 | Comp 21 | — | 55 | 125 | 50 | 60 | 60 | | waxy material |
| 46 | Comp 21 | — | 55 | 142 | 50 | 60 | 60 | | waxy material |
| 47 | Comp 22 | — | 1830 | — | 105 | 65 | 60 | 517 | 4,920 |
| 48 | Comp 22 | 50 | 1830 | — | 56 | 65 | 60 | 667 | 11,910 |
| 49 | Comp 22 | — | 55 | 142 | 50 | 60 | 60 | | |
| 50 | Comp 23 | — | 1836 | — | 104 | 65 | 60 | 215 | 2,070 |
| 51 | Comp 23 | 50 | 1834 | — | 61 | 65 | 60 | 581 | 9,520 |
| 52 | Comp 23 | — | 1200 | 25 | 50 | 60 | 60 | 140 | 2,800 |
| 53 | Comp 23 | — | 1200 | 38 | 50 | 60 | 60 | 130 | 2,600 |
| 54 | Comp 23 | — | 1184 | 75 | 50 | 60 | 60 | 160 | 3,200 |
| 55 | Comp 23 | — | 1115 | 110 | 50 | 60 | 60 | 162 | 3,240 |
| 56 | Ex 24 | — | 1835 | — | 45 | 65 | 60 | 383 | 8510 |
| 57 | Ex 24 | 50 | 1835 | — | 20 | 65 | 60 | 730 | 36500 |
| 58 | Ex 24 | — | 55 | 142 | 25 | 60 | 60 | | |

TABLE 2

Polymer Properties:

| Poly. Example | Catalyst From Example | C2 [wt %] | Tm [deg C.] | MFR 2.16 [g/10'] | MFR 5 [g/10'] | Mw [kg/mol] | Mw/Mn |
|---|---|---|---|---|---|---|---|
| 1 | Ex 13 | — | 151 | 0.14 | 0.4 | 846 | 3.4 |
| 2 | Ex 13 | — | 151 | 11 | 34 | 235 | 2.6 |
| 4 | Ex 13 | 1.3 | 140 | 0.2 | 0.9 | 582 | 2.7 |
| 5 | Ex 13 | 1.7 | 137 | 0.3 | 1.2 | 544 | 2.5 |
| 6 | Ex 13 | 2.1 | 135 | 0.5 | 1.7 | 523 | 2.9 |
| 7 | Ex 13 | 3.8 | 123 | 0.8 | 3.0 | 413 | 2.6 |
| 8 | Ex 13 | 5.7 | 111 | 0.6 | 2.5 | 454 | 2.9 |
| 9 | Ex 13 | 4.3 | 118 | 0.8 | 3.1 | 422 | 2.9 |
| 10 | Ex 13 | 6.5 | 103 | 0.4 | 1.5 | 491 | 2.8 |
| 11 | Ex 13 | 39.7 | amorphous | 6.9 | 21 | 280 | 2.7 |
| 12 | Ex 13 | 49.1 | amorphous | 11.5 | 35 | 188 | 2.8 |
| 13 | Ex 13 | 56.0 | amorphous | 16.7 | 51.5 | 166 | 2.6 |
| 14 | Ex 14 | — | 150 | <0.1 | <0.1 | 1311 | 3.6 |
| 15 | Ex 14 | — | 150 | 7.5 | 20 | 271 | 2.8 |
| 16 | Ex 14 | 1.5 | 141 | <0.1 | <0.1 | 1240 | 3.6 |
| 17 | Ex 14 | 3.4 | 126 | <0.1 | <0.1 | 1176 | 3.6 |
| 18 | Ex 14 | 5.0 | 114 | <0.1 | <0.1 | 1226 | 4.2 |
| 19 | Ex 14 | 53.5 | amorphous | 6.9 | 22 | 281 | 3.5 |
| 20 | Ex 15 | — | 150 | 0.18 | 0.5 | 652 | 3.0 |
| 21 | Ex 15 | — | 150 | 12 | 35 | 191 | 2.4 |
| 22 | Ex 15 | 53.8 | amorphous | 18 | 56 | 164 | 2.8 |
| 23 | Ex 16 | — | 152 | 0.12 | 0.35 | 709 | 2.6 |
| 24 | Ex 16 | — | 151 | 17.4 | 53 | 208 | 2.5 |
| 25 | Ex 16 | 55.8 | amorphous | 16 | 52 | 172 | 2.6 |
| 26 | Ex 17 | — | 151 | <0.1 | 0.2 | 763 | 2.7 |
| 27 | Ex 17 | — | 150 | 18 | 55 | 172 | 2.3 |
| 28 | Ex 17 | 57.1 | amorphous | 0.5 | 1.7 | 440 | 2.7 |
| 29 | Ex 18 | — | 152 | <0.1 | <0.1 | 920 | 2.6 |
| 30 | Ex 18 | — | 153 | 11 | 30 | 241 | 2.6 |
| 31 | Ex 18 | 56.0 | amorphous | <0.1 | 0.2 | 760 | 2.7 |
| 32 | Ex 19 | — | 150 | <0.1 | 0.25 | 812 | 3.3 |
| 33 | Ex 19 | — | 151 | 10 | 32 | 225 | 2.7 |
| 36 | Ex 19 | 54.7 | amorphous | 16.5 | 51 | 172 | 2.9 |
| 37 | Comp 20 | — | 147 | 14 | 44 | 185 | 2.7 |
| 38 | Comp 20 | — | 148 | 29 | 98 | 166 | 2.6 |
| 39 | Comp 20 | 39.5 | amorphous | n.m. | n.m | <20 | |
| 41 | Comp 20 | 53.7 | amorphous | n.m. | n.m | <20 | |
| 42 | Comp 21 | — | 144 | 4.3 | 14 | 317 | 2.6 |
| 43 | Comp 21 | — | 146 | 64 | 200 | 146 | 2.2 |
| 44 | Comp 21 | 32.5 | amorphous | n.m. | n.m | <20 | |
| 46 | Comp 21 | 45.7 | amorphous | n.m. | n.m | <20 | |
| 47 | Comp 22 | | 151 | 0.35 | 1.8 | 730 | 4.0 |
| 48 | Comp 22 | | 151 | 4.3 | 12 | 216 | 3.9 |
| 49 | Comp 22 | 49.5 | amorphous | 25.4 | 81.0 | 170 | 3.3 |
| 50 | Comp 23 | — | 153 | 1.2 | 4.0 | 387 | 2.8 |
| 51 | Comp 23 | — | 155 | 45.3 | 152 | 146 | 2.4 |
| 52 | Comp 23 | 1.5 | 142 | 0.4 | 1.62 | 461 | 2.8 |
| 53 | Comp 23 | 2.2 | 140 | 0.3 | 1.4 | 488 | 2.7 |
| 54 | Comp 23 | 3.8 | 125 | 0.25 | 0.8 | 532 | 2.8 |
| 55 | Comp 23 | 5.9 | 108 | <0.1 | <0.1 | 725 | 2.8 |
| 56 | Ex 24 | — | 152 | <0.1 | <0.1 | 917 | 2.5 |
| 57 | Ex 24 | — | 153 | 10 | 31 | 238 | 2.5 |
| 58 | Ex 24 | 54.0 | amorphous | <0.1 | 0.2 | 790 | 2.4 |

TABLE 3

Propylene, NO Hydrogen, NO Ethylene

| Test Run | Catalyst Example | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 1 | Ex 13 | — | 1838 | — | 61 | 65 | 60 | 478 | 7,800 | — | 151 | 0.14 | 0.4 | 846 | 3.4 |
| 14 | Ex 14 | — | 1838 | — | 107 | 65 | 60 | 152 | 1,420 | — | 150 | <0.1 | <0.1 | 1311 | 3.6 |
| 20 | Ex 15 | — | 1838 | — | 100 | 65 | 60 | 350 | 3500 | — | 150 | 0.18 | 0.5 | 652 | 3 |
| 23 | Ex 16 | — | 1837 | — | 106 | 65 | 60 | 318 | 3000 | — | 152 | 0.12 | 0.35 | 709 | 2.6 |
| 26 | Ex 17 | — | 1837 | — | 105 | 65 | 60 | 422 | 4000 | — | 151 | <0.1 | 0.2 | 763 | 2.7 |
| 29 | Ex 18 | — | 1837 | — | 97 | 65 | 60 | 410 | 4200 | — | 152 | <0.1 | <0.1 | 920 | 2.6 |
| 32 | Ex 19 | — | 1836 | — | 103 | 65 | 60 | 303 | 6000 | — | 150 | <0.1 | 0.25 | 812 | 3.3 |
| 56 | Ex 24 | — | 1835 | — | 45 | 65 | 60 | 383 | 8510 | — | 152 | <0.1 | <0.1 | 917 | 2.5 |
| 37 | Comp 20 | — | 1837 | — | 100 | 65 | 60 | 210 | 2,100 | — | 147 | 14 | 44 | 185 | 2.7 |

TABLE 3-continued

Propylene, NO Hydrogen, NO Ethylene

| Test Run | Catalyst Example | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 42 | Comp 21 | — | 1838 | — | 101 | 65 | 60 | 369 | 3,650 | — | 144 | 4.3 | 14 | 317 | 2.6 |
| 47 | Comp 22 | — | 1830 | — | 105 | 65 | 60 | 517 | 4,920 | — | 151 | 0.35 | 1.8 | 730 | 4 |
| 50 | Comp 23 | — | 1836 | — | 104 | 65 | 60 | 215 | 2,070 | — | 153 | 1.2 | 4 | 387 | 2.8 |
| | | | | | | | Average Experimental | | 4804 | | 151 | 0.06 | 0.34 | 866.25 | 2.96 |
| | | | | | | | Average Comparative | | 3185 | | 148 | 4.96 | 15.95 | 404.75 | 3.03 |

TABLE 4

Propylene, Hydrogen, NO Ethylene

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 2 | Ex 13 | 50 | 1837 | — | 55 | 65 | 60 | 1117 | 19,900 | — | 151 | 11 | 34 | 235 | 2.6 |
| 3 | Ex 13 | 50 | 1837 | — | 43 | 65 | 60 | 820 | 19,100 | — | NR | NR | NR | NR | NR |
| 15 | Ex 14 | 50 | 1836 | — | 76 | 65 | 60 | 318 | 4,180 | — | 150 | 7.5 | 20 | 271 | 2.8 |
| 21 | Ex 15 | 50 | 1836 | — | 50 | 65 | 60 | 510 | 10200 | — | 150 | 12 | 35 | 191 | 2.4 |
| 24 | Ex 16 | 50 | 1837 | — | 47 | 65 | 60 | 478 | 10200 | — | 151 | 17.4 | 53 | 208 | 2.5 |
| 27 | Ex 17 | 50 | 1836 | — | 26 | 65 | 60 | 457 | 17500 | — | 150 | 18 | 55 | 172 | 2.3 |
| 30 | Ex 18 | 50 | 1836 | — | 30 | 65 | 60 | 490 | 17500 | — | 153 | 11 | 30 | 241 | 2.6 |
| 33 | Ex 19 | 50 | 1837 | — | 62 | 65 | 60 | 604 | 18300 | — | 151 | 10 | 32 | 225 | 2.7 |
| 57 | Ex 24 | 50 | 1835 | — | 20 | 65 | 60 | 730 | 36500 | — | 153 | 10 | 31 | 238 | 2.5 |
| 38 | Comp 20 | 50 | 1834 | — | 65 | 65 | 60 | 194 | 5,970 | — | 148 | 29 | 98 | 166 | 2.6 |
| 43 | Comp 21 | 50 | 1837 | — | 82 | 65 | 60 | 525 | 6,400 | — | 146 | 64 | 200 | 146 | 2.2 |
| 48 | Comp 22 | 50 | 1830 | — | 56 | 65 | 60 | 667 | 11,910 | — | 151 | 4.3 | 12 | 216 | 3.9 |
| 51 | Comp 23 | 50 | 1834 | — | 61 | 65 | 60 | 581 | 9,520 | — | 155 | 45.3 | 152 | 146 | 2.4 |
| | | | | | | | Average Experimental | | 16,373 | | 151 | 12.11 | 36.25 | 222.63 | 2.55 |
| | | | | | | | Average Comparative | | 8,450 | | 150 | 35.65 | 115.50 | 168.50 | 2.78 |

TABLE 5

Aggregate Summary of All Copolymer Values

| | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|
| Average Experimental | 3,007 | | | 6 | 21 | 532 | 3 |
| Average Comparative | 2,960 | | | 4,289 | 3,761 | 305 | 3 |

TABLE 6

Propylene/Ethylene ratio~48, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/ catalyst * hour] | C2 [wt %] | Tm [deg C.] | MFR 2.16 [g/10'] | MFR 5 [g/10'] | Mw [kg/ mol] | Mw/ Mn |
|---|---|---|---|---|---|---|---|---|---|---|---|---|---|---|---|
| 4 | Ex 13 | — | 1192 | 25 | 30 | 60 | 60 | 183 | 6,100 | 1.3 | 140 | 0.2 | 0.9 | 582 | 2.7 |
| 52 | Comp 23 | — | 1200 | 25 | 50 | 60 | 60 | 140 | 2,800 | 1.5 | 142 | 0.4 | 1.62 | 461 | 2.8 |

TABLE 7

Propylene/Ethylene ratio~31.5, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 5 | Ex 13 | — | 1182 | 38 | 30 | 60 | 60 | 135 | 4,500 | 1.7 | 137 | 0.3 | 1.2 | 544 | 2.5 |
| 16 | Ex 14 | — | 1185 | 38 | 60 | 60 | 60 | 73 | 1,220 | 1.5 | 141 | <0.1 | <0.1 | 1240 | 3.6 |
| 53 | Comp 23 | — | 1200 | 38 | 50 | 60 | 60 | 130 | 2,600 | 2.2 | 140 | 0.3 | 1.4 | 488 | 2.7 |

TABLE 8

Propylene/Ethylene ratio~15.8, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 7  | Ex 13   | — | 1185 | 75 | 30 | 60 | 60 | 108 | 3,600 | 3.8 | 123 | 0.8   | 3     | 413  | 2.6 |
| 17 | Ex 14   | — | 1174 | 75 | 60 | 60 | 60 | 75  | 1,250 | 3.4 | 126 | <0.1  | <0.1  | 1176 | 3.6 |
| 54 | Comp 23 | — | 1184 | 75 | 50 | 60 | 60 | 160 | 3,200 | 3.8 | 125 | 0.25  | 0.8   | 532  | 2.8 |

TABLE 9

Propylene/Ethylene ratio~10.1, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 8  | Ex 13   | — | 1115 | 110 | 30 | 60 | 60 | 98  | 3,300 | 5.7 | 111 | 0.6  | 2.5  | 454  | 2.9 |
| 18 | Ex 14   | — | 1099 | 110 | 60 | 60 | 60 | 65  | 1,080 | 5   | 114 | <0.1 | <0.1 | 1226 | 4.2 |
| 55 | Comp 23 | — | 1115 | 110 | 50 | 60 | 60 | 162 | 3,240 | 5.9 | 108 | <0.1 | <0.1 | 725  | 2.8 |

TABLE 10

Propylene/Ethylene ratio~.5, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 11 | Ex 13   | — | 55 | 100 | 50 | 60 | 60 |              | 39.7 | amorphous | 6.9    | 21     | 280 | 2.7 |
| 34 | Ex 19   | — | 55 | 100 | 50 | 60 | 60 |              |      | amorphous |        |        |     |     |
| 44 | Comp 21 | — | 55 | 100 | 50 | 60 | 60 | waxy material | 32.5 | amorphous | >10000 | >10000 | <20 |     |

TABLE 11

Propylene/Ethylene ratio~.44, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 12 | Ex 13   | — | 55 | 125 | 50 | 60 | 60 |               | 49.1 | amorphous | 11.5 | 35 | 188 | 2.8 |
| 35 | Ex 19   | — | 55 | 125 | 50 | 60 | 60 |               |      | amorphous |      |    |     |     |
| 40 | Comp 20 | — | 55 | 125 | 50 | 60 | 60 | waxy material |      |           |      |    |     |     |
| 45 | Comp 21 | — | 55 | 125 | 50 | 60 | 60 | waxy material |      |           |      |    |     |     |

TABLE 12

Propylene/Ethylene ratio~.38, No Hydrogen

| Poly. Example | Catalyst from | H2 [mg] | C3 [g] | C2 [g] | Catalyst [mg] | Polym. Temp. [° C.] | Polym. Time [min] | Yield [g] | Productivity [g polymer/g catalyst * hour] | C2 [wt %] | Tm [deg C.] | MFR 2.16 [g/10'] | MFR 5 [g/10'] | Mw [kg/mol] | Mw/Mn |
|---|---|---|---|---|---|---|---|---|---|---|---|---|---|---|---|
| 13 | Ex 13   | — | 55 | 142 | 50 | 60 | 60 |               | 56   | amorphous | 16.7    | 51.5    | 166    | 2.6 |
| 19 | Ex 14   | — | 55 | 142 | 50 | 60 | 60 |               | 53.5 | amorphous | 6.9     | 22      | 281    | 3.5 |
| 22 | Ex 15   | — | 55 | 142 | 50 | 60 | 60 |               | 53.8 | amorphous | 18      | 56      | 164    | 2.8 |
| 25 | Ex 16   | — | 55 | 142 | 50 | 60 | 60 |               | 55.8 | amorphous | 16      | 52      | 172    | 2.6 |
| 28 | Ex 17   | — | 55 | 142 | 50 | 60 | 60 |               | 57.1 | amorphous | 0.5     | 1.7     | 440    | 2.7 |
| 31 | Ex 18   | — | 55 | 142 | 50 | 60 | 60 |               | 56   | amorphous | <0.1    | 0.2     | 760    | 2.7 |
| 36 | Ex 19   | — | 55 | 142 | 50 | 60 | 60 |               | 54.7 | amorphous | 16.5    | 51      | 172    | 2.9 |
| 58 | Ex 24   | — | 55 | 142 | 25 | 60 | 60 |               | 54   | amorphous | <0.1    | 0.2     | 790    | 2.4 |
| 41 | Comp 20 | — | 55 | 142 | 50 | 60 | 60 | waxy material | 53.7 | amorphous | >10000  | >10000  | <20    |     |
| 46 | Comp 21 | — | 55 | 142 | 50 | 60 | 60 | waxy material | 45.7 | amorphous | >10000  | >10000  | <20    |     |
| 49 | Comp 22 | — | 55 | 142 | 50 | 60 | 60 |               | 49.5 | amorphous | 25.4    | 81      | 170    | 3.3 |
|    |         |   |    |     |    |    |    | Average Experimental |  |  | 9.35    | 29.33   | 368.13 | 2.78 |
|    |         |   |    |     |    |    |    | Average Comparative  |  |  | 6675.13 | 6693.67 | 70     | 3.3 |

While the above description contains many specifics, these specifics should not be construed as limitations of the invention, but merely as exemplifications of embodiments thereof. Those skilled in the art will envision many other embodiments within the scope and spirit of the invention as defined by the claims appended hereto.

What is claimed is:

1. A bridged metallocene having the general Formula 1 below,

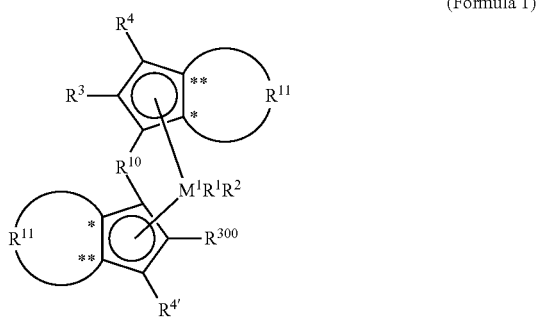

(Formula 1)

where
- $M^1$ is a metal of Group IVb of the Periodic Table of the Elements,
- $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms and $R^1$ and $R^2$ optionally form one or more ring system(s),
- $R^4$ and $R^{4'}$ are identical or different and are each a hydrogen atom, a linear, cyclic or branched hydrocarbon group optionally containing one or more hetero atoms selected from the group consisting of Si, B, Al, O, S, N, P, F, Cl and Br,
- $R^{10}$ is a bridging group wherein $R^{10}$ is selected from:

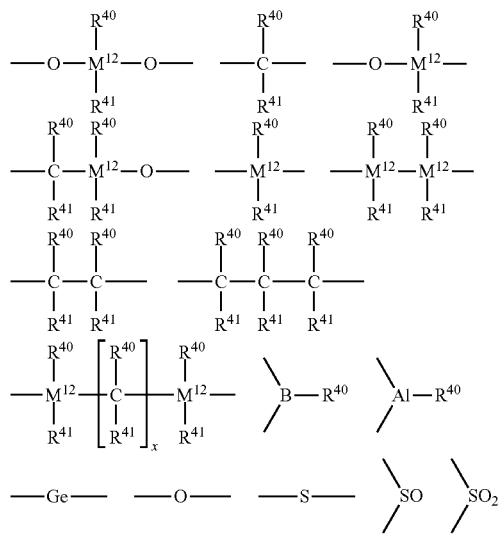

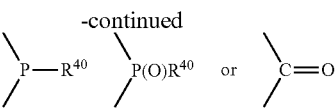

where
- $R^{40}$ and $R^{41}$, even when bearing the same index, can be identical or different and can optionally contain heteroatoms selected from the group consisting of Si, B, Al, O, S, N, P, Cl and Br, and are each a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(aryl)silyl group, an arylsilyl group, or an arylalkenyl group of from 8 to about 40 carbon atoms or wherein $R^{40}$ and $R^{41}$ together with the atoms connecting them can form one or more cyclic systems,
- x is an integer from 1 to 18,
- $M^{12}$ is silicon, germanium or tin, and
- $R^{10}$ can optionally link two units of the formula 1 to one another,
- $R^{11}$ and $R^{11'}$ are identical or different and are each a divalent $C_2$-$C_{40}$ group which together with the cyclopentadienyl ring forms a further saturated or unsaturated ring system having a ring size of from 5 to 7 atoms, where $R^{11}$ and $R^{11'}$ optionally contain the heteroatoms Si, Ge, N, P, O or S within the ring system fused onto the cyclopentadienyl ring,
- $R^{300}$ is a $-CH=CR^{302}R^{303}$ group, where $R^{302}$ and $R^{303}$ are identical or different and/or $R^{302}$ and $R^{303}$ together optionally form a ring system and $R^{302}$ and $R^{303}$ are selected from the group consisting of linear, cyclic or branched hydrocarbon group selected from an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group or an arylsilyl group, wherein the groups optionally contain one or more hetero atoms selected from the group consisting of Si, B, Al, O, S, N, P, F, Cl and Br,
- $R^3$ has the meaning of $R^{300}$ or $R^3$ is a hydrogen atom.

2. The metallocene of claim 1 wherein $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or $R^1$ and $R^2$ together optionally form one or more ring system(s), and $M^1$ is zirconium or hafnium.

3. The metallocene of claim 1 wherein $R^1$ and $R^2$ are identical or different and are methyl, chlorine or phenolate.

4. The metallocene of claim 1 wherein $R^4$ and/or $R^{4'}$ are a hydrogen atom, an alkyl group of from 1 to 20 carbon atoms, an alkenyl group of from 2 to 20 carbon atoms, an aryl group of from 6 to 20 carbon atoms, an arylalkyl group of from 7 to 40 carbon atoms, an alkylaryl group of from 8 to about 40 carbon atoms, an arylalkenyl group of from 8 to about 40 carbon atoms, a substituted or unsubstituted alkylsilyl group, an alkyl(aryl)silyl group, or an arylsilyl group.

5. The metallocene of claim 1 wherein $R^4$ and/or $R^{4\prime}$ are a hydrogen atom, an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 8 to about 20 carbon atoms, an arylalkenyl group of from 8 to about 20 carbon atoms, a substituted or unsubstituted alkylsilyl group, an alkyl(aryl)silyl group, or an arylsilyl group.

6. The metallocene of claim 1 wherein $R^4$ and $R^{4\prime}$ are both hydrogen.

7. The metallocene of claim 1 wherein $R^{10}$ is $R^{40}R^{41}Si=$, $R^{40}R^{41}Ge=$, $R^{40}R^{41}C=$ or $-(R^{40}R^{41}C-CR^{40}R^{41})-$, where $R^{40}$ and $R^{41}$ are identical or different and are each a hydrogen atom, an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms, a substituted or unsubstituted alkylsilyl group, an alkyl(aryl)silyl group, or an arylsilyl group.

8. The metallocene of claim 1 wherein the bridging unit $R^{10}$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, naphthyl, benzyl, trimethylsilyl or 3,3,3-trifluoropropyl.

9. The metallocene of claim 1 wherein the groups $R^{11}$ and $R^{11\prime}$ are identical or different and are each a divalent group selected from those given in Formulea 1 α, β, γ, δ, φ, and ν and Formulae 1 α', β', γ', δ', φ', and ν', respectively, wherein the asterisks "*" and "**" in Formula 1 and Formulae 1 α-ν and 1 α'-ν', respectively, denote the chemical bonds joining $R^{11}$ and $R^{11\prime}$ to the cyclopentadienyl rings

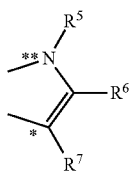

Formula 1α

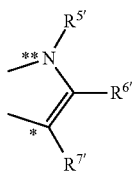

Formula 1α'

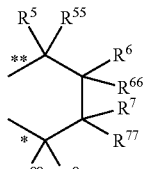

Formula 1δ

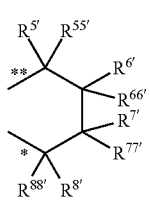

Formula 1δ'

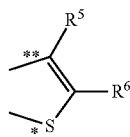

Formula 1β

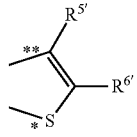

Formula 1β'

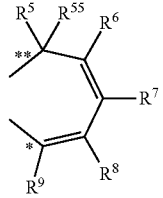

Formula 1φ

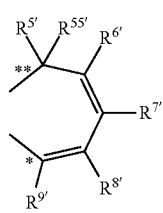

Formula 1φ'

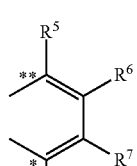

Formula 1γ

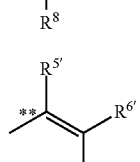

Formula 1γ'

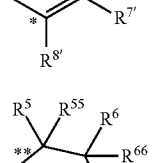

Formula 1ν

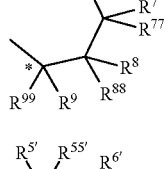

Formula 1ν' wherein $R^5$, $R^6$, $R^7$, $R^8$, and $R^9$ and also $R^{5\prime}$, $R^{6\prime}$, $R^{7\prime}$, $R^{8\prime}$, and $R^{9\prime}$ as well as $R^{55}$, $R^{66}$, $R^{77}$, $R^{88}$ and $R^{99}$ and also $R^{55\prime}$, $R^{66\prime}$, $R^{77'}$, $R^{88'}$ and $R^{99'}$ are identical or different and are each a hydrogen atom, a linear, cyclic or branched hydrocarbon group with or without heteroatoms selected from the group consisting of Si, B, Al, O, S, N, P, F, Cl and Br, the hydrocarbon groups being selected from an alkyl group of from 2 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl) silyl group or an arylsilyl group, and wherein two adjacent radicals $R^5$, $R^6$ or $R^{5'}$, $R^{6'}$ or $R^6$, $R^7$ or $R^{6'}$, $R^{7'}$ or $R^7$, $R^8$ or $R^{7'}$, $R^{8'}$ or $R^8$, $R^9$ or $R^{8'}$, $R^{9'}$ as well as $R^{55}$, $R^{66}$ or $R^{55'}$, $R^{66'}$ or $R^{66}$, $R^{77}$ or $R^{66'}$, $R^{77'}$ or $R^{77}$, $R^{88}$ or $R^{77'}$, $R^{88'}$ or $R^{88}$, $R^{99}$ or $R^{88'}$, $R^{99'}$ in each case optionally form a saturated or unsaturated hydrocarbon ring system.

10. The metallocene of claim 9 wherein $R^{11}$ and $R^{11'}$ are identical or different and $R^{11}$ is a divalent group according to Formula 1γ and $R^{11'}$ is selected from the divalent groups in Formulae 1α', β', and γ', or $R^{11}$ and $R^{11'}$ are identical or different and are divalent groups according to Formula 1α and 1α' or Formula 1β and 1β' or Formula 1γ and 1γ' or Formula 1δ and 1δ' or Formula 1φ and 1φ' or Formula 1ν and 1ν', respectively.

11. The metallocene of claim 9 wherein $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms and the groups optionally contain one or more hetero atoms selected from the group consisting of Si, B, Al, O, S, N, P, F, Cl and Br, or wherein the two adjacent radicals $R^5/R^6$ and $R^{5'}/R^{6'}$ form a hydrocarbon ring system, or $R^5$ and $R^{5'}$ are identical or different and are each a substituted or unsubstituted aryl group of from 6 to about 40 carbon atoms.

12. The metallocene of claim 9 wherein $R^{55}$, $R^{66}$, $R^{77}$, $R^{88}$ and $R^{99}$ and $R^{55'}$, $R^{66'}$, $R^{77'}$, $R^{88'}$ and $R^{99'}$ are each a hydrogen atom and $R^5$, $R^6$, $R^7$, $R^8$ and $R^9$ and $R^{5'}$, $R^{6'}$, $R^{7'}$, $R^{8'}$ and $R^{9'}$ are identical or different and are each a hydrogen atom or a linear, cyclic or branched alkyl group of from 1 to about 10 carbon atoms, or an aryl group of from 6 to about 40 carbon atoms, or wherein the two adjacent radicals $R^5$, $R^6$ and also $R^{5'}$, $R^{6'}$ together form a ring system, or $R^5$ and $R^{5'}$ are identical or different and are each a substituted or unsubstituted aryl group of from 6 to about 40 carbon atoms.

13. The metallocene of claim 1 wherein $R^{300}$ is a —CH=$CR^{302}R^{303}$ group, where $R^{302}$ and $R^{303}$ are identical or different, wherein $R^{302}$ and $R^{303}$ are each a hydrogen atom, a linear, cyclic or branched hydrocarbon group, optionally halogenated, or $R^{302}$ and $R^{303}$ together optionally form a ring system.

14. The metallocene of claim 13 wherein $R^{302}$ and $R^{303}$ are each individually selected from an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an alkoxy group of from 1 to about 20 carbon atoms, an aryloxy group of from 6 to about 20 carbon atoms, or an arylalkenyl group of from 8 to about 40 carbon atoms.

15. The metallocene of claim 1 wherein $R^{300}$ is a —CH=$CR^{302}R^{303}$ group, where $R^{302}$ and $R^{303}$ are identical or different and $R^{302}$ and $R^{303}$ are each a linear, cyclic or branched hydrocarbon group, optionally halogenated, or $R^{302}$ and $R^{303}$ together optionally form a ring system, with the proviso, that $R^{300}$ contains more than 6 carbon atoms.

16. The metallocene of claim 15, wherein $R^{302}$ and/or $R^{303}$ are each individually selected from an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, an alkoxy group of from 1 to about 10 carbon atoms, an aryloxy group of from 6 to about 20 carbon atoms, or an arylalkenyl group of from 8 to about 20 carbon atoms.

17. The metallocene of claim 1, wherein $R^{300}$ is a —CH=$CR^{302}R^{303}$ group, where $R^{302}$ and $R^{303}$ are identical or different and/or $R^{302}$ and $R^{303}$ together optionally form a ring system, and $R^{302}$ and $R^{303}$ are each a linear, cyclic or branched hydrocarbon group, optionally halogenated, an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms or an aryloxy group of from 6 to about 20 carbon atoms, with the proviso, that $R^{300}$ contains more than 6 carbon atoms.

18. The metallocene of claim 1 wherein $R^3$ has the meaning of $R^{300}$.

19. The metallocene of claim 1 wherein $R^3$ and $R^{300}$ are identical.

20. The metallocene of claim 1 wherein $R^3$ and $R^{300}$ are identical and are a —CH=$CR^{302}R^{303}$ group, where $R^{302}$ and $R^{303}$ are identical or different and/or $R^{302}$ and $R^{303}$ together optionally form a ring system, and are each a linear, cyclic or branched hydrocarbon group, optionally halogenated, said hydrocarbon group being selected from an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, an alkoxy group of from 1 to about 10 carbon atoms, and an aryloxy group of from 6 to about 20 carbon atoms.

21. The metallocene of claim 1 wherein $R^3$ and $R^{300}$ are identical and are a —CH=$CR^{302}R^{303}$ group, where $R^{303}$ and $R^{302}$ are identical or different and/or $R^{302}$ and $R^{303}$ together optionally form a ring system, and are each a linear, cyclic or branched hydrocarbon group, optionally halogenated, said hydrocarbon group being selected from an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms and an aryloxy group of from 6 to about 20 carbon atoms, with the proviso that $R^3$ and $R^{300}$ contain more than 6 carbon atoms.

22. The metallocene of claim 1 wherein $R^3$ and $R^{300}$ are identical and are a —CH=$CR^{302}R^{303}$ group, where $R^{303}$ and $R^{302}$ are identical or different and/or $R^{302}$ and $R^{303}$ together optionally form a ring system, and are each a linear, cyclic or branched hydrocarbon group, optionally be halogenated and is selected from an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms and an aryloxy group of from 6 to about 20 carbon atoms, with the proviso that $R^3$ and $R^{300}$ contain more than 6 carbon atoms.

23. The metallocene of claim 1 wherein $R^3$ and $R^{300}$ are identical and are a —CH=$CR^{302}R^{303}$ group, where $R^{303}$ and $R^{302}$ are identical or different and/or $R^{302}$ and $R^{303}$ together optionally form a ring system, and are each a linear, cyclic or branched hydrocarbon group, optionally halogenated, an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms, or an aryloxy group of from 6 to about 20 carbon atoms, with the proviso that $R^3$ and $R^{300}$ contain more than 6 carbon atoms.

24. A process for olefin polymerisation comprising contacting one or more olefins each having from 2 to about 20 carbon atoms under olefin polymerisation reaction conditions with a catalyst system including a bridged metallocene component having formula 1

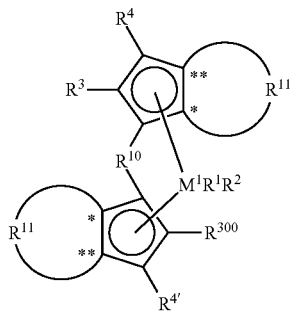

(Formula 1)

where

M$^1$ is a metal of Group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms and $R^1$ and $R^2$ optionally form one or more ring system(s), $R^4$ and $R^{4'}$ are identical or different and are each a hydrogen atom, a linear, cyclic or branched hydrocarbon group optionally containing one or more hetero atoms selected from the group consisting of Si, B, Al, O, S, N, P, F, Cl and Br, $R^{10}$ is a bridging group wherein $R^{10}$ is selected from:

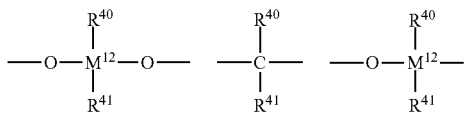

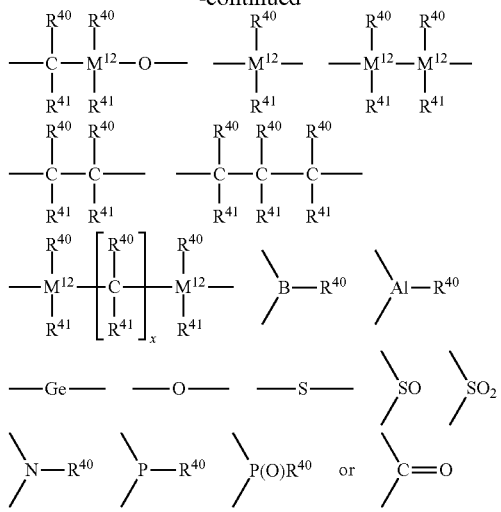

where $R^{40}$ and $R^{41}$, even when bearing the same index, can be identical or different and can optionally contain heteroatoms selected from the group consisting of Si, B, Al, O, S, N, P, Cl and Br, and are each a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(arypsilyl group, an arylsilyl group, or an arylalkenyl group of from 8 to about 40 carbon atoms or wherein $R^{40}$ and $R^{41}$ together with the atoms connecting them can form one or more cyclic systems, x is an integer from 1 to 18, $M^{12}$ is silicon, germanium or tin, and $R^{10}$ can optionally link two units of the formula 1 to one another, $R^{11}$ and $R^{11'}$ are identical or different and are each a divalent $C_2$—$C_{40}$ group which together with the cyclopentadienyl ring forms a further saturated or unsaturated ring system having a ring size of from 5 to 7 atoms, where $R^{11}$ and $R^{11'}$ optionally contain the heteroatoms Si, Ge, N, P, O or S within the ring system fused onto the cyclopentadienyl ring, $R^{300}$ is a —CH=$CR^{302}R^{303}$ group, where $R^{302}$ and $R^{303}$ are identical or different and/or $R^{302}$ and $R^{303}$ together optionally form a ring system, and $R^{302}$ and $R^{303}$ are selected from the group consisting of a linear, cyclic or branched hydrocarbon group selected from an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group or an arylsilyl group, wherein the groups optionally contain one or more hetero atoms selected from the group consisting of Si, B, Al, O, S, N, P, F, Cl and Br, with the proviso, $R^3$ has the meaning of $R^{300}$ or $R^3$ is a hydrogen atom.

25. The process of claim 24 wherein $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or $R^1$ and $R^2$ together optionally form one or more ring system(s), and $M^1$ is zirconium or hafnium.

26. The process of claim 24 wherein $R^1$ and $R^2$ are identical or different and are methyl, chlorine or phenolate.

27. The process of claim 24 wherein $R^4$ and/or $R^{4'}$ are a hydrogen atom, an alkyl group of from 1 to 20 carbon atoms, an alkenyl group of from 2 to 20 carbon atoms, an aryl group of from 6 to 20 carbon atoms, an arylalkyl group of from 7 to 40 carbon atoms, an alkylaryl group of from 8 to about 40 carbon atoms, an arylalkenyl group of from 8 to about 40 carbon atoms, a substituted or unsubstituted alkylsilyl group, an alkyl(aryl)silyl group, or an arylsilyl group.

28. The process of claim 24 wherein $R^4$ and/or $R^{4'}$ are a hydrogen atom, an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 8 to about 20 carbon atoms, an arylalkenyl group of from 8 to about 20 carbon atoms, a substituted or unsubstituted alkylsilyl group, an alkyl(aryl)silyl group, or an arylsilyl group.

29. The process of claim 24 wherein $R^4$ and $R^{4'}$ are both hydrogen.

30. The process of claim 24 wherein $R^{10}$ is $R^{40}R^{41}Si=$, $R^{40}R^{41}Ge=$, $R^{40}R^{41}C=$ or $-(R^{40}R^{41}C-CR^{40}R^{41})-$, where $R^{40}$ and $R^{41}$ are identical or different and are each a hydrogen atom, an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms, a substituted or unsubstituted alkylsilyl group, an alkyl(aryl)silyl group, or an arylsilyl group.

31. The process of claim 24 wherein the bridging unit $R^{10}$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, naphthyl, benzyl, trimethylsilyl or 3,3,3-trifluoropropyl.

32. The process of claim 24 wherein the groups $R^{11}$ and $R^{11'}$ are identical or different and are each a divalent group selected from those given in Formulae 1 a, β, γ, δ, φ, and ν and Formulae 1 a', β', γ', δ', φ', and ν', respectively, wherein the asterisks "*" and "**" in Formula 1 and Formulae 1 α-ν and 1 α'-ν' respectively, denote the chemical bonds joining $R^{11}$ and $R^{11'}$ to the cyclopentadienyl rings

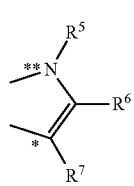

Formula 1α

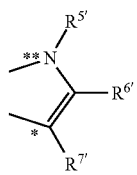

Formula 1α'

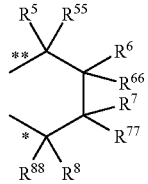

Formula 1δ

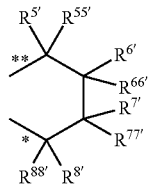

Formula 1δ'

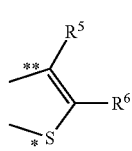

Formula 1β

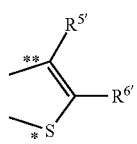

Formula 1β'

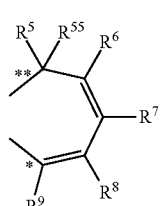

Formula 1φ

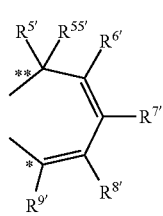

Formula 1φ'

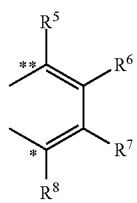

Formula 1γ

-continued

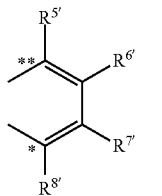

Formula 1γ'

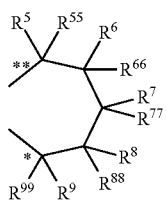

Formula 1v

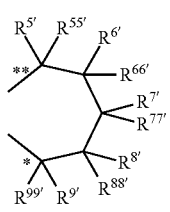

Formula 1v' wherein $R^5$, $R^6$, $R^7$, $R^8$, and $R^9$ and also $R^{5'}$, $R^{6'}$, $R^{7'}$, $R^{8'}$ and $R^{9'}$ as well as $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are identical or different and are each a hydrogen atom, a linear, cyclic or branched hydrocarbon group with or without heteroatoms selected from the group consisting of Si, B, Al, O, S, N, P, F, Cl and Br, the hydrocarbon groups being selected from an alkyl group of from 2 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group and an arylsilyl group, and wherein two adjacent radicals $R^5$, $R^6$ or $R^{5'}$, $R^{6'}$ or $R^6$, $R^7$ or $R^{6'}$, $R^{7'}$ or $R^7$, $R^8$ or $R^{7'}$, $R^{8'}$ or $R^8$, $R^9$ or $R^{8'}$, $R^{9'}$ as well as $R^{55}$, $R^{66}$ or $R^{55'}$, $R^{66'}$ or $R^{66}$, $R^{77}$ or $R^{66'}$, $R^{77'}$ or $R^{77}$, $R^{88}$ or $R^{77'}$, $R^{88'}$ or $R^{88}$, $R^{99}$ or $R^{88'}$, $R^{88'}$ $R^{99'}$ in each case optionally form a saturated or unsaturated hydrocarbon ring system.

33. The process of claim 32 wherein $R^{11}$ and $R^{11'}$ are identical or different and $R^{11}$ is a divalent group according to Formula 1γ and $R^{11'}$ is selected from the divalent groups in Formulae 1α', β', and γ', or $R^{11}$ and $R^{11'}$ are identical or different and are divalent groups according to Formula 1α and 1α' or Formula 1β and 1β' or Formula 1γ and 1γ' or Formula 1δ and 1δ' or Formula 1φ and 1φ' or Formula 1v and 1v', respectively.

34. The process of claim 32 wherein $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms and the groups optionally contain one or more hetero atoms selected from the group consisting of Si, B, Al, O, S, N, P, F, Cl and Br, or wherein the two adjacent radicals $R^5/R^6$ and $R^{5'}/R^{6'}$ form a hydrocarbon ring system, or $R^5$ and $R^{5'}$ are identical or different and are each a substituted or unsubstituted aryl group of from 6 to about 40 carbon atoms.

35. The process of claim 32 wherein $R^{55}$, $R^{66}$, $R^{77}$, $R^{88}$ and $R^{99}$ and $R^{55'}$, $R^{66'}$, $R^{77'}$, $R^{88'}$ and $R^{99'}$ are each a hydrogen atom and $R^5$, $R^6$, $R^7$, $R^8$ and $R^9$ and $R^{5'}$, $R^{6'}$, $R^{7'}$, $R^{8'}$ and $R^{9'}$ are identical or different and are each a hydrogen atom or a linear, cyclic or branched alkyl group of from 1 to about 10 carbon atoms, or an aryl group of from 6 to about 40 carbon atoms, or wherein the two adjacent radicals $R^5$, $R^6$ and also $R^{5'}$, $R^{6'}$ together form a ring system, or $R^5$ and $R^{5'}$ are identical or different and are each a substituted or unsubstituted aryl group of from 6 to about 40 carbon atoms.

36. The process of claim 24 wherein $R^{300}$ is a —CH=$CR^{302}R^{303}$ group, where $R^{302}$ and $R^{303}$ are identical or different, wherein $R^{302}$ and $R^{303}$ are each a linear, cyclic or branched hydrocarbon group, optionally halogenated, or $R^{302}$ and $R^{303}$ together optionally form a ring system.

37. The process of claim 36 wherein $R^{302}$ and $R^{303}$ are each individually selected from an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an alkoxy group of from 1 to about 20 carbon atoms, an aryloxy group of from 6 to about 20 carbon atoms, or an arylalkenyl group of from 8 to about 40 carbon atoms.

38. The process of claim 24 wherein $R^{300}$ is a —CH=$CR^{302}R^{303}$ group, and where $R^{302}$ and $R^{303}$ are identical or different and $R^{302}$ and $R^{303}$ are each a linear, cyclic or branched hydrocarbon group, optionally halogenated, or $R^{302}$ and $R^{303}$ together optionally form a ring system, with the proviso, that $R^{300}$ contains more than 6 carbon atoms.

39. The process of claim 38, wherein $R^{302}$ and/or $R^{303}$ are each individually selected from an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, an alkoxy group of from 1 to about 10 carbon atoms, an aryloxy group of from 6 to about 20 carbon atoms, or an arylalkenyl group of from 8 to about 20 carbon atoms.

40. The process of claim 24, wherein $R^{300}$ is a —CH=$CR^{302}R^{303}$ group, where $R^{302}$ and $R^{303}$ are identical or different and/or $R^{302}$ and $R^{303}$ together optionally form a ring system, and $R^{301}$, $R^{302}$, $R^{303}$ are each a linear, cyclic or branched hydrocarbon group, optionally halogenated, and which is selected from an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms and an aryloxy group of from 6 to about 20 carbon atoms, with the proviso, that $R^3$ and $R^{300}$ contains more than 6 carbon atoms.

41. The process of claim 24 wherein $R^3$ has the meaning of $R^{300}$.

42. The process of claim 25 wherein $R^3$ and $R^{300}$ are identical.

43. The process of claim 24 wherein $R^3$ and $R^{300}$ are identical and are a —CH=$CR^{302}R^{303}$ group, where $R^{302}$ and $R^{303}$ are identical or different and/or $R^{302}$ and $R^{303}$ together optionally form a ring system, and are each a linear, cyclic or branched hydrocarbon group, optionally halogenated, said hydrocarbon group being selected from an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, an alkoxy group of from 1 to about 10 carbon atoms and an aryloxy group of from 6 to about 20 carbon atoms.

44. The process of claim 24 wherein $R^3$ and $R^{300}$ are identical and are a —CH=$CR^{302}R^{303}$ group, where $R^{303}$ and $R^{302}$ are identical or different and/or $R^{302}$ and $R^{303}$ together optionally form a ring system, and are each a linear, cyclic or branched hydrocarbon group, optionally halogenated, said hydrocarbon group being selected from an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms and an aryloxy group of from 6 to about 20 carbon atoms, with the proviso that $R^3$ and $R^{300}$ contain more than 6 carbon atoms.

45. The process of claim 24, wherein $R^3$ and $R^{300}$ are identical and are a —CH=$CR^{302}R^{303}$ group, where $R^{303}$ and $R^{302}$ are identical or different and/or $R^{302}$ and $R^{303}$ together optionally form a ring system, and are each a linear, cyclic or branched hydrocarbon group which may optionally be halogenated, an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms and an aryloxy group of from 6 to about 20 carbon atoms, with the proviso that $R^3$ and $R^{300}$ contain more than 6 carbon atoms.

46. The process of claim 24 wherein $R^3$ and $R^{300}$ are identical and are a —CH=$CR^{302}R^{303}$ group, where $R^{303}$ and $R^{302}$ are identical or different and/or $R^{302}$ and $R^{303}$ together optionally form a ring system, and are each a linear, cyclic or branched hydrocarbon group, optionally halogenated, and which is selected from an alkyl group of from 1 to about 10 carbon atoms, an alkenyl group of from 2 to about 10 carbon atoms, an arylalkyl group of from 7 to about 20 carbon atoms, an alkylaryl group of from 7 to about 20 carbon atoms, an arylalkenyl group of from 8 to about 20 carbon atoms, an alkoxy group of from 1 to about 10 carbon atoms, and an aryloxy group of from 6 to about 20 carbon atoms, with the proviso that $R^3$ and $R^{300}$ contain more than 6 carbon atoms.

47. The process of claim 24 wherein the olefins include propylene and/or ethylene.

48. The process of claim 24 wherein the olefins include at least one olefin having the formula $R'''$—CH=CH—$R''$ wherein $R'''$ and $R''$ can be identical or different and are each individually a hydrogen atom or a radical having from 1 to about 20 carbon atoms, or $R'''$ and $R''$ together can form one or more rings.

49. The process of claim 24 wherein the olefins include one or more compounds selected from the group consisting of ethylene, propylene, 1-butene, 1-pentene, 1-hexene, 4-methyl-1-pentene or 1-octene, styrene, 1,3-butadiene, 1,4-hexadiene, vinylnorbornene, norbornadiene, ethylnorbornadiene, norbornene, tetracyclododecene and methylnorbornene.

50. A bridged metallocene having the general Formula Ia below,

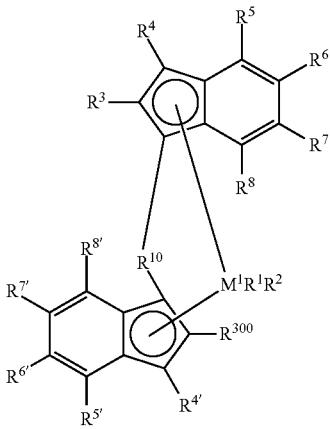

Formula Ia where $M^1$, $R^1$, $R^2$, $R^3$, $R^4$, $R^{4'}$, $R^{10}$, and $R^{300}$ have the meaning set forth in claim 1, and wherein $R^5$, $R^6$, $R^7$ and $R^8$ and also $R^{5'}$, $R^{6'}$, $R^{7'}$ and $R^{8'}$ are identical or different and are each a hydrogen atom, a linear, cyclic or branched hydrocarbon group selected from an alkyl group of from 1 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group and an arylsilyl group.

51. The metallocene of claim 50, wherein the linear, cyclic or branched hydrocarbon groups contain one or more hetero atoms selected from the group consisting of Si, B, Al, O, S, N, P, F, Cl and Br, and/or two adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case optionally form a hydrocarbon ring system.

52. The metallocene of claim 50, wherein $R^5$, $R^6$, $R^7$ and $R^8$ and also $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms and where the two adjacent radicals $R^5$, $R^6$ and also $R^{5'}$, $R^{6'}$ optionally form a saturated or unsaturated hydrocarbon ring system.

53. The metallocene of claim 50, wherein $R^6$, $R^7$, $R^8$ and also $R^{6'}$, $R^{4'}$ and $R^{8'}$ are identical or different and are each a hydrogen atom, a linear, cyclic or branched hydrocarbon group selected from an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group and an arylsilyl group, and/or two adjacent radicals $R^6$, $R^7$ or $R^7$, $R^8$ as well as $R^{6'}$, $R^{7'}$ or $R^{7'}$, $R^{8'}$ in each case optionally form a hydrocarbon ring system and where $R^5$ and $R^{5'}$ are identical or different and are each a substituted or unsubstituted aryl group of from 6 to about 40 carbon atoms which optionally contain one or more hetero atoms selected from the group consisting of Si, B, Al, O, S, N, P, F, Cl and Br.

54. The metallocene of claim 53, wherein the linear, cyclic or branched hydrocarbon groups contain one or more hetero atoms selected from the group consisting of Si, B, Al, O, S, N, P, F, Cl and Br.

55. The metallocene of claim 50, wherein $R^6$, $R^7$ and $R^8$ and also $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which optionally contain one or more hetero atoms selected from the group consisting of Si, B, Al, O, S, N, P, F, Cl and Br, and where $R^5$ and $R^{5'}$ are identical or different and are each a substituted or unsubstituted aryl group of from 6 to about 40 carbon atoms.

56. The metallocene of claim 50, wherein $R^6$, $R^7$ and $R^8$ and also $R^{6'}$, $R^{7'}$ and $R^{8'}$ are identical or different and are each a hydrogen atom or a linear, cyclic or branched alkyl group of from 1 to about 10 carbon atoms, or an aryl group of from 6 to about 10 carbon atoms and where $R^5$ and $R^{5'}$ are identical or different and are each naphthyl, 4-($C_1$-$C_{10}$-alkyl)phenyl or 4-($C_6$-$C_{20}$-aryl)phenyl 4-($C_1$-$C_{10}$-fluoroalkyl)-phenyl, 3-($C_1$-$C_{10}$-alkyl)-phenyl, 3-($C_1$-$C_{10}$-fluoroalkyl)-phenyl, 3-($C_6$-$C_{20}$-aryl)phenyl, 3,5-di-($C_1$-$C_{10}$-alkyl)-phenyl, 3,5-di-($C_1$-$C_{10}$-fluroalkyl)-phenyl, or 3,5-($C_6$-$C_{20}$-aryl)phenyl.

57. A process for olefin polymerisation comprising contacting one or more olefins each having from 2 to about 20 carbon atoms under olefin polymerisation reaction conditions with a catalyst system including a bridged metallocene component according to claim 50.

58. The process of claim 57 wherein the olefins include propylene and/or ethylene.

59. The process of claim 57 wherein the olefins include at least one olefin having the formula $R'''$—CH=CH—$R''$ wherein $R'''$ and $R''$ can be identical or different and are each individually a hydrogen atom or a radical having from 1 to about 20 carbon atoms, or $R'''$ and $R''$ together can form one or more rings.

60. The process of claim 57 wherein the olefins include one or more compounds selected from the group consisting of ethylene, propylene, 1-butene, 1-pentene, 1-hexene, 4-methyl-1-pentene or 1-octene, styrene, 1,3-butadiene, 1,4-hexadiene, vinylnorbornene, norbomadiene, ethylnorbornadiene, norbornene, tetracyclododecene and methylnorbornene.

* * * * *